US007833676B2

(12) United States Patent
Ito

(10) Patent No.: US 7,833,676 B2
(45) Date of Patent: Nov. 16, 2010

(54) FUEL CELL SYSTEM AND SOLID POLYMER ELECTROLYTE FILM

(75) Inventor: Masashi Ito, Yokosuka (JP)

(73) Assignee: Nissan Motor Co., Ltd., Kanagawa (JP)

( * ) Notice: Subject to any disclaimer, the term of this patent is extended or adjusted under 35 U.S.C. 154(b) by 937 days.

(21) Appl. No.: 11/631,943

(22) PCT Filed: Jul. 7, 2005

(86) PCT No.: PCT/JP2005/012597

§ 371 (c)(1),
(2), (4) Date: Jan. 9, 2007

(87) PCT Pub. No.: WO2006/006502

PCT Pub. Date: Jan. 19, 2006

(65) Prior Publication Data

US 2008/0044709 A1 Feb. 21, 2008

(30) Foreign Application Priority Data

| Jul. 9, 2004 | (JP) | ............................. 2004-203151 |
| Sep. 6, 2004 | (JP) | ............................. 2004-258507 |
| Dec. 2, 2004 | (JP) | ............................. 2004-349842 |
| Feb. 28, 2005 | (JP) | ............................. 2005-053653 |
| Jun. 13, 2005 | (JP) | ............................. 2005-172229 |

(51) Int. Cl.
*H01M 2/00* (2006.01)
*A62D 3/00* (2007.01)
(52) U.S. Cl. ..................... 429/482; 429/479; 252/186.1
(58) Field of Classification Search ................... 429/33, 429/30, 29; 252/186.1
See application file for complete search history.

(56) References Cited

U.S. PATENT DOCUMENTS

| 6,375,922 | B1 * | 4/2002 | Ishii et al. ................... 423/591 |
| 6,518,419 | B1 * | 2/2003 | Van Der Lugt et al. ...... 536/105 |
| 6,777,516 | B2 * | 8/2004 | Li et al. ...................... 526/258 |
| 2003/0008196 | A1 | 1/2003 | Wessel et al. |
| 2003/0078308 | A1 * | 4/2003 | Holdcroft et al. ............. 521/27 |

(Continued)

FOREIGN PATENT DOCUMENTS

CA 2444647 A1 4/2004

(Continued)

OTHER PUBLICATIONS

"Researches and Developments of a Durability-Elevated Hydrocarbon System Electrolyte Membrane for Proton-Exchange Membrane Fuel Cells in the Proton-Exchange Membrane Fuel Cell Elements Technology Development and Like Program in the Proton-Exchange Membrane Fuel Cell System Technology Project," Hitachi, Limited as entrustee from the New Energy and Industrial Technology Development Organization, Mar. 2003, pp. 1, 31-33 (with English Translation).

(Continued)

*Primary Examiner*—Melvin C Mayes
*Assistant Examiner*—Melissa Stalder
(74) *Attorney, Agent, or Firm*—Foley & Lardner LLP

(57) ABSTRACT

According to the invention, a fuel cell system features a fuel cell (14) having a solid polymer electrolyte membrane (4), and an antioxidant residing in or contacting the solid polymer electrolyte membrane (4), for inactivating active oxygen.

23 Claims, 17 Drawing Sheets

U.S. PATENT DOCUMENTS

2008/0044709 A1 2/2008 Ito

FOREIGN PATENT DOCUMENTS

| JP | 59-185787 | | 10/1984 |
|---|---|---|---|
| JP | 59185787 A | * | 10/1984 |
| JP | 2000-223135 A | | 8/2000 |
| JP | 2001-118591 A | | 4/2001 |
| JP | 2003-503510 A | | 1/2003 |
| JP | 2003-086188 A | | 3/2003 |
| JP | 2003-109623 A | | 4/2003 |
| JP | 2003-201352 A | | 7/2003 |
| JP | 2003226743 A | * | 8/2003 |
| JP | 2004-134269 A | | 4/2004 |
| JP | 2005-190752 A | | 7/2005 |
| JP | 2003-226743 | | 8/2008 |
| WO | WO 99/10165 A1 | | 3/1999 |
| WO | WO 00/24796 A1 | | 5/2000 |

OTHER PUBLICATIONS

"Researches and Developments of Proton-Exchange Membrane Fuel Cell—Researches on Deterioration Factors of Proton-Exchange Membrane Fuel Cell Fund Research (1) on Deterioration Factors Deterioration Factor of Electrode Catalyst/Electrolyte Interfaces," Kyoto University Graduate School of Engineering as entrustee from the New Energy and Industrial Technology Development Organization, Mar. 2002, pp. 1-44 (with partial English Translation).

Office Action received in U.S. Appl. No. 11/571,865.

\* cited by examiner

FIG. 10
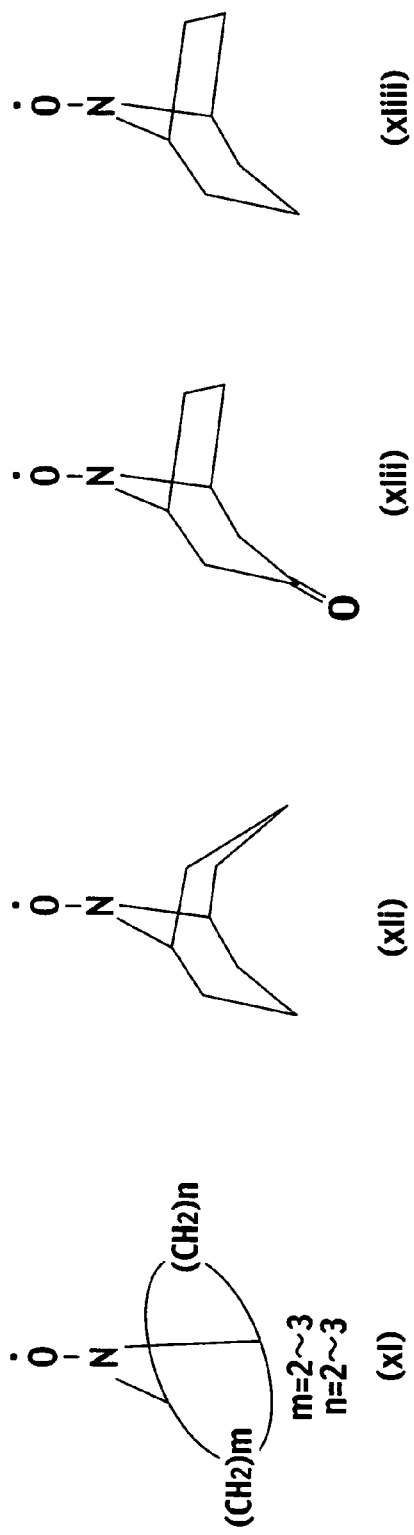
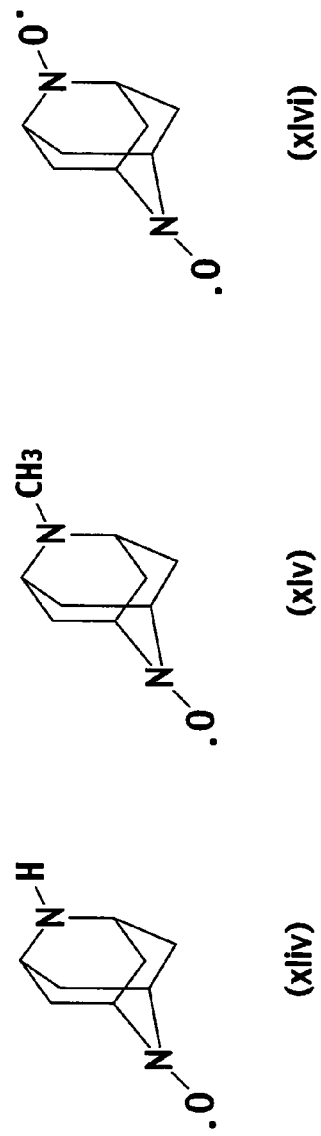

FUEL CELL SYSTEM AND SOLID POLYMER ELECTROLYTE FILM

TECHNICAL FIELD

The present invention relates to a fuel cell system and a solid polymer electrolyte film, and more specifically, to a fuel cell system, a solid polymer electrolyte membrane, a fuel cell, and a fuel cell vehicle.

BACKGROUND ART

The fuel cell technology is attracting attention as a solution to the problem of energy resources, as well as to the issue of global warm due to $CO_2$ emission. The fuel cell is adapted for electrochemical oxidation of a fuel, such as hydrogen or methanol or any hydrocarbon else in the cell, to effect a direct conversion of chemical energy of the fuel to electrical energy to be taken out. The fuel cell is thus free from emissions of combustion products of fuel, such as $NO_x$ and $SO_x$, and attracts attention as a clean energy source for internal combustion engines such as for automobiles, or for thermal power plants.

There are some types of fuel cells, with the PEFC (proton-exchange membrane fuel cell) inclusive, which is now most watched, and developed. The PEFC has various advantages, such that it is (1) adapted for an operation to be facile in start and stop at low temperatures, (2) allowed to be high in theoretical voltage as well as in theoretical efficiency of conversion, (3) implemented with a liquid-free electrolyte allowing a flexible design of cell structure, such as a vertical type, and (4) configured for an interface between ion exchange membrane and electrode to have a three-phase interface controlled to take out an enhanced amount of current, achieving a high density power output.

The principle of operation of a fuel cell includes two electrochemical processes, being an $H_2$ oxidation at the fuel electrode (cathode as negative-pole), and a four-electron reduction of molecular oxygen ($O_2$) shown by formula (A1) below, which produces water.

$$O_2 + 4H^+ + 4e^- \rightarrow 2H_2O \quad (A1)$$

Actually, concurrent side reactions occur. Typically, a two-electron reduction of $O_2$ takes place at the air electrode, producing hydrogen peroxide ($H_2O_2$), as shown by formula (A2) below.

$$O_2 + 2H^+ + 2e^- \rightarrow H_2O_2 \quad (A2)$$

Hydrogen peroxide is stable, and has a long life, though weak in oxidizability. Hydrogen peroxide decomposes, following reaction formulas (A3) and (A4) shown below. When decomposing, it generates radicals, such as hydroxy radical (.OH) and hydroperoxy radical (.OOH). Such radicals, in particular hydroxy radical, are strong in oxidizability, so that even perfluorosulfonated polymer used as an electrolyte membrane may be decomposed in a long use.

$$H_2O_2 \rightarrow 2.OH \quad (A3)$$

$$H_2O_2 \rightarrow .H + .OOH \quad (A4)$$

Low-valence ions of transition metal such as $Fe^{2+}$, $Ti^{3+}$, or $Cu^+$, if present any, cause a Haber-Weiss reaction, where hydrogen peroxide is one-electron reduced by such a metal ion, generating hydroxy radical. Hydroxy radical, most reactive among free radicals, has a very strong oxidizability, as is known If the metal ion is an iron ion, the Haber-Weiss reaction is known as a Fenton reaction shown by formula (A5) below.

$$Fe^{2+} + H_2O_2 \rightarrow Fe^{3+} + OH^- + .OH \quad (A5)$$

Metal ions, if mixed in an electrolyte membrane, cause a Haber-Weiss reaction, whereby hydrogen peroxide in the electrolyte membrane is changed into hydroxy radical, whereby the electrolyte membrane may be deteriorated (Kyoto University Graduate School of Engineering as en from the New Energy and Industrial Technology Development Organization, "2001 yearly results report, researches and developments of proton-exchange membrane fuel cell, researches on deterioration factors of proton-exchange membrane fuel cell, fund research (1) on deterioration factors, deterioration factor of electrode catalyst/electrolyte interfaces", March 2002, p. 13, 24, 27).

As a method for blocking hydrogen peroxide from becoming radical, there has been proposed a method of having a metal oxide, such as a manganese oxide or cobalt oxide, mixed and dispersed in the electrolyte membrane, for decomposing hydrogen peroxide by contact therewith, or a method of having a peroxide stabilizing agent, such as a tin compound, mixed and dispersed in the electrolyte membrane, for impeding a change of hydrogen peroxide into radical (Japanese Patent Application Laying-pen Publication No. 2001-118591). For example, there has been proposed a method in which a compound with phenolic hydroxyl is mixed in the electrolyte membrane, so that peroxide radicals are trapped to be inactive (Japanese Patent Application Laying-Open Publication No. 2000-223135). Another method is proposed in which an electrolyte membrane has a phenol compound, amine compound, surfer compound, phosphorus compound, or the like mixed therein as an antioxidant to vanish generated radicals (Japanese Patent Application Laying-Open Publication No. 2004-134269). Another proposed method has an electrolyte membrane disposed adjacent to a catalyst layer containing molecules having a smaller bond energy than carbon-fluorine bonding in the electrolyte membrane, the molecules reacting with priority to hydroxy radicals, thereby protecting the electrolyte membrane (Japanese Patent Application Laying Open Publication No. 2003-109623).

DISCLOSURE OF INVENTION

However, metal oxides and tin compounds are insoluble in water, and it will be difficult to achieve a uniform dispersion in an electrolyte membrane even after their atomization into fine particles. Further, tin compounds may be decomposed, with elution of metal as a cation in the electrolyte membrane to be acidic, which may cause a Haber-Weiss reaction, promoting generation of active oxygen.

When decomposing hydrogen peroxide by a catalyst such as a metal oxide, the decomposition is caused as a contact decomposition. That is, for hydrogen peroxide, it will not occur unless in the vicinity of a contact Therefore, decomposition is disabled of hydrogen peroxide remote from catalyst.

For a trapping inactivation of peroxide radical, there is needed an amount of radical-inactivative compound equivalent to a molar concentration of generated radical. This compound is not regenerative. The radical-inactivative compound is thus needed every time when trapping radical, constituting a difficulty to consume peroxides over a long term.

Generation of hydroxy radical occurs with an increased tendency in a vicinity of a three-phased interface of an air electrode, that is an environment where oxygen and platinum as an electrode catalyst exist and compounds tend to be oxidized, so that those methods in which an electrolyte membrane simply contains an oxidation-preventive compound, as described above, may have this compound also oxidized to be vanished, whether hydroxy radical is present or not, thus resulting in an inefficiency. Still less, that compound may react with hydroxy radical to generate an unstable radical or peroxide, which may act as an initiator of additional reaction for oxidation, causing deterioration of the electrolyte membrane.

This invention is made in view of such points. It is an object of the invention to provide a fuel cell system and a solid polymer electrolyte membrane with an excellent tolerance.

A first invention is a fuel cell system characterized by a fuel cell having a solid polymer electrolyte membrane, and an antioxidant residing in or contacting the solid polymer electrolyte membrane, for inactivating active oxygen.

A second invention is a solid polymer electrolyte characterized by a compound having a redox cycle, where it acts as a reducing agent in a range of potentials lower than a redox potential of hydroxy radical and as an oxidizing agent in a range of potentials higher than a redox potential where hydrogen peroxide acts as a reducing agent.

As a third invention, a fuel cell comprises a solid polymer electrolyte according to the second invention.

As a fourth invention, a fuel cell vehicle has mounted thereon a fuel cell system according to the first invention.

BRIEF DESCRIPTION OF THE DRAWINGS

FIG. 10 is a diagram of formulas of exemplary compounds.

BEST MODE FOR CARRYING OUT THE INVENTION

There will be described below details of a fuel cell system and a solid polymer electrolyte according to the invention, in accordance with their modes of embodiment.

(Fuel Cell System)

Figure 1:
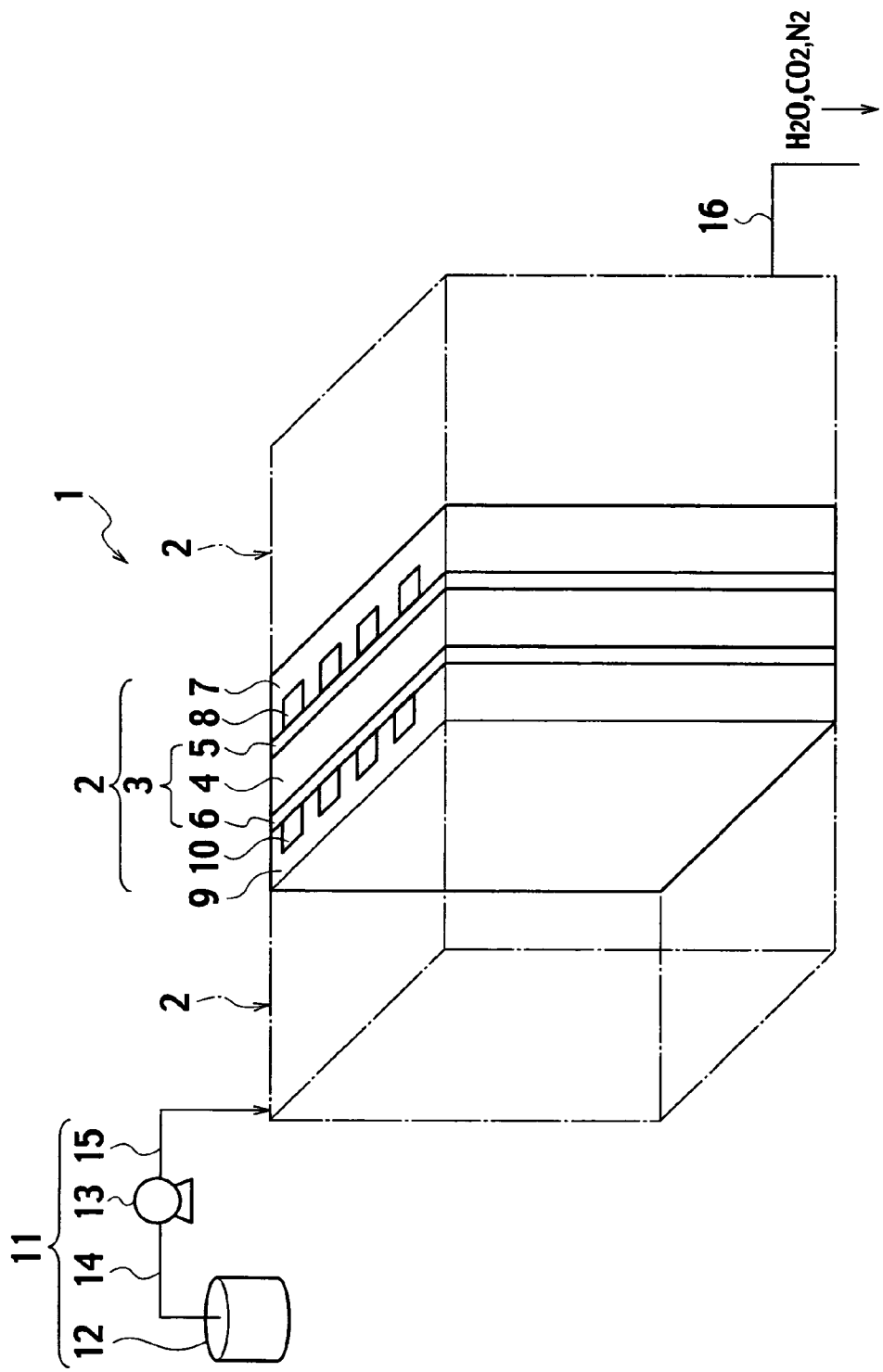
FIG. 1 is a diagram generally illustrating a mode of embodiment of a fuel cell system according to the invention.

According to a mode of embodiment of the invention, the fuel cell system is characterized by a fuel cell having an electrode, and an antioxidant residing in or contacting the electrode, for inactivating active oxygen. The fuel cell system taken now as an example of the invention is a solid polymer electrolyte type that employs, as its electrolyte membrane, a solid polymer electrolyte membrane. FIG. 1 is a diagram generally illustrating a mode of embodiment of the fuel cell system according to the invention. According to this mode of embodiment, the fuel cell system is generally made, as illustrated in FIG. 1, by a fuel cell 1, and an antioxidant supply system 11 disposed outside the fuel cell 1 and configured to supply the fuel cell 1 with an antioxidant to be brought into contact with electrodes in the fuel cell 1, for inactivation of active oxygen therein.

As illustrated in FIG. 1, the fuel cell 1 constituting the fuel cell system according to this mode of embodiment includes a fuel cell stack (not shown) configured as a lamination of a plurality of unit cells 2 each serving as a fundamental unit for power generation by electrochemical reactions, while the lamination has end flanges (not shown) fit on its both ends and connected at their peripheral parts by tie bolts (not shown). Each unit cell 2 comprises a membrane electrode assembly 3 comprising a solid polymer electrolyte membrane 4, and an air electrode 5 and a fuel electrode 6, with the solid polymer electrolyte membrane 4 in between, an air electrode side separator 7 disposed on the air electrode 5 side of the membrane electrode assembly 3, cooperating with the membrane electrode assembly 3 to have air channels defined therebetween, and a fuel electrode side separator 9 disposed on a surface at the fuel electrode 6 side of the membrane electrode assembly 3, cooperating with the membrane electrode assembly 3 to have fuel gas channels 10 defined therebetween.

As the solid polymer electrolyte membrane 4 in unit cell 2, there may be employed a film of perfluorocarbon polymer having sulfonate group (trade name: Nafion® 112 by Du Pont Co., U.S.A.), and the like. The membrane electrode assembly 3 is configured with catalytic layers having platinum catalyst supported by carbon, of which one is joined as the air electrode 5 to either side of the solid polymer electrolyte membrane 4, and the other, as the fuel electrode 6 to the opposite side.

The air electrode side separator 7 and the fuel electrode side separator 9 are configured as plate-shaped carbon or metal members, which have gas channels and cooling water channels formed in surfaces thereof. The air channels 8 are formed between the air electrode 5 and the air electrode side separator 7, to supply the air electrode 5 with air as a reaction gas. The fuel gas channels 10 are formed between the fuel electrode 6 and the fuel electrode side separator 9, to supply the fuel electrode 6 with hydrogen as a reaction gas. The fuel gas channels 10 are adapted to serve as paths for moisture supplement by humidification of fuel gas, and the air channels 8 are adapted to serve as paths for removal of produced water, as well. Between the electrode 5, 6 and the separator 7, 9, there may be interposed an adequate gas diffusion layer made of; e.g., carbon paper, unwoven carbon cloth, etc.

In each unit cell 2 of the solid polymer electrolyte type fuel cell 1 configured as described, the air channels 8 and the fuel gas channels 10 are respectively supplied with air and hydrogen gas, whereby air and hydrogen gas are fed to the air electrode 5 and the fuel electrode 6, respectively, causing reactions shown by formulas (B1) and (B2) below.

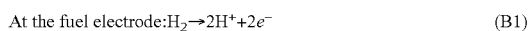

At the fuel electrode: $H_2 \rightarrow 2H^+ + 2e^-$ (B1)

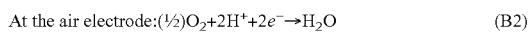

At the air electrode: $(\frac{1}{2})O_2 + 2H^+ + 2e^- \rightarrow H_2O$ (B2)

Figure 3:
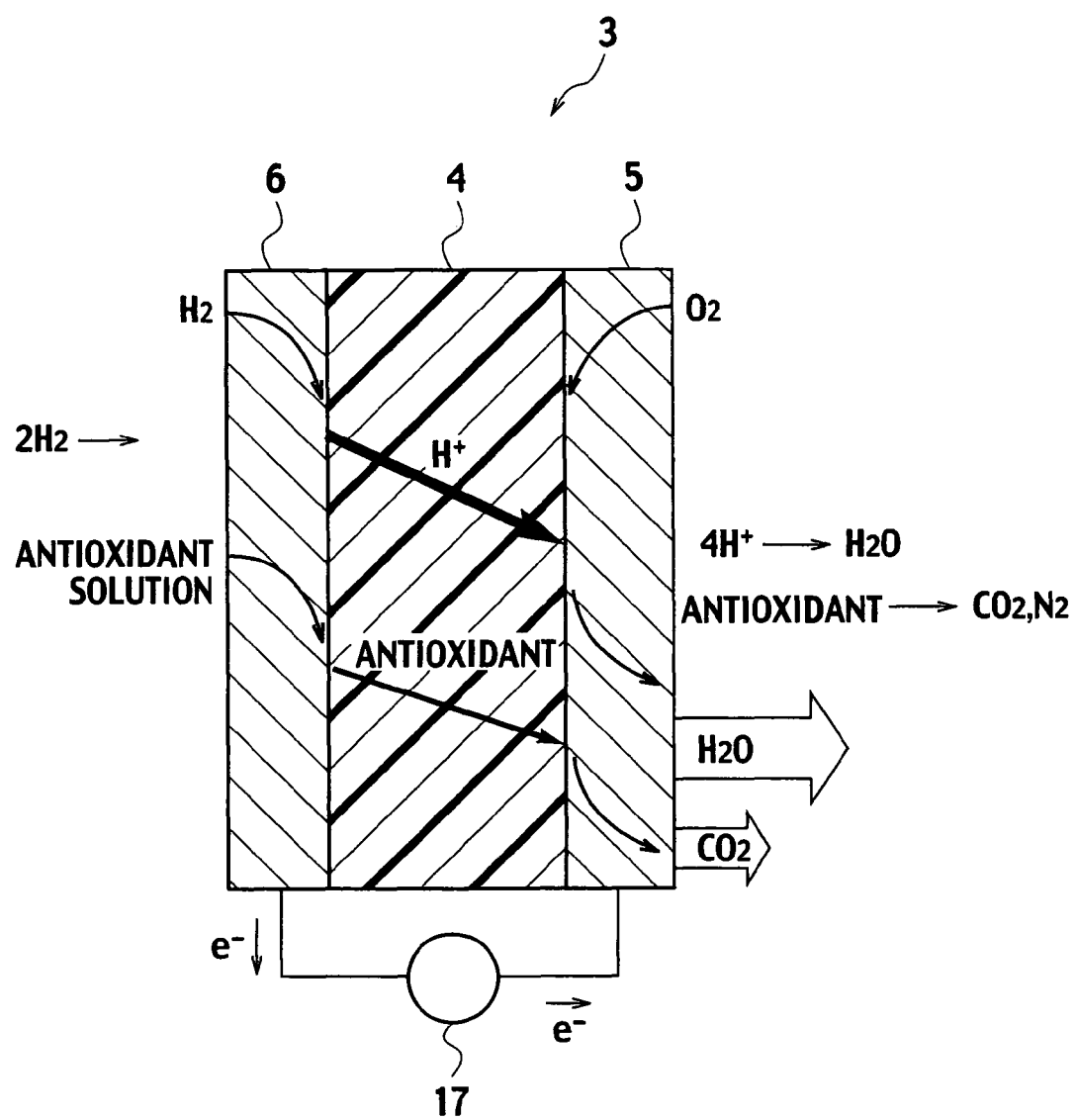
FIG. 3 is a diagram illustrating transfer of materials in a membrane-e rode assembly constituting the unit cell.

As illustrated in FIG. 3, with hydrogen gas fed to the fuel electrode 6, the reaction of formula (B1) develops, generating H⁺ (proton) and e⁻ (electron). H⁺ is hydrated to move through the solid polymer electrolyte membrane 4 to the air electrode 5, where it reacts to e- and oxygen gas of air fed thereto, so that the reaction of formula (B2) develops, producing water. With an electromotive force then produced, electrons generated at the fuel electrode 6 are conducted to the air electrode 5, via an external circuit 17 shown in FIG. 3.

Such being the case, the reaction at the air electrode 5 appears as a generation of water by four-electron reduction of molecular oxygen ($O_2$). This four-electron reduction of oxygen accompanies concurrent side reactions that generate free radical, such as superoxide anion ($O_2^-$) as a one-electron reduction body of oxygen, hydroperoxy radical (.OOH) as a conjugate acid of superoxide, hydrogen peroxide ($H_2O_2$) as a two-electron reduction body, and hydroxy radical (.OH) as a three-electron reduction body. Generation mechanisms of those free radicals are considered to be complex reactions by way of such elementary reaction processes as shown by formulas (B3) to (B7) below.

$$O_2 + e^- \rightarrow O_2^- \tag{33}$$

$$O_2^- + H^+ \rightarrow .OOH \tag{B4}$$

$$O_2 + 2H^+ + 2e^- \rightarrow H_2O_2 \tag{B5}$$

$$H_2O_2 + H^+ + e^- \rightarrow H_2O + .OH \tag{B6}$$

$$H_2O_2 \rightarrow 2.OH \tag{B7}$$

Generated free radicals are considered to be reduced finally to water, by way of such elementary reaction process as shown by formulas (B8) to (B10) below, where E° is a standard redox potential given in terms of NHE (normal hydrogen electrode).

$$.OOH + H^+ + e^- \rightarrow H_2O_2, E° = 1.50 \text{ V} \tag{B8}$$

$$H_2O_2 + 2H^+ + 2e^- \rightarrow 2H_2O, E° = 1.77 \text{ V} \tag{B9}$$

$$.OH + H^+ e^- \rightarrow H_2O, E° = 2.85 \text{ V} \tag{B10}$$

Now controversial is hydroxy radical that has a redox potential as high as 2.85V, and is strong in oxidizability. Hydroxy radical is most reactive among free radicals, and has a very short life of one millionth second. As the oxidizability is strong, hydroxy radical reacts with another molecule, unless it is promptly reduced Most controversial cases of oxidative degradation may have been caused by hydroxy radical. Generation of hydroxy radical is maintained by way of formulas (B3) to (B7) during power generation of fuel cell. Hydroperoxy radical and hydrogen peroxide, though weaker in oxidizability than hydroxy radical, return to water by ways of processes that may generate hydroxy radical. Like this, the generation of hydroxy radical continues semipermanently, so long as power is generated in a solid polymer electrolyte type fuel cell. The solid polymer electrolyte membrane may thus be deteriorated, unless the solid polymer electrolyte type fuel cell is continuously supplied with a compound that can inactivate hydroxy radical. According to this mode of embodiment, the fuel cell system has an antioxidant supply system 11 installed outside a fuel cell 1, for supplying an antioxidant to the fuel cell 1 of a proton-exchange membrane type, so that even when power is generated at the fuel cell 1, continuously generating active oxygen, the antioxidant can be supplied from outside the fuel cell, besides hydrogen ion or hydrogen acting as fuel, in a manner where it is uninvolved in the fuel cell reaction, allowing a successful inactivation and elimination of active oxygen, with a resultant prevention of deterioration of the solid polymer electrolyte membrane. Further, an efficient inactivation of active oxygen can be maintained by the external supply of antioxidant, even in an environment where the antioxidant tends to be oxidized.

Figure 2:
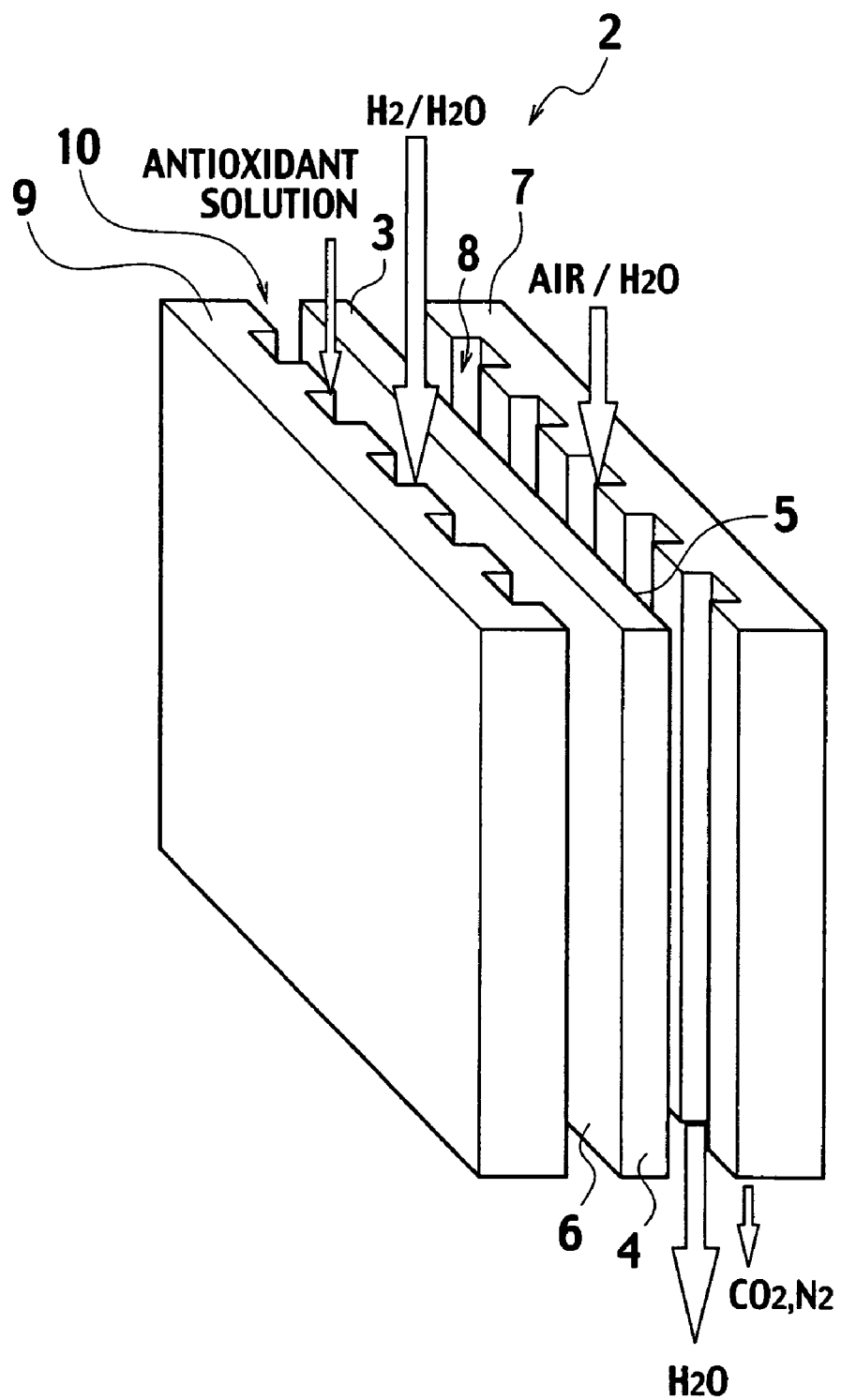
FIG. 2 is an exploded perspective view of a unit cell of a fuel cell constituting the fuel cell system according to the invention.

In view of the generation of active oxygen that continues semipermanently so long as power is generated in a solid polymer electrolyte type fuel cell, it should be effective to continuously supply antioxidant as an antioxidant solution from air electrode or fuel electrode. The supply may preferably be made from the fuel electrode 9 side of the fuel cell 1. In the case of an antioxidant to be supplied from the fuel electrode 9 side, the antioxidant supply system 11 is configured, as illustrated in FIG. 1, with e.g. an antioxidant solution tank 12 having sealed therein a solution of the antioxidant, a liquid feed pump 13 for feeding the antioxidant solution to the fuel electrode 6 side of the fuel cell 1, an antioxidant solution line 14 for interconnection between the antioxidant solution tank 12 and the liquid feed pump 13, and an antioxidant supply line 15 for interconnection between the liquid feed pump 13 and fuel gas channels 10. In the fuel cell 1, the air electrode side separator 7 and the fuel electrode side separator 9 have air channels 8 and fuel gas channels 10 formed in surfaces thereof for supplying air and hydrogen as reaction gases, respectively, as described. The reaction gases may be humidified by bubblers (not shown), and pass air channels 8 and fuel gas channels 10, as illustrated in FIG. 2, which is an exploded perspective view of a unit cell of a fuel cell constituting the fuel cell system. The antioxidant solution is then fed by drive power of the liquid feed pump 13, from the antioxidant solution tank 12 to a fuel gas channel 10, via antioxidant solution line 14 and antioxidant supply line 15. The antioxidant solution fed to fuel gas channel 10 is diffused in the solid polymer electrolyte membrane 4, moving from the fuel electrode 6 side to the air electrode 5 side, as illustrated in FIG. 3, which is a diagram illustrating transfer of materials in a membrane-electrode assembly constituting the unit cell. As a result, the antioxidant is uniformly dispersed within the air electrode 5, depending on a gradient of concentration.

Figure 4:
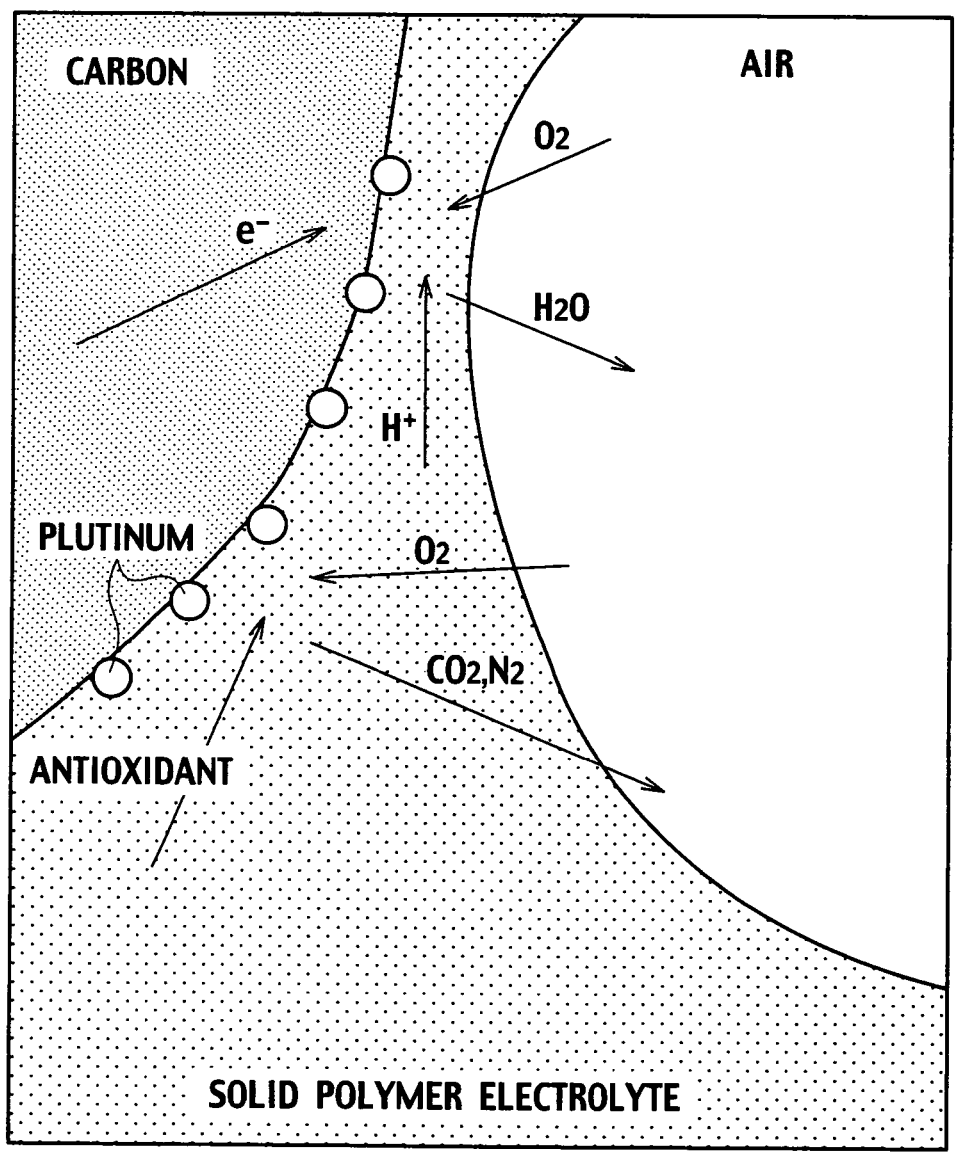
FIG. 4 is a schematic diagram illustrating a three-phased interface in an air electrode.

Such being the case, it is desirable to supply an antioxidant as an antioxidant solution from the fuel electrode 6 side, which is because of the possibility of occurrence of active oxygen, such as hydroxy radical, that increases within a region near a three-phase interface at the air electrode. As illustrated in FIG. 4 that is a schematic diagram illustrating a three-phase interface at an air electrode, there is platinum residing as electrode catalyst, as well as oxygen in the air, in a region vicinal to the three-phase interface at the air electrode, which region thus constitutes an extremely oxidizable environment. Therefore, if an antioxidant is supplied from the air electrode side, the antioxidant itself may be oxidized and vanished at a three-phase interface at the air electrode, resulting in an inefficient inactivation of active oxygen, whether hydroxy radical is present or not.

The air channels 8 of the air electrode side separator 7 described serve as channels for removal of produced water, as well. Overfed and unused antioxidant, as well as antioxidant having been changed to an oxidant by inactivation of active oxygen, is oxidized by catalyst on a three-phase interface, and changed to $CO_2$, $H_2O$, $N_2$, etc. which can thus be discharged from a discharge line 16 shown in FIG. 1, together with produced water. The antioxidant, as it has been changed by reaction with active oxygen into an oxidant, unstable radical or peroxide, is thus kept from acting as an initiator of additional oxidation, causing a deterioration of electrolyte membrane.

Although, in preparation of an antioxidant solution, one may be unfastidious about a low solubility for a uniform dispersion in the air electrode, the solubility to a solvent should be hung on as being important. In an insoluble case, inhibited entry or exit of hydrogen radical causes an insufficient exhibition of the effect to inactivate active oxygen. A solvent should thus be selected for dissolution of antioxidant, using an organic solvent solely or in combination with water, as a mixed solvent, as necessary. The use of an organic solvent should however be checked for no adverse affect to the performance of power generation. It therefore is desirable from the view point of generation performance to make an aqueous solution, if the antioxidant is dissoluble.

The antioxidant may preferably be a hydrocarbon system compound composed of four elements, being carbon, oxygen, nitrogen, and hydrogen. Other elements else than carbon, oxygen, nitrogen, and hydrogen may poison platinum in electrode, adversely affecting a power generation performance of the fuel cell. Base metal elements may promote generation of hydroxy radical. To cover an application including oxidation in and discharge from air electrode, the antioxidant may preferably be composed simply of the four elements being carbon, oxygen, nitrogen, and hydrogen, as a hydrocarbon system compound to be decomposed into $CO_2$, $H_2O$, $N_2$, and the like. Hydroxy radical has a very high redox potential so that, thermodynamically, most hydrocarbon compounds composed of the above-noted four elements may act as a reductant on hydroxy radical. Kinetically, those compounds may be different in reducing ability. In view of high reactivity of hydroxy radical, it is desirable for the antioxidant to be kinetically faster in reducing reaction It also is important to consider the stability of the oxidant the antioxidant is to be oxidized to, that is, the compound to be obtained when it is oxidized by active oxygen. If the oxidant of antioxidant is unstable, the oxidized substance may act as an initiator of new side reaction, promoting the deterioration of electrolyte membrane. As compounds kinetically relatively fast and chemically stable in the state of oxidant, there may be taken, for example, secondary alcohol system compounds having hydroxyl group, such as isopropanol, 2-butanol, and cyclohexanol, aromatic series having hydroxyl group, such as phenols, phenol, cresol, picric acid, naphthol, and hydroquinone, an ether system compounds, such as dioxane, tetrahydrofuran, and benzyl methyl ether; and nitrogen-containing system compounds, such as propylamine, diethylamine, acetamide, aniline, and N-hydroxy system compound.

In selection of such compounds, the stability, durability, and heat resistance of compound are important. In particular, the stability and durability of compound are most important for the inactivation of active oxygen to be maintained to use a fuel cell over a long term. Preferably, hydrolysate of oxidant of antioxidant should also be chemically stable. For inactivation of active oxygen, it should be effective if the antioxidant supplied to the fuel electrode be kept stable till its discharge from the air electrode. On the other hand, antioxidant used for inactivation of active oxygen is discharged together with produced water, as described, and for a long-term operation of the system, the hydrolysate of antioxidant may preferably be stable without generating radicals. For the operating temperature of fuel cell to be within a range of 80 to 90° C. in normal run, and for the heat resistance of electrolyte membrane to be enhanced in future, the antioxidant may preferably be stable in heat resistance up to a temperature about 120° C.

Preferably, the compound for inactivating active oxygen should be such a compound as having an oxidation potential of 2.85V or less that can be oxidized by hydroxy radical at least promptly. More preferably, not simply being oxidizable, but should it also be redox-reversible by an oxidation-reduction cycle where, as it is oxidized, the oxidant is reduced, whereby it comes back to an original for The redox potential may preferably be greeter than 0.68V (NHE) and smaller than 1.77V (NHE). 0.68V (NHE) is a potential where hydrogen peroxide acts as a reducing agent, and hence provision of an equivalent or higher potential allows the oxidant of the compound in concern to oxide hydrogen peroxide, returning to the original form. On the other hand, 1.77V (NHE) is a potential where hydrogen peroxide acts as an oxidizing agent, and for equivalent or higher oxidation potentials, the oxidant of the compound may act as a new oxidizing agent, causing oxidation of electrolyte membrane and the like.

For the oxidizability of compound to be decreased, the redox potential may preferably be 1.00V or less. A fluorine system film may be used as an electrolyte membrane. In this case, the potential where the fluorine system electrolyte membrane is to be oxidized ranges 2.5V or more, and with the oxidizability of 1.77V, the electrolyte membrane will not be oxidized, causing no problem. A hydrocarbon system film may be used as an electrolyte membrane. In this case, the hydrocarbon system electrolyte membrane may be oxidized when the redox potential of added compound exceeds 1.00V. Substituting typical organic compounds therefor, benzene is to be oxidized at 2.00V, toluene is at 1.93V, and xylene is at 1.58V. Hydrocarbon system electrolyte membrane is thus oxidized at a lower redox potential than fluorine system electrolyte membrane. Therefore, by setting the redox potential within a range of 1.00V or less, the electrolyte membrane can be kept from being oxidized, allowing for a long service, even in the use of a hydrocarbon system film. It is noted that the actual redox potential (RHE: real hydrogen electrode) may vary, depending various conditions, such as pH and temperature, and the selection may preferably be made within a matching range.

The reversibility of redox is important for the following reasons. For fuel cells, preventing oxidation, while generating power, needs consideration to the electrolytic oxidation. A situation is now supposed, in which a compound employed as an antioxidative substance for reducing active oxygen to water is supplied to an electrolyte, from the side of an electrode. The antioxidative substance may then be oxidized by electrolytic oxidation at the electrode, thus having an oxidized state to enter the electrolyte. In particular, for compounds under 1.23V (NHE) that is a theoretical voltage of the solid polymer electrolyte type fuel cell, the possibility of electrolytic oxidation on the way to the electrolyte is great. For any compound, unless it has a reversible redox-ability, the function as an antioxidative substance is lost when the compound is oxidized by electrolytic oxidation. If the compound has a reversible redox-ability, it will be regenerated, by hydrogen peroxide as a reducing agent, for example, as a reductant that again functions as an antioxidative substance. From such point of view, as well, the amount of a compound to be supplied as antioxidant can be reduced, if the compound has a reversible redox-ability. Moreover, in the use of an antioxidant that has a reversible redox-ability, the antioxidant may be positively oxidized by electrolytic oxidation, to thereby implement a method of inactivating hydrogen peroxide without detouring via hydroxy radicals, allowing for the more effective inactivation of active oxygen.

The antioxidant may preferably comprise a compound represented by a general formula (I) below

where $R_1$ and $R_2$ respectively denote elements of a set of arbitrary substituent groups mutually identical or different, and X denotes an oxygen atom or hydroxyl group. More preferably, $R_1$ and $R_2$ are combined with each other, to form a double bond, an aromatic ring, or a nonaromatic ring.

Further, this antioxidant may preferably comprise an imide compound represented by a general formula (II) below

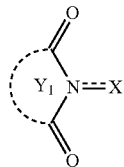

(II)

where a ring $Y_1$ comprises any ring of a set of 5-membered to 12-membered rings double-bonded, aromatic or nonaromatic.

The above-noted compound is supplied as an antioxidant to the proton-exchange membrane fuel cell, where it efficiently reduces hydroxyl radical to water, thereby suppressing a deterioration of electrolyte membrane, through an elementary process shown by formula (B11) below.

$$>NOH + \cdot OH \rightarrow >NO \cdot + H_2O \quad (B11)$$

The supply of hydrogen causes generation of N-oxyl radical (>NO·), which draws out radical hydrogen from hydrogen peroxide, to return to an original form of hydroxyamine (>NOH), as shown by formula (B12) below.

$$2(>NO \cdot) + H_2O_2 \rightarrow 2(>NOH) + O_2 \quad (B12)$$

Figure 5:
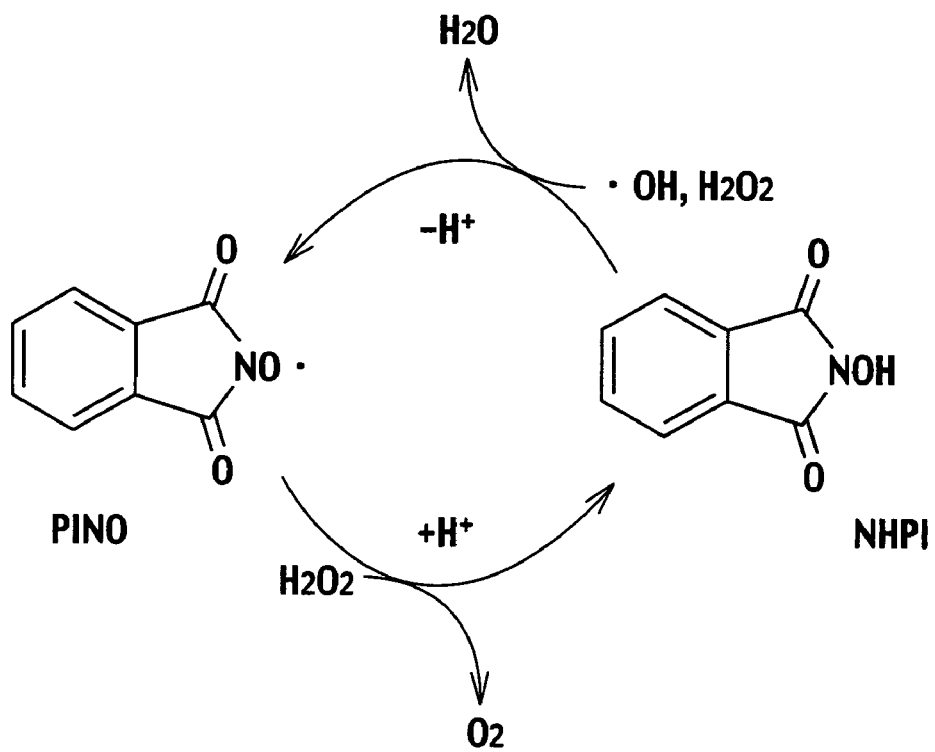
FIG. 5 is a diagram illustrating a mechanism for inactivation of active oxygen by NHPI.

FIG. 5 shows N-hydroxyphthalimide (NHPI) as a typical example of the compound having a hydroxy imide group, and phthalimide N-oxyl (PINO) as an oxidant of NHPI in which NHPI is changed in a radical form, and illustrates a mechanism in which hydroxyl radical as an active oxygen as well as hydrogen peroxide is inactivated. As shown in FIG. 5, NHPI acts as a reducing agent on hydroxyl radical, generating PINO and water, and PINO reacts with hydrogen peroxide to return to NHPI. At this time, PINO acts as an oxidizing agent on hydrogen peroxide, inactivating hydrogen peroxide into oxygen. Like this, a redox cycle turns between NHPI and PINO, enabling the use as an antioxidant to be repeated many times, which allows inactivation of active oxygen over a long term, allowing for implementation of a fuel cell system with maintained durability. In addition, as the redox cycle turns, the antioxidant having reduced hydroxyl radical will not constitute an initiator of additional side reactions.

Further, the above-noted compound may preferably comprise an imide compound represented by a general formula (III) below

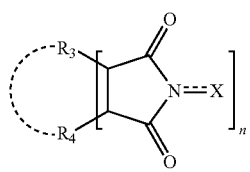

(III)

where $R_3$ and $R_4$ respectively denote elements of a set of hydrogen atoms, halogen atoms, alkyl groups, aryl groups, cycloalkyl groups, hydroxyl groups, alkoxyl groups, carboxyl groups, alkoxycarbonyl groups, or acyl groups, mutually identical or different, X denotes an oxygen atom or hydroxyl group, and n denotes an integer within 1 to 3.

In the compound represented by the general formula (III), substituents $R_3$ and $R_4$ may include iodine, bromine, chlorine, and fluorine as halogen atoms. The alkyl groups may include those linear chain or branch chain alkyl groups which have carbon numbers within a range of 1 to 10 or near, for example, a methyl, an ethyl, a propyl an isopropyl a butyl, an isobutyl a sec-butyl a t-butyl, a pentyl a hexyl a heptyl an octyl and a decyl group, and the like. They may preferably have carbon numbers within a range of 1 to 6 or near, or more preferably, be as lower alkyl groups as carbon numbers within a range of 1 to 4 or near.

The aryl groups may include, for example, a phenyl group, a naphthyl group, etc. The cycloalkyl groups may include a cyclopentyl a cyclohexyl and a cyclooctyl group, and the like. The alkoxy groups may include, for example, a methoxy, an ethoxy, a propoxy, an isopropoxy, a butoxy, an isobutoxy, a t-butoxy, a pentyloxy, and a hexyloxy group, and the like, that have carbon numbers within a range of 1 to 10 or near, preferably, within a range of 1 to 6 or near, or more preferably, be as lower alkoxy groups as carbon numbers within a range of 1 to 4 or near.

The alkoxycarbonyl groups may include those alkoxycarbonyl groups which have carbon numbers of their alkoxy parts within a range of 1 to 10 or near, for example, a methoxycarbonyl, an ethoxycarbonyl a propoxy carbonyl, an isopropoxy carbonyl a butoxycarbonyl an isobutoxycarbonyl a t-butoxycarbonyl a pentyloxy carbonyl a hexyloxy carbonyl group, and the like. They may preferably have carbon numbers of alkoxy parts within a range of 1 to 6 or near, or more preferably, be as lower alkoxycarbonyl groups as carbon numbers within a range of 1 to 4 or near.

The acyl groups may include those acyl groups which have carbon numbers within a range of 1 to 6 or near, for example, a formyl, an acetyl, a propionyl, a butyryl, an isobutyryl, a valeryl, an isovaleryl, a pivaloyl group, and the like.

The substituents $R_3$ and $R_4$ may be mutually identical or different. In the compound represented by the general formula (III), the substituents $R_3$ and $R_4$ may be combined with each other to form a double bond, an aromatic ring, or a nonaromatic ring. Among them, the aromatic ring or nonaromatic ring may preferably be any one kind of ring of 5-membered to 12-membered rings, or more preferably, of roughly 6-membered to 10-membered rings, and these may be heterocycles or fused heterocycles, or preferably, hydrocarbon rings.

As such rings, there may be taken, for example: nonaromatic hydrocarbon rings, such as cycloalkane rings, e.g., cyclohexane ring, and cycloalkene rings, e.g. cyclohexene ring; nonaromatic bridging rings, such as bridging type hydrocarbon rings, e.g. five-norbornene ring, and aromatic rings, such as benzene rings and naphthalene rings. Those rings may have substituent groups.

Further, in compounds represented by the general formula (III), as compounds to be more preferable in particular from view points of the compound's stability, durability, and solubility to electrolyte membrane, there may be employed those in which $R_3$ and $R_4$ are mutually combined to form an aromatic or nonaromatic one of 5-membered to 12-membered rings, or those in which $R_3$ and $R_4$ are mutually combined to provide a cycloalkane ring with a substituent, a cycloalkene ring with a substituent, or a bridging type hydrocarbon ring with a substituent.

In particular from the points of compound's stability, durability, and solubility to electrolyte membrane, the compound represented by the general formula (III) may preferably comprise a compound represented by one of general formulas (IVa) to (IVf) below

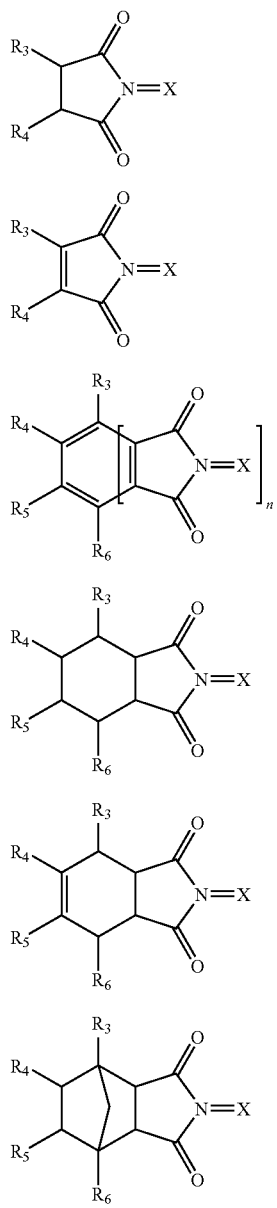

where $R_3$ to $R_4$ respectively denote elements of a set of hydrogen atoms, halogen atoms, alkyl groups, hydroxyl groups, alkoxyl groups, carboxyl groups, alkoxycarbonyl groups, acyl groups, nitro groups, cyano groups, or amino groups, mutually identical or different, and n denotes an integer within 1 to 3.

The substituents $R_3$ to $R_6$ may include as alkyl groups, those of like alkyl groups to the before-mentioned alkyl groups, which have carbon numbers within a range of 1 to 6 or near, as alkoxy groups, like alkoxy groups to the before-mentioned alkoxy groups, in particular those lower alkoxy groups which have carbon numbers within a range of 1 to 4 or near, and as alkoxycarbonyl groups, like alkoxycarbonyl groups to the before-mentioned alkoxycarbonyl groups, in particular those lower alkoxycarbonyl groups whose alkoxy parts have carbon numbers within a range of 1 to 4 or near.

Substituents $R_3$ to $R_6$ may include, as acyl groups, like acyl groups to the before-mentioned acyl groups, in particular those acyl groups which have carbon numbers within a range of 1 to 6 or near. As halogen atoms, there may be cited fluorine, chlorine, and bromine atoms. As for substituents $R_3$ to $R_6$ they may typically be elements of a set of hydrogen atoms, lower alkyl groups having carbon numbers within a range of 1 to 4 or near, carboxyl groups, nitro groups, and halogen atoms, in most cases.

In view of the availability, synthesis to be facile, and cost of compound, more desirable imide compounds may preferably comprise an imide compound selective from a set of N-hydroxy succinic acid imide, N-hydroxy maleic acid imide, N-hydroxy hexahydrophthalic acid imide, N,N'-dihydroxycyclohexane tetracarboxylic acid imide, N-hydroxyphthalimide, N-hydroxy tetrabromophthalic acid imide, N-hydroxy tetrachlorophthalic acid imide, N-hydroxy fatty acid imide, N-hydroxy himic acid imide, N-hydroxy trimellitic acid imide, N,N'-dihydroxy pyromellitic acid imide, and N,N'-dihydroxynaphthalene tetracarboxylic acid imide. This compound may be disposed as a coexisting catalyst in the electrolyte membrane. Such an imide compound may be prepared by a standard imidizing reaction in which a correspondent acid anhydride reacts with hydroxylamine $NH_2OH$, whereby its acid anhydride radical has an opened ring, which is closed for imidization.

The compound resented by the general formula (II) may comprise such a compound that has an N-substitution cyclic imide frame, as represented by a general formula (V) below

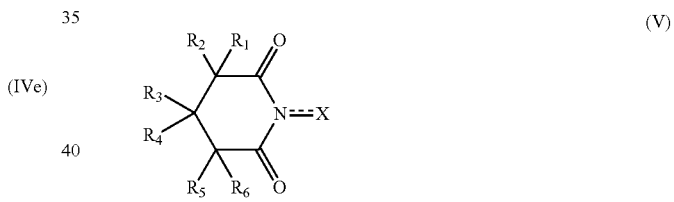

where X denotes an oxygen atom or hydroxyl group, $R_1$ to $R_6$ respectively denote elements of a set of hydrogen atoms, halogen atoms, alkyl groups, aryl groups, cycloalkyl groups, hydroxyl groups, alkoxy groups, carboxyl groups, substituent carbonyl groups, acyl groups, or acyloxy groups, mutually identical or different. At least two of $R_1$ to $R_6$ may be combined with each other to form a double bond, an aromatic ring, or a nonaromatic ring. Of the rings, at least one may have an N-substitution cyclic imide group.

In the N-substitution cyclic imide frame, both 5-membered ring and 6-membered ring are hydrolyzable as shown by formulas (B13) and (B14) below, while the 6-membered ring is slower in hydrolysis, and higher in hydrolysis resistance, than the 5-membered ring.

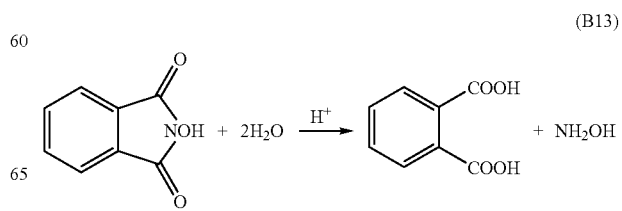

-continued (B14)

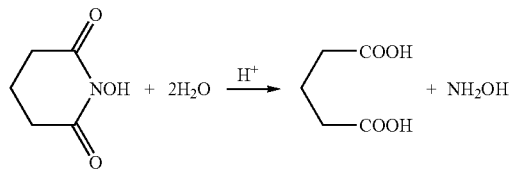

Therefore, if the compound having the N-substitution cyclic imide frame is a cyclic imide of a 6-membered ring, this can be reused many times as a redox catalyst, thus allowing the consumption of catalyst to be the more reduced.

It is noted that the alkyl groups may include linear chain or branch chain alkyl groups of carbon numbers within a range of 1 to 10 or near, for example, a methyl, an ethyl, a propyl, an isopropyl, a butyl, an isobutyl, a sec-butyl, a t-butyl, a pentyl, a hexyl, a heptyl, an octyl, and a decyl group, and the like. They may preferably have carbon numbers within a range of 1 to 6 or near, or more preferably, be as lower alkyl groups as carbon numbers within a range of 1 to 4 or near.

Further, the aryl groups may include a phenyl group, a naphthyl group, etc., and the cycloalkyl groups may include a cyclopentyl, a cyclohexyl, and a cyclooctyl group, and the like. The alkoxy groups may include, for example, a methoxy, an ethoxy, a propoxy, an isopropoxy, a butoxy, an isobutoxy, a t-butoxy, a pentyloxy, and a hexyloxy group, and the like, having carbon numbers within a range of 1 to 10 or near, preferably, within a range of 1 to 6 or near, or more preferably, be as lower alkoxy groups as carbon numbers within a range of 1 to 4 or near.

The alkoxycarbonyl groups may include those alkoxycarbonyl groups whose alkoxy parts have carbon numbers within a range of 1 to 10 or near, for example, a methoxycarbonyl, an ethoxycarbonyl, a propoxy carbonyl, an isopropoxy carbonyl, a butoxycarbonyl, an isobutoxycarbonyl, a t-butoxycarbonyl, a pentyloxy carbonyl, and a hexyloxy carbonyl group, and the like. They may preferably have carbon numbers of their alkoxy parts within a range of 1 to 6 or near, or more preferably, be as lower alkoxycarbonyl groups as carbon numbers within a range of 1 to 4 or near.

The acyl groups may include those acyl groups which have carbon numbers within a range of 1 to 6 or near, for example, a formyl, an acetyl, a propionyl, a butyryl, an isobutyryl, a valeryl, an isovaleryl, and a pivaloyl group, and the like.

Further, in the compound represented by the general formula (V), at least two of $R_1$ to $R_6$ may preferably be combined with each other to form a double bond, or an aromatic or nonaromatic ring. Among them, the aromatic ring or the nonaromatic ring may preferably be any one kind of ring of 5-membered to 12-membered rings, or more preferably, about 6-membered to 10-membered rings, while the ring may be heterocycles or fused heterocycles. As such rings, there may be taken, for example, nonaromatic hydrocarbon rings, such as cycloalkane rings, e.g., cyclohexane ring, and cycloalkene rings, e.g. cyclohexene ring; nonaromatic bridging rings, such as bridging type hydrocarbon rings, e.g. five-norbornene ring, and aromatic rings, such as benzene rings and naphthalene rings. It is noted that those rings may have a substituent group.

In view in particular of the compound's stability, durability, and the like, the compound represented by the general formula (V) may preferably comprise a compound represented by one of general formulas (VIa) and (VIb) below

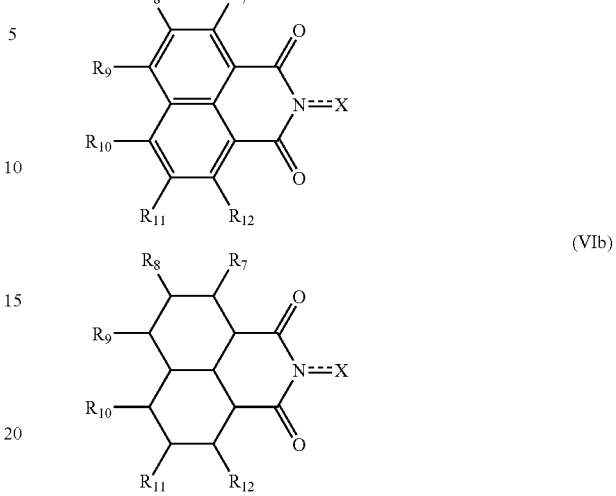

where $R_7$ to $R_{12}$ respectively denote elements of a set of hydrogen atoms, alkyl groups, hydroxyl groups, alkoxyl groups, carboxyl groups, alkoxycarbonyl groups, acyl groups, nitro groups, cyano groups, or amino groups, mutually identical or different.

The compound represented by one of the general formulas (V), (VIa) and (VIb) may preferably comprise at least one kind of imide compound selective from a set of N-hydroxyglutaric acid imide, N-hydroxy-1,8-naphthalene dicarboxylic acid imide, N-hydroxy-1,8-decalin dicarboxylic acid imide, N,N'-dihydroxy-1,8,4,5-naphthalene tetracarboxylic acid imide, N,N'-dihydroxy-1,8,4,5-decalin tetracarboxylic acid imide, and N,N',N''-trihydroxy isocyanuric acid imide.

The cyclic imide of 6-membered ring can be prepared by a standard imidizing reaction in which, for example, a correspondent acid anhydride of 6-membered ring reacts with hydroxylamine $NH_2OH$, whereby its acid anhydride radical has an opened ring, which is closed for imidization. This cyclic imide of 6-membered ring is disposed for a coexistence in the electrolyte membrane, like the cyclic imide of 5-membered ring, whereby elementary processes progress, as shown by formulas (B15) and (B16) below. And, simply upon an entry such as of hydroxyl radical or hydrogen peroxide into electrolyte membrane, the 6-membered imide ring supplies hydrogen radical, which efficiently reduces hydrogen peroxide, suppressing oxidation of the electrolyte membrane.

 (B15)

 (B16)

The supply of hydrogen generates N-oxyl radical (>NO.), which draws out hydrogen ion from hydrogen element or hydrogen peroxide, and returns to the original form of hydroxyimide (>NOH), as shown by formulas (B17) to (B19) below.

 (B17)

 (B18)

 (B19)

Figure 6:
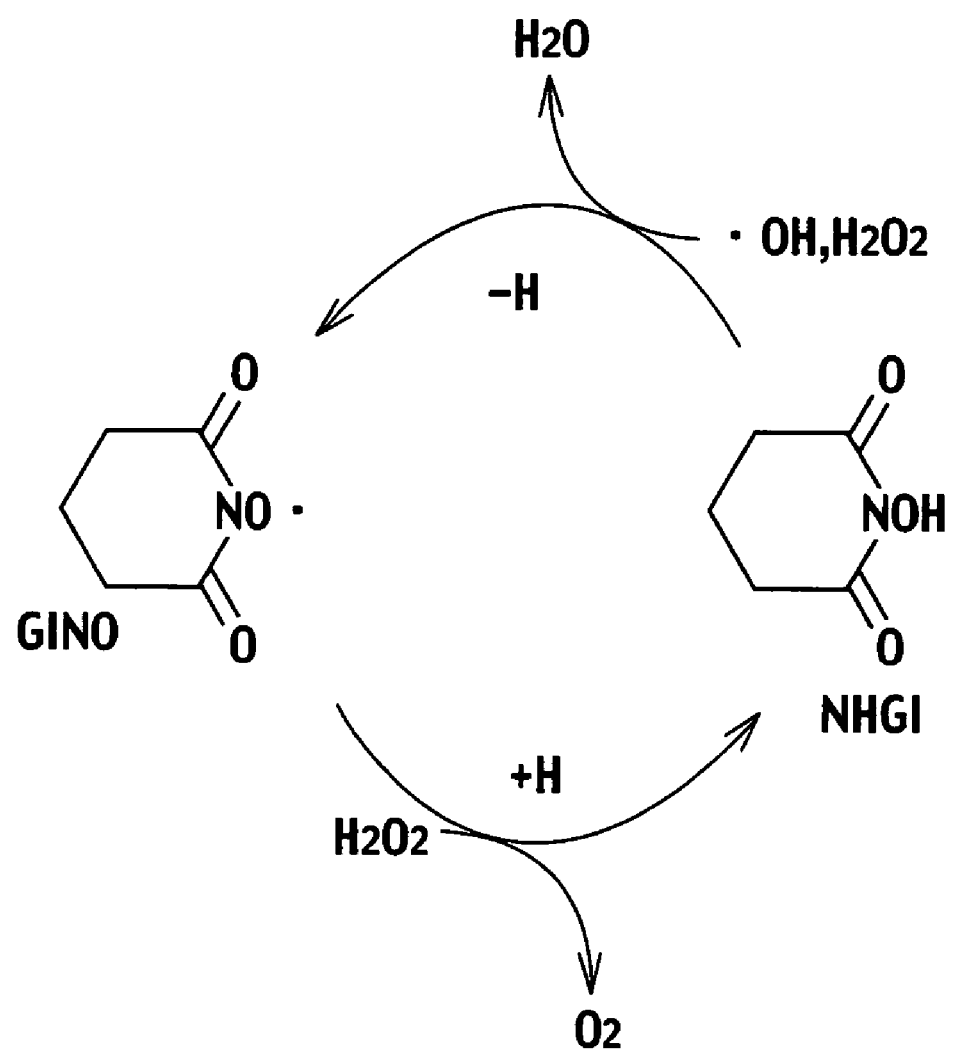
FIG. 6 is a diagram illustrating a mechanism for inactivation of active oxygen by NHGI.

FIG. 6 shows N-hydroxy glutaric acid imide (NHGI) as a typical example of the compound having a hydroxy imide group, and glutaric acid imide N-oxyl (GINO) as an oxidant of NHGI in which NHGI is changed in a radical form, and illustrates a mechanism in which a cycle turns between hydroxy imide group of NHGI and N-oxyl radical of GINO, thereby having hydroxy radical as well as hydrogen peroxide vanished over a long term. That is, NHGI acts as a reducing agent on hydroxyl radical or hydrogen peroxide, for reducing hydroxyl radical or hydrogen peroxide into water. On the other hand, GINO acts as an oxidizing agent on hydrogen peroxide, for oxidizing hydrogen peroxide into oxygen. Like this, a redox cycle turns between NHGI and GINO, concurrently vanishing hydroxy radical as well as hydrogen peroxide. In the N-substitution cyclic imide frame, the 6-membered ring is slower in hydrolysis, and higher in hydrolysis resistance, than the 5-membered ring, and hence, if the compound having the N-substitution cyclic imide frame is a cyclic imide of a 6-membered ring, this allows the consumption of catalyst to be the more reduced.

The compound represented by the general formula (I) may comprise a compound represented by a general formula (VII) below

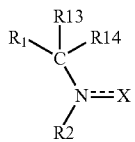

(VII)

where $R_{13}$ and $R_{14}$ each respectively denote an alkyl group, or an alkyl group substituted in part by an arbitrary radical, wherein $R_{13}$ and $R_{14}$ may be chained, ringed, or branched $R_{13}$ and $R_{14}$ may be mutually combined to form a ring, and may include oxygen and nitrogen atoms. The compound represented by the general formula (VII) may be continuously supplied, for inactivation of continuously generated active oxygen to suppress an oxidation of electrolyte membrane. In the compound represented by the general formula (VII), substituents $R_{13}$ and $R_{14}$ may include linear chain or branch chain alkyl groups of carbon numbers within a range of 1 to 10 or near, for example, a methyl, an ethyl a propyl, an isopropyl, a butyl an isobutyl a sec-butyl a t-butyl a pentyl, a hexyl, a heptyl, an octyl, and a decyl group, and the like. They may preferably have carbon numbers within a range of 1 to 6 or near, or more preferably, be as lower alkyl groups as carbon numbers within a range of 1 to 4 or near.

The compound represented by the general formula (VII) may preferably comprise a compound represented by a general formula (VII) below

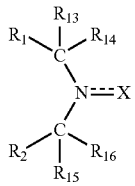

(VIII)

where $R_{13}$ to $R_{16}$ each respectively denote an alkyl group, or an alkyl group substituted in part by an arbitrary radical, wherein $R_{13}$ to $R_{16}$ may be chained, ringed, or branched. Among them, $R_{13}$ and $R_{14}$, or $R_{15}$ and $R_{16}$ may be mutually combined to form a ring, and they may include oxygen and nitrogen atoms. In the compound represented by the general formula (VII), substituents $R_{13}$ to $R_{16}$ may include linear chain or branch chain alkyl groups of carbon numbers within a range of 1 to 10 or near, for example, a methyl, an ethyl, a propyl, an isopropyl, a butyl, an isobutyl, a sec-butyl, a t-butyl, a pentyl, a hexyl, a heptyl, an octyl, and a decyl group, and the like. They may preferably have carbon numbers within a range of 1 to 6 or near, or more preferably, be as lower alkyl groups as carbon numbers within a range of 1 to 4 or near.

The compound represented by the general formula (VIII) may preferably comprise a compound represented by a general formula (IX) below

(IX)

where a ring $Y_2$ denotes a 5-membered or 6-membered ring formed by $R_{13}$ and $R_{14}$ mutually combined. As such rings, there may be taken, for example, nonaromatic hydrocarbon rings, such as cycloalkane rings, e.g., cyclohexane ring, and cycloalkene rings, e.g. cyclohexene ring, nonaromatic bridging rings, such as bridging type hydrocarbon rings, e.g. five-norbornene ring, and aromatic rings, such as benzene rings and naphthalene rings. It is noted that those rings may have a substituent group.

The compound represented by the general formula (IX) may preferably comprise a compound represented by a general formula (X) below

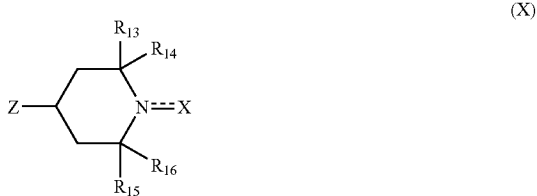

(X)

where Z denotes a kind of substituent selective from a set of alkyl groups, aryl groups, alkoxy groups, carboxyl groups, alkoxycarbonyl groups, cyano groups, hydroxyl groups, nitro groups, amino groups, and substituent groups including a hydrogen atom. For Z being an alkyl group, the an alkyl group may be substituted in part by an arbitrary radical, may be chained, ringed, or branched in part, and may include oxygen and nitrogen atoms. For Z being an aryl group, the aryl group may be substituted in part by an arbitrary radical, and may include oxygen and nitrogen atoms. The compound represented by the general formula (X) is hardly hydrolyzable, and may be continuously supplied, for inactivation of continuously generated active oxygen to suppress an oxidation of electrolyte membrane.

For substituent Z in the compound represented by the general formula (X), there may be taken alkyl groups, in particular those of like alkyl groups to the before-mentioned alkyl groups, which have carbon numbers within a range of 1 to 6 or near, while as aryl groups, there may be taken phenyl groups and naphthyl groups. There may be taken alkoxy groups, in particular those of like alkoxy groups to the before-mentioned alkoxy groups, which have carbon numbers within a range of 1 to 6 or near, and as carboxyl groups, those carboxyl groups which have carbon numbers within a range of 1 to 4 or near, for example. As alkoxycarbonyl groups, there may be taken those alkoxycarbonyl groups whose alkoxy parts have carbon numbers within a range of 1 to 10 or near, for example, a methoxycarbonyl, an ethoxycarbonyl, a propoxy carbonyl, an isopropoxy carbonyl, a butoxycarbonyl, an isobutoxycarbonyl, a t-butoxycarbonyl, a pentyloxy carbonyl, and a hexyloxy carbonyl group, and the like. They may preferably have carbon numbers of alkoxy parts within a range 1 to 6 or near, or more preferably, be as lower alkoxy-carbonyl groups as carbon numbers within a range of 1 to 4 or near.

Figure 7:
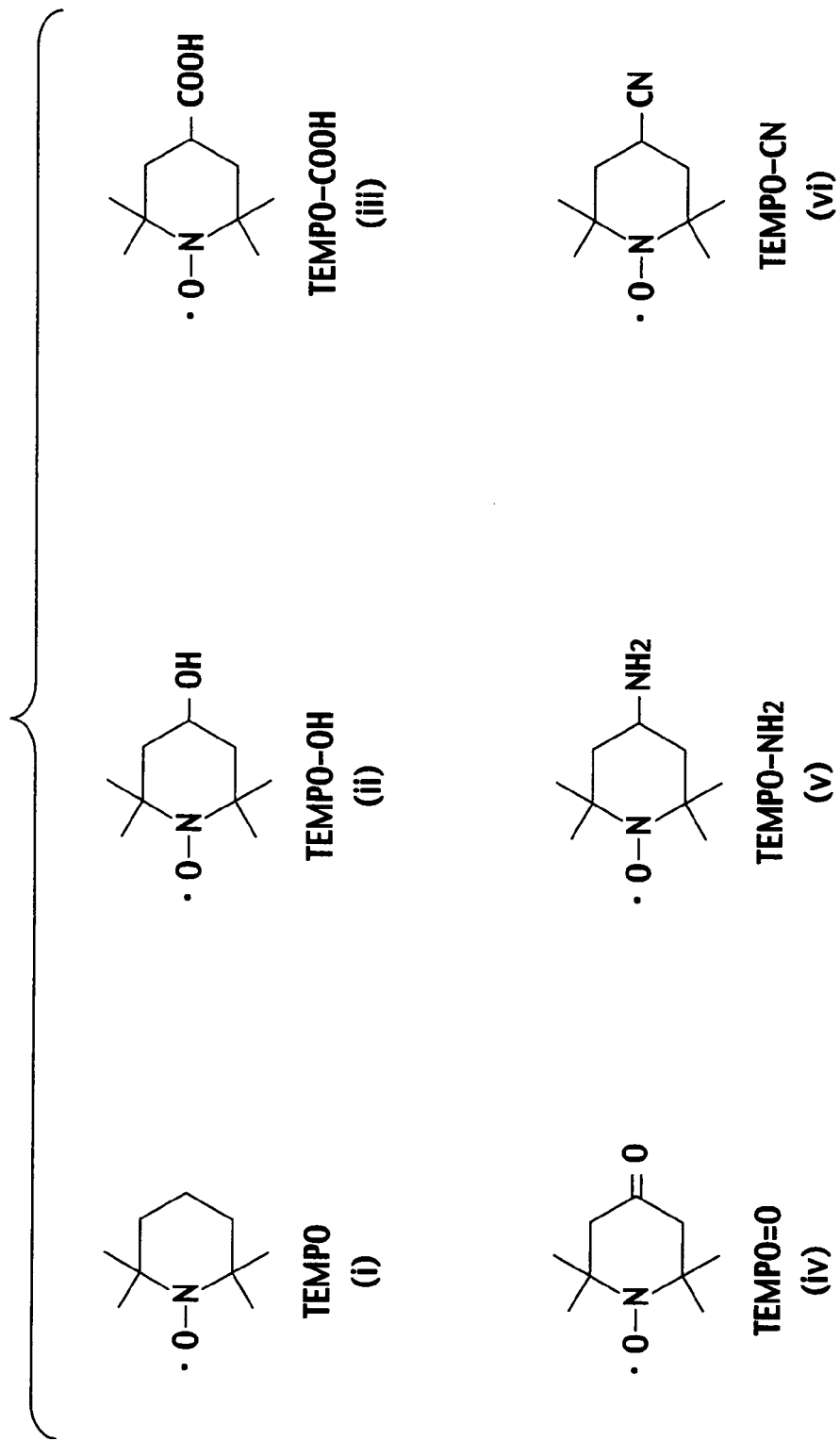
FIG. 7 is a diagram of formulas of exemplary compounds.

As an example of compound represented by the general formula (X), there is now taken TEMPO (2,2,6,6-tetramethylpiperidine-1-oxyl). FIG. 7 shows chemical formulas of examples of compounds represented by the general formula (X), with TEMPO inclusive. FIG. 7 (i) shows TEMPO as a compound having a reversible redox-cycle, which finally inactivates active oxygen.

The compound represented by the general formula (IX) may comprise a compound represented by a general formula (XI) below

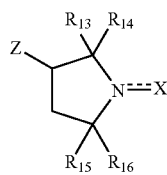

(XI)

where Z denotes a kind of substituent selective from a set of alkyl groups, aryl groups, alkoxy groups, carboxyl groups, alkoxycarbonyl groups, cyano groups, hydroxyl groups, nitro groups, amino groups, and substituent groups including a hydrogen atom. For Z being an alkyl group, the an alkyl group may be substituted in part by an arbitrary radical, may be chained, ringed, or branched in part, and may include oxygen and nitrogen atoms. For Z being an aryl group, the aryl group may be substituted in part by an arbitrary radical, and may include oxygen and nitrogen atoms.

The compound represented by the general formula (IX) may comprise a compound represented by a general formula (XII) below

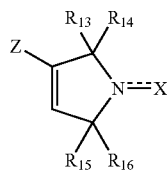

(XII)

where Z denotes a kind of substituent selective from a set of alkyl groups, aryl groups, alkoxy groups, carboxyl groups, alkoxycarbonyl groups, cyano groups, hydroxyl groups, nitro groups, ammo groups, and substituent groups including a hydrogen atom. For Z being an alkyl group, the an alkyl group may be substituted in part by an arbitrary radical, may be chained, ringed, or branched in part, and may include oxygen and nitrogen atoms. For Z being an aryl group, the aryl group may be substituted in part by an arbitrary radical, and may include oxygen and nitrogen atoms. Also these compounds are hardly hydrolysable like that represented by the general formula (X), and may be continuously supplied, for inactivation of continuously generated active oxygen to suppress an oxidation of electrolyte membrane. For compounds represented by the general formula (XI) or (XII), the substituents to be employed may be like to the compound represented by the general formula (X).

Figure 8:
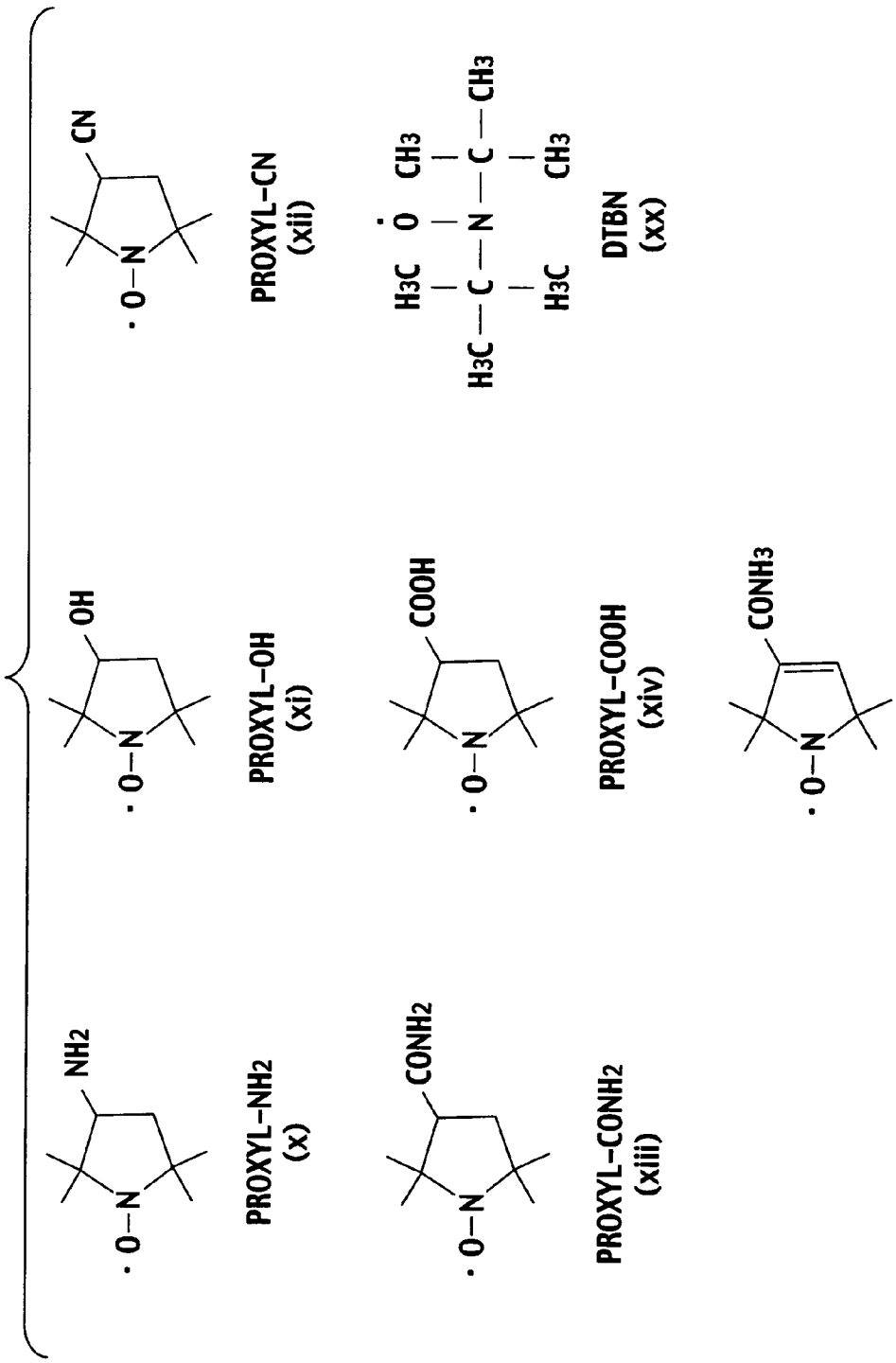
FIG. 8 is a diagram of formulas of exemplary compounds.
Figure 9:
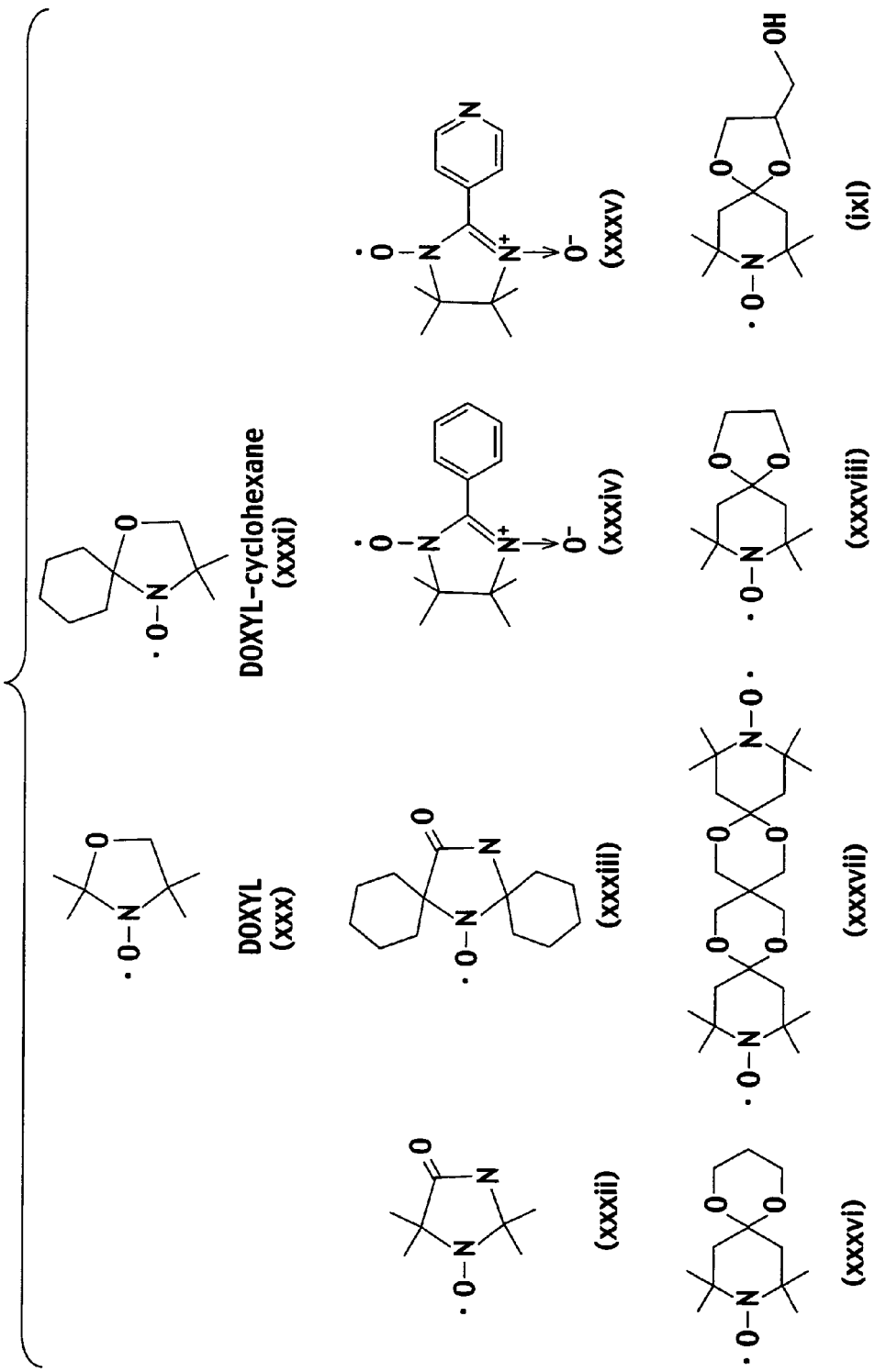
FIG. 9 is a diagram of formulas of exemplary compounds.

Examples of compounds represented by the general formula (XI) or (XII) are shown in FIG. 8 to FIG. 10. As examples of compounds represented by the general formula (XI) or (XII), PROXYL (2,2,5,5-tetraethylpyrrolidine-1-oxyl) and DOXYL (4,4-dimethyloxazolidine-3-oxyl) are now taken. Like TEMPO, these compounds also have a reversible redox cycle, and can serve for inactivation of active oxygen.

Figure 11:
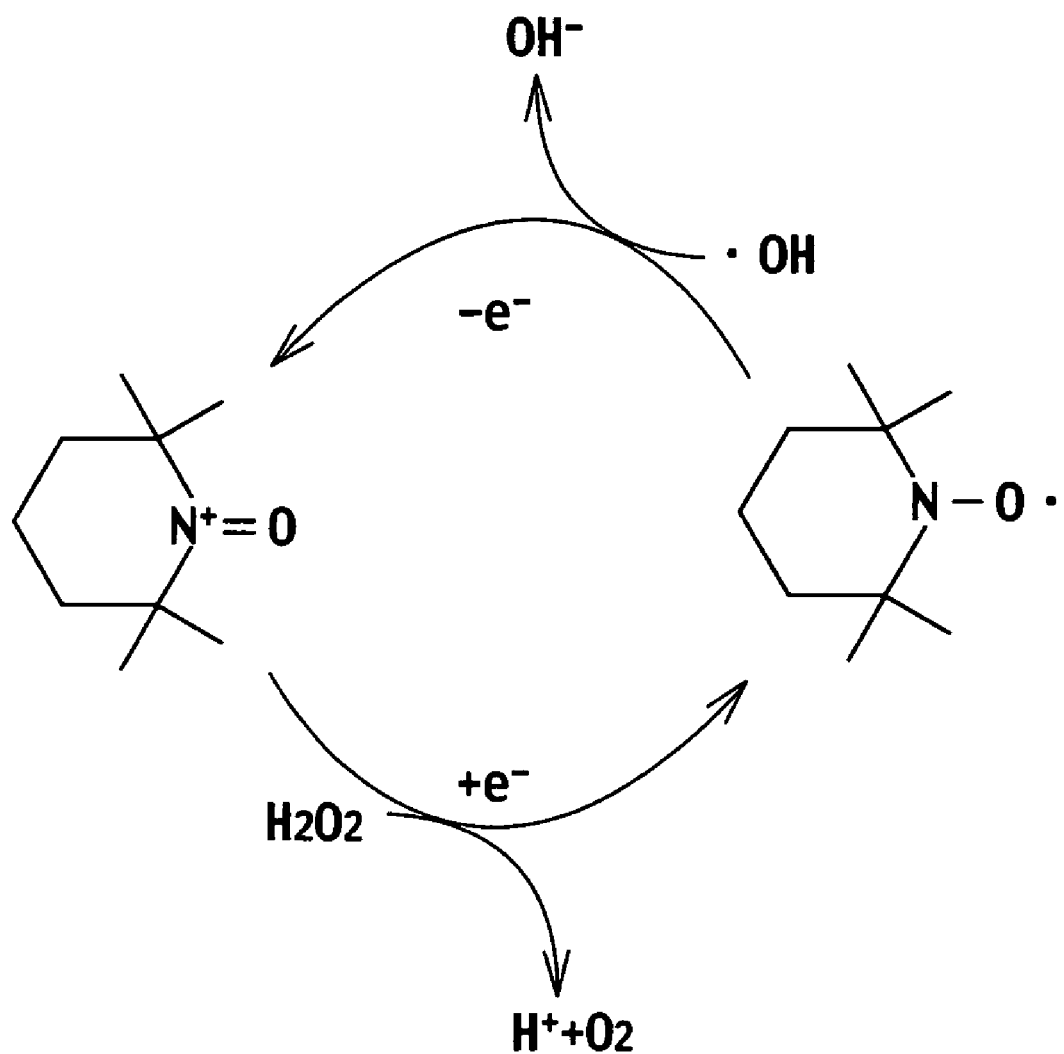
FIG. 11 is a diagram illustrating a mechanism for inactivation of active oxygen by TEMPO.

FIG. 11 shows a mechanism of oxidation and reduction by another example of compound employable in the fuel cell system according to this mode of embodiment. For TEMPO, a typical example of the compound, its redox cycle is illustrated as a mechanism in which hydroxyl radical as well as hydrogen peroxide is inactivated by TEMPO.

It is known that hydrogen peroxide acts as a reducing agent on a substance whose redox potential is higher than hydrogen peroxide, and on the other hand, as an oxidizing agent on a substance whose redox potential is lower than hydrogen peroxide, as in the formula (B9) and as in a formula (B20) below.

$$H_2O_2 \rightarrow O_2 + 2H^+ + 2e^-, E°=0.68 \text{ V} \quad (B20)$$

TEMPO is an N-hydroxy imide derivative that has a reversible redox cycle, where performs oxidation and reduction through elementary reaction processes with a redox potential of 0.81V, as shown by formulas (B21) and (B22) below.

$$TEMPO^+ + e^- \rightarrow TEMPO, E°=0.81 \text{ V} \quad (B21)$$

$$TEMPO \rightarrow TEMPO^+ + e^-, E°=0.81 \text{ V} \quad (B22)$$

TEMPO has a redox potential higher than the redox potential of hydrogen peroxide, and lower than the redox potential of hydroxy radical. Therefore, an N-oxyl radical of TEMPO, that is, a reductant acts as a reducing agent on hydroxy radical, whereby it supplies an electron (e⁻) to hydroxy radical generated in the electrolyte membrane, which is thereby reduced to $OH^-$.

$$TEMPO + \cdot OH \rightarrow TEMPO^+ + OH^- \quad (B22)$$

On the other hand, $TEMPO^+$ being an oxidant acts as an oxidizing agent on hydrogen peroxide, i.e., performs oxidation of hydrogen peroxide, taking out hydrogen, so that hydrogen peroxide is oxidized to oxygen, whereby $TEMPO^+$ is changed to have a recovered form of reductant $$2TEMPO^+ + H_2O_2 \rightarrow 2TEMPO + 2H^+ + O_2 \quad (B23)$$

After the recovery to a reductant, TEMPO again acts to reduce hydroxy radical. Like this, a redox cycle turns between reductant and oxidant of TEMPO, which concurrently inactivates hydroxy radical as well as hydrogen peroxide, thus preventing oxidation of electrolyte membrane.

In a situation that TEMPO is supplied from the fuel electrode of fuel cell, part of TEMPO may be oxidized by electrolytic oxidation shown by formula (B22), whereby it may be changed to $TEMPO^+$ being an oxidant, and diffused in the electrolyte. In this case also, TEMPO, which has a reversible redox cycle, cooperates with hydrogen peroxide acting as a reducing agent, to recover the original reductant form of TEMPO, which again functions as an oxidizing agent that can reduce hydroxy radical. Unless the compound has a reversible redox cycle, its antioxidant function is lost when it has reduced hydroxy radical, so that it will not function any more as an oxidizing agent However, in the case of a compound having a reversible redox cycle, the reversible redox cycle allows the function as an oxidizing agent to be kept to some extent.

Such being the case, according to this mode of embodiment, a fuel cell system is configured with a fuel cell having an electrode, and an antioxidant contacting the electrode, for inactivating active oxygen, and an antioxidant supply system for supplying the antioxidant from an air electrode side or a fuel electrode side of the fuel cell, thereby allowing the fuel cell system to be implemented for an ensured inactivation and elimination of active oxygen.

In the fuel cell system according to this mode of embodiment, the fuel cell to be employed may well be any one of a hydrogen type, a direct methanol type, and a direct hydrocarbon type.

The fuel cell system according to this mode of embodiment may be mounted on a fuel cell vehicle, as an application thereof. The fuel cell vehicle is allowed to endure a continuous run over a long time, by mounting thereon the fuel cell system according to this mode of embodiment The fuel cell system has applications thereof not limited to a fuel cell vehicle, and is applicable, for example, to a fuel cell cogeneration power generating system, a fuel cell home electric appliance, a fuel cell portable device, a fuel cell transport machine, and the like.

(Solid Polymer Electrolyte)

Next, description is made of a solid polymer electrolyte according to the present invention. According to this mode of embodiment, the solid polymer electrolyte is characterized by a compound having a redox cycle, where it acts as a reducing agent in a range of potentials lower than a redox potential of hydroxy radical and as an oxidizing agent in a range of potentials higher than a redox potential where hydrogen peroxide acts as a reducing agent.

For a normal fuel cell, the reactions of entire system are as shown in formulas (C1) and (C2) below.

$$2H_2 + O_2 \rightarrow 2H_2O \tag{C1}$$

$$H_2 + O_2 \rightarrow H_2O_2 \tag{C2}$$

The formula (C1) is a four-electron reduction of oxygen, and the formula (C2) is a two-electron reduction of oxygen. The reactions of formulas (C1) and (C2) concurrently progress as competitive reactions.

The formula (C1) is a sum of elementary reactions, being a positive electrode main reaction shown by a formula (C3) and a negative electrode reaction shown by a formula (C4). $E°$ denotes a standard redox potential (NHE).

$$O_2 + 4H^+ + 4e^- \rightarrow 2H_2O, E°=1.23V \tag{C3}$$

$$H_2 - 2H^+ + 2e^-, E°=0.00V \tag{C4}$$

Likewise, the formula (C2) is a sum of elementary reactions, being a positive electrode side reaction shown by a formula (C5) and the negative electrode reaction shown by the formula (C4).

$$O_2 + 2H^+ + 2e^- \rightarrow H_2O_2, E°=0.68V \tag{C5}$$

Thermodynamically, a substance that has a higher redox potential acts as an oxidizing agent, and a substance that has a lower redox potential acts as a reducing agent. Then, the reaction develops when $\Delta E°$ of the entire system, i.e., the difference of redox potentials has a positive value.

Hydrogen peroxide generated in formula (C2) is considered to disappear by reactions shown by formulas (C6) to (C8) below.

$$H_2O_2 + H_2 \rightarrow 2H_2O \tag{C6}$$

$$H_2O_2 + 2H^+ + 2e^- \rightarrow 2H_2O, E°=1.77V \tag{C7}$$

$$2H_2O_2 \rightarrow 2H_2O + O_2 \tag{C8}$$

The formula (C6) indicates a case in which hydrogen peroxide is reduced to water by $H_2$ having crossed over from the negative elective, via the electrolyte membrane. The formula (C7) indicates a case in which hydrogen peroxide receives hydrogen ion and electron at the positive electrode, whereby it is reduced to water. The formula (C8) indicates a reaction in which two molecules of hydrogen peroxide react, either acting as an oxidizing agent and the other acting as a reducing agent, generating water and oxygen. It is known that hydrogen peroxide acts as a reducing agent on a substance that has a higher redox potential than hydrogen peroxide, and as an oxidizing agent on a substance that has a lower redox potential than hydrogen peroxide, as shown by the formula (C7) and a formula (C9).

$$H_2O_2 \rightarrow O_2 + 2H^+ + 2e^-, E°=0.68V \tag{C9}$$

The formula (C6) is a sum of the elementary reaction shown by formula (C7) and the elementary reaction shown by formula (C4). The formula (C8) is a sum of the elementary reaction shown by formula (C7) and the elementary reaction shown by formula (C9).

It is now supposed that fuel cell is contaminated with $Fe^{2+}$ ion. Hydrogen peroxide generated at the positive electrode is changed to hydroxy radical by a Fenton reaction by $Fe^{2+}$ acting as a catalyst $$Fe^{2+} + H_2O_2 \rightarrow Fe^{3+} + OH^- + \cdot OH \tag{C10}$$

This hydroxyl radical has a redox potential of 2.85V, and has a very high oxidizability. Hydroxyl radical oxidizes hydrogen ion as shown by a formula (C11), whereby it disappears.

$$\cdot OH + H^+ + e^- \rightarrow H_2O, E°=2.85V \tag{C11}$$

However, supply of hydrogen (hydrogen ion) may be short, upon a stopped startup of the fuel cell or the like, when hydroxyl radical that has a very high oxidizability may cut an C—F bond of the Nafion® membrane which inherently is kept from oxidation. According to this mode of embodiment, the solid polymer electrolyte involves a compound that has a redox cycle, where it acts as a reducing agent in a range of potentials lower than a redox potential of hydroxy radical, and as an oxidizing agent in a range of potentials higher than a redox potential where hydrogen peroxide acts as a reducing agent. This compound acts as a catalyst, and decomposes hydrogen peroxide and hydroxy radical as active oxygen. Therefore, hydroxyl radical is vanished by catalysis of the compound contained in the electrolyte membrane, without oxidizing the electrolyte membrane. Further, after the decomposition of active oxygen, this catalytic compound returns to an original reductant form by a redox cycle of the compound, allowing a repeated use many times. This enables implementation of a solid polymer electrolyte with a maintained durability.

As an example of this compound acting as a catalyst, here is taken N-hydroxyphthalimide (NHPI) that has a reversible redox cycle, and description is made of a case in which NHPI is introduced into a fuel cell reaction system NHPI becomes PINO (phthalimide N-oxyl), when oxidize NHPI and PINO have a redox potential of 1.34V $$NHPI \rightarrow PINO + H^+ + e^-, E° = 1.34V \quad (C12)$$

$$PINO + H^+ + e^- \rightarrow NHPI, E° = 1.34V \quad (C13)$$

As shown by formulas (C7) and (C11), hydrogen peroxide and hydroxyl radical generated by Fenton reaction have higher redox potentials than NHPI. Therefore, under presence of NHPI, hydrogen peroxide and hydroxyl radical is reduced to water by a reducing action of the NHPI as a reducing agent In this case, as shown by formulas (C14) and (C15), NHPI is oxidized to PINO by hydroxyl radical or hydrogen peroxide.

$$\cdot OH + NHPI \rightarrow H_2O + PINO \quad (C14)$$

$$H_2O_2 + 2NHPI \rightarrow 2H_2O + 2PINO \quad (C15)$$

The formula (C14) is a sum of the elementary reaction shown by formula (C11) and the elementary reaction shown by formula (C12). The formula (C15) is a sum of the elementary reaction shown by formula (C7) and the elementary reaction shown by formula (C13).

PINO as an oxidant form of NHPI acts as an oxidizing agent, oxidizing hydrogen ion, hydrogen, or hydrogen peroxide, whereby it is reduced to NHPI, as shown by formulas (C16), (C17), and (C13).

$$2PINO + H_2 \rightarrow 2NHPI \quad (C16)$$

$$PINO + H^+ + e^- \rightarrow NHPI, E° = 1.34V \quad (C13)$$

$$2PINO + H_2O_2 \rightarrow 2NHPI + O_2 \quad (C17)$$

The formula (C16) is a sum of the elementary reaction shown by formula (C13) and the elementary reaction shown by formula (C4). The formula (C17) is a sum of the elementary reaction shown by formula (C13) and the elementary reaction shown by formula (C9). PINO has a redox potential of 1.34V, which is thermodynamically not so high as to cut C—F bond of Nafion® membrane. Therefore, the electrolyte membrane will not be oxidized by PINO.

Figure 12:
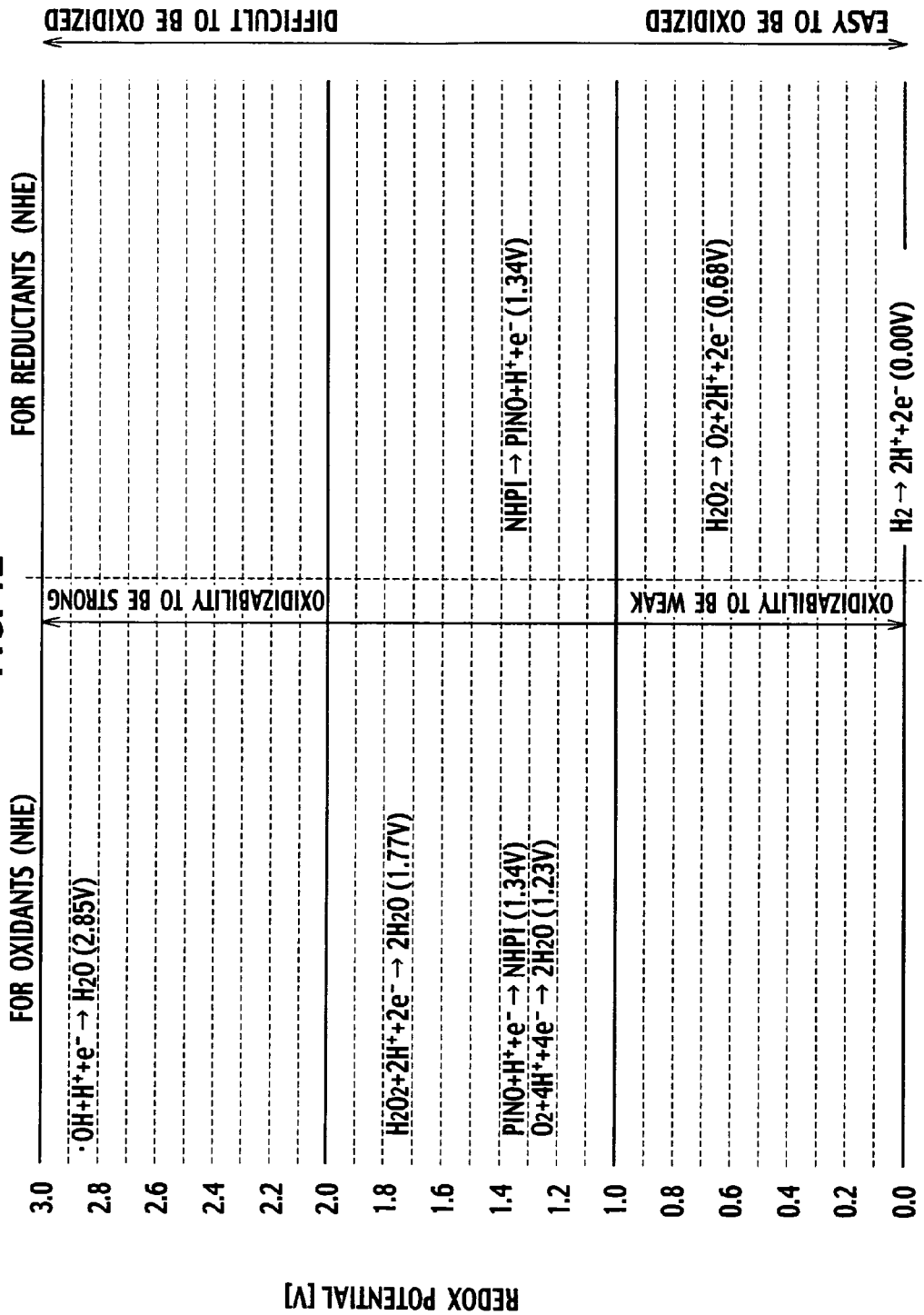
FIG. 12 is a diagram showing redox potentials of hydroxy radical, oxygen, hydrogen peroxide, hydrogen, NHPI, and PINO.

FIG. 12 shows redox potentials of hydroxy radical, oxygen, hydrogen peroxide, hydrogen, NHPI, and PINO. In this figure, the right column gives oxidation half reaction formulas of reducing agents, and the left column, reduction half reaction formulas of oxidizing agents. The axis of ordinate represents a standard redox potential, which is increased as it extends upwards. That is, the difficulty of oxidation is increased, as it is located upper. The half reaction formulas are followed by parenthesized values, which are standard redox potentials of compounds acting as an oxidizing agent or a reducing agent. The oxidation reduction potential may be influenced by pH, temperate, etc., and is given, in FIG. 12, in terms of a standard redox potential corrected to the normal hydrogen electrode (NHE).

Like this, according to this mode of embodiment, the solid polymer electrolyte involves a compound that has a redox cycle, where it acts as a reducing agent in a range of potentials lower than a redox potential of hydroxy radical, and as an oxidizing agent in a range of potentials higher than a redox potential where hydrogen peroxide acts as a reducing agent Therefore, this compound acts as a catalyst, and decomposes active oxygen such as hydrogen peroxide and hydroxy radical. Therefore, C—F bond of electrolyte membrane is kept from being cut by hydroxyl radical or hydrogen peroxide, so that deterioration of electrolyte membrane can be prevented. Further, after the decomposition of active oxygen, this catalytic compound returns to an original reductant form by a redox cycle of the compound, allowing a repeated use many times. This enables implementation of a solid polymer electrolyte with a maintained durability.

Although simply NHPI is taken as an example of a compound acting as a catalyst, this compound may preferably have a standard redox potential within a range of 0.68V to 2.85V, when aiming at vanishing hydroxyl radical only. When aiming at vanishing both hydroxyl radical and hydrogen peroxide, the compound should act as a reducing agent in a range of potentials lower than a redox potential where hydrogen peroxide acts as an oxidizing agent, and as an oxidizing agent in a range of potentials higher than a redox potential where hydrogen peroxide acts as a reducing agent, and may preferably have a standard redox potential within a range of 0.68V to 1.77V.

Further, this compound may be preferable if its reductant and oxidant are relatively stable compounds. It is noted that the actual redox potential (RHE) may vary, depending various conditions, such as pH and temperature, and the selection may preferably be made within a matching range. However, in view of poisoning to platinum used in the electrode, the compound to be employed for the solid polymer electrolyte according to this mode of embodiment may preferably comprise an organic compound composed simply of carbon, hydrogen, oxygen, and nitrogen. Like this, the solid polymer electrolyte according to this mode of embodiment can suppress deterioration of electrolyte membrane, allowing for implementation of a solid polymer electrolyte with a maintained durability.

The above-noted compound may preferably comprise a compound represented by a general formula (I) below

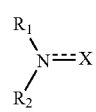
(I)

where $R_1$ and $R_2$ respectively denote elements of a set of arbitrary substituent groups mutually identical or different, and X denotes an oxygen atom or hydroxyl group. More preferably, $R_1$ and $R_2$ should be combined with each other, to form a double bond, an aromatic ring, or a nonaromatic ring.

Further, this compound may preferably comprise an imide compound represented by a general formula (II) below

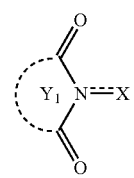
(II)

where a ring $Y_1$ comprises any ring of a set of 5-membered to 12-membered rings double-bonded, or aromatic or nonaromatic.

The above-noted compound coexists in the electrolyte membrane, whereby elementary reactions develop as shown by formulas (C18) and (C19) below. And, simply when hydroxy radical as well as hydrogen peroxide invades the electrolyte membrane, N-oxyl radical (>NO·) is provided by that compound, which efficiently reduces hydroxy radical as well as hydrogen peroxide into water, suppressing oxidation of electrolyte membrane.

$$>NOH + \cdot OH \rightarrow >NO \cdot + H_2O \quad (C18)$$

$$2(>NOH) + H_2O_2 \rightarrow 2(>NO \cdot) + 2H_2O \quad (C19)$$

Further, supply of hydrogen generates N-oxyl radical, which draws out radical hydrogen from hydrogen or hydrogen peroxide by elementary reactions shown by formulas (C20) to (C22), and returns to the original form of hydroxyamine (>NOH).

$$2(>NO \cdot) + H_2 \rightarrow 2(>NOH) \quad (C20)$$

$$>NO \cdot + H^+ + e^- \rightarrow >NOH \quad (C21)$$

$$2(>NO \cdot) + H_2O_2 \rightarrow 2(>NOH) + O_2 \quad (C22)$$

FIG. 5 shows N-hydroxyphthalimide (NHPI) as a typical example of the compound having a hydroxy imide group, and phthal acid imide N-oxyl (PINO) as an oxidized form of NHPI in which NHPI is changed to a radical, and illustrates a mechanism in which a cycle turns between hydroxy imide group of NHPI and N-oxyl radical of PINO, thereby causing hydroxy radical as well as hydrogen peroxide to be vanished over a long term. That is, NHPI acts as a reducing agent on hydroxyl radical or hydrogen peroxide, reducing hydroxyl radical or hydrogen peroxide to water. On the other hand, PINO acts as an oxidizing agent on hydrogen peroxide, oxidizing hydrogen peroxide to oxygen Like this, a redox cycle turns between NHPI and PINO, concurrently vanishing hydroxy radical as well as hydrogen peroxide.

Figure 13:
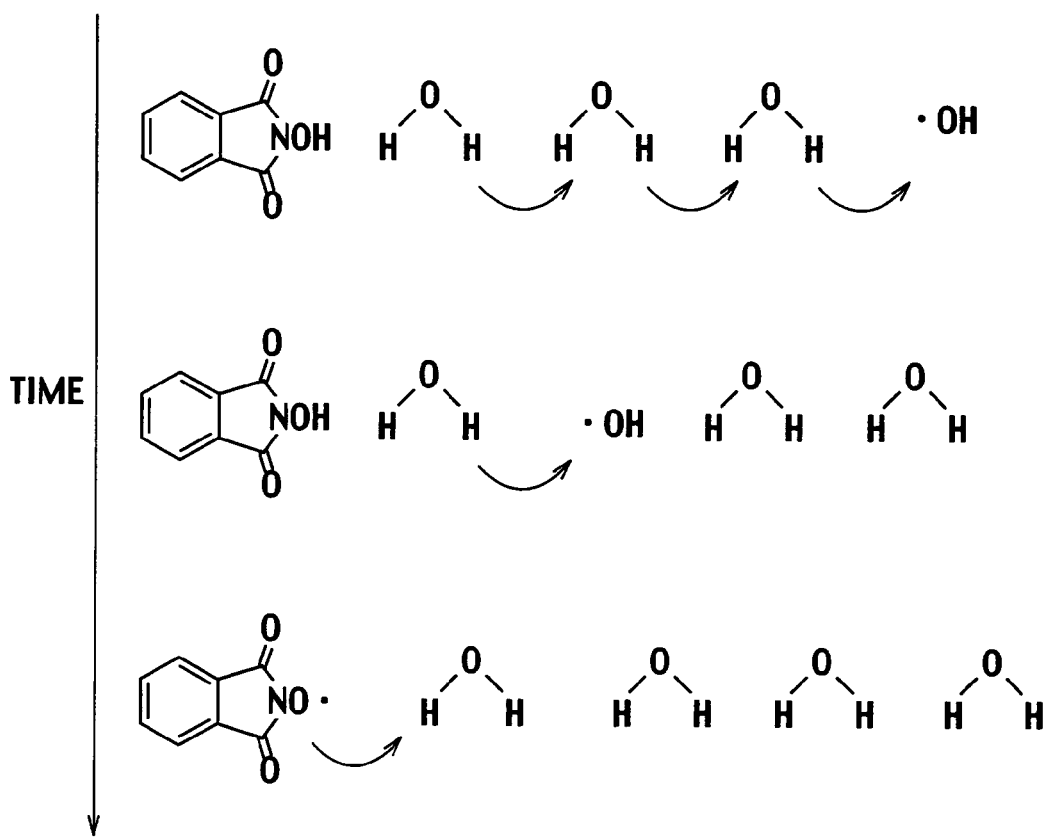
FIG. 13 is a diagram illustrating a hydroxy radical reduction mechanism by Grotthuss mechanism.

Further, for the compound involved in the solid polymer electrolyte according to this mode of embodiment, vanishment of hydrogen peroxide by the reduction and oxidation is associated with entry and exit of hydrogen radical (hydrogen atom). By the entry and exit of hydrogen radical, hydroxyl radical generated upon decomposition of hydrogen peroxide is vanished even when residing in a place distant from that compound. FIG. 13 illustrates this mechanism. As an example of such compound, NHPI is assumed in use, which gives rise to a Grotthuss mechanism that transfers hydrogen radical by exchange between NHPI and water molecules, as illustrated in FIG. 13. As a reducing reaction progresses, supplying hydrogen radical to water molecules as described above, the catalytic reaction develops, vanishing hydroxy radical, allowing for vanishment of hydroxy radical even if hydroxy radical is distant from NHPI. Therefore, over a wide range in the electrolyte membrane, hydroxy radical residing there can be vanished.

In selection of a compound with such catalysis, the stability, durability, heat resistance, and solubility to electrolyte membrane of the compound are important. In particular, the stability and durability of the compound are most important for the fuel cell to be employed over a long term, as well as in view of the effect of active oxygen vanishment to be kept. For the operating temperature of fuel cell to be within a range of 80 to 90° C. in normal run, and for the heat resistance of electrolyte membrane to be enhanced in future, the electrolyte membrane should have a sufficient heat resistance to be durable even under temperatures about 120° C. Although, one may be unfastidious about a low solubility for a uniform dissolution of this compound to the electrolyte membrane, the solubility to water should be hung on as being important. If insoluble to water, it may be deposited in the electrolyte membrane, inhibiting entry and exit of hydrogen radical, thus losing the catalytic function, that is, the effect of vanishing active oxygen such as hydroxy radical, hydrogen oxide, etc.

Further, the above-noted compound may preferably comprise an imide compound represented by a general formula (III) below

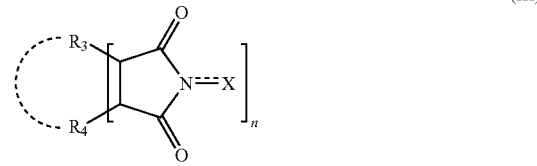

where $R_3$ and $R_4$ respectively denote elements of a set of hydrogen atoms, halogen atoms, alkyl groups, aryl groups, cycloalkyl groups, hydroxyl groups, alkoxyl groups, carboxyl groups, alkoxycarbonyl groups, or acyl groups, mutually identical or different, X denotes an oxygen atom or hydroxyl group, and n denotes an integer within 1 to 3.

Further, in the compound represented by the general formula (III), substituents $R_3$ and $R_4$ may include iodine, bromine, chlorine, and fluorine as halogen atoms. The alkyl groups may include those linear chain or branch chain alkyl groups which have carbon numbers within a range of 1 to 10 or near, for example, a methyl, an ethyl, a propyl, an isopropyl, a butyl, an isobutyl, a sec-butyl, a t-butyl, a pentyl, a hexyl, a heptyl, an octyl, and a decyl group, and the like. They may preferably have carbon numbers within a range of 1 to 6 or near, or more preferably, be as lower alkyl groups as carbon numbers within a range of 1 to 4 or near.

The aryl groups may include, for example, a phenyl group, a naphthyl group, etc. The cycloalkyl groups may include, for example, a cyclopentyl, a cyclohexyl, and a cyclooctyl group, and the like. The alkoxy groups may include, for example, a methoxy, an ethoxy, a propoxy, an isopropoxy, a butoxy, an isobutoxy, a t-butoxy, a pentyloxy, and a hexyloxy group, and the like, that have carbon numbers within a range of 1 to 10 or near, preferably, within a range of 1 to 6 or near, or more preferably, be as lower alkoxy groups as carbon numbers within a range of 1 to 4 or near.

The alkoxycarbonyl groups may include those alkoxycarbonyl groups which have carbon numbers of their alkoxy parts within a range of 1 to 10 or near, for example, a methoxycarbonyl, an ethoxycarbonyl, a propoxy carbonyl, an isopropoxy carbonyl, a butoxycarbonyl, an isobutoxycarbonyl, a t-butoxycarbonyl, a pentyloxy carbonyl, a hexyloxy carbonyl group, and the like. They may preferably have carbon numbers of alkoxy parts within a range of 1 to 6 or near, or more preferably, be as lower alkoxycarbonyl groups as carbon numbers within a range of 1 to 4 or near.

The acyl groups may include those acyl groups which have carbon numbers within a range of 1 to 6 or near, for example, a formyl, an acetyl, a propionyl, a butyryl, an isobutyryl, a valeryl, an isovaleryl, a pivaloyl group, and the like.

The substituents $R_3$ and $R_4$ may be mutually identical or different In the compound represented by the general formula (III), the substituents $R_3$ and $R_4$ may be combined with each other to form a double bond, an aromatic ring, or a nonaromatic ring. Among them, the aromatic ring or nonaromatic ring may preferably be any one kind of ring of 5-membered to 12-membered rings, or more preferably, of roughly 6-membered to 10-membered rings, and these may be heterocycles or fused heterocycles, or preferably, hydrocarbon rings.

As such rings, there may be taken, for example: nonaromatic hydrocarbon rings, such as cycloalkane rings, e.g., cyclohexane ring, and cycloalkene rings, e.g. cyclohexene ring; nonaromatic bridging rings, such as bridging type hydrocarbon rings, e.g. five-norbornene ring, and aromatic rings, such as benzene rings and naphthalene rings. Those rings may have substituent groups.

In particular from the points of compound's stability, durability, and solubility to electrolyte membrane, the compound represented by the general formula (III) may preferably comprise a compound represented by one of general formulas (IVa) to (IVf) below

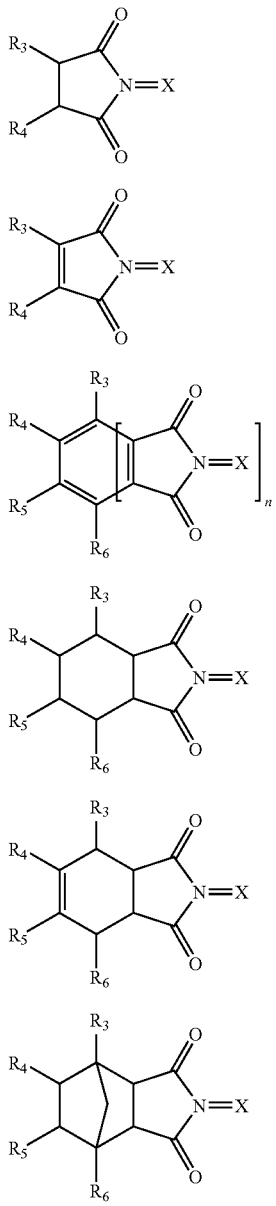

where $R_3$ to $R_6$ respectively denote elements of a set of hydrogen atoms, halogen atoms, alkyl groups, hydroxyl groups, alkoxyl groups, carboxyl groups, alkoxycarbonyl groups, acyl groups, nitro groups, cyano groups, or amino groups, mutually identical or different, and n denotes an integer within 1 to 3.

The substituents $R_3$ to $R_6$ may include as allyl groups, those of like alkyl groups to the before-mentioned alkyl groups, which have carbon numbers within a range of 1 to 6 or near, as alkoxy groups, like alkoxy groups to the before-mentioned alkoxy groups, in particular those lower alkoxy groups which have carbon numbers within a range of 1 to 4 or near, and as alkoxycarbonyl groups, like alkoxycarbonyl groups to the before-mentioned alkoxycarbonyl groups, in particular those lower alkoxycarbonyl groups whose alkoxy parts have carbon numbers within a range of 1 to 4 or near.

Substituents $R_3$ to $R_6$ may include, as acyl groups, like acyl groups to the before-mentioned acyl groups, in particular those acyl groups which have carbon numbers within a range of 1 to 6 or near. As halogen atoms, there may be cited fluorine, chlorine, and bromine atoms. As for substituents $R_3$ to $R_6$, they may typically be elements of a set of hydrogen atoms, lower alkyl groups having carbon numbers within a range of 1 to 4 or near, carboxyl groups, nitro groups, and halogen atoms, in most cases.

In view of the availability, synthesis to be facile, and cost of compound, more desirable imide compounds may preferably comprise an imide compound selective from a set of N-hydroxy succinic acid imide, N-hydroxy maleic acid imide, N-hydroxy hexahydrophthalic acid imide, N,N'-dihydroxycyclohexane tetracarboxylic acid imide, N-hydroxyphthalimide, N-hydroxy tetrabromophthalic acid imide, N-hydroxy tetrachlorophthalic acid imide, N-hydroxy fatty acid imide, N-hydroxy himic acid imide, N-hydroxy trimellitic acid imide, N,N'-dihydroxy pyromellitic acid imide, and N,N'-dihydroxynaphthalene tetracarboxylic acid imide. This compound may be disposed as a coexisting catalyst in the electrolyte membrane.

Such an imide compound may be prepared by a standard imidizing reaction in which a correspondent acid anhydride reacts with hydroxylamine $NH_2OH$, whereby its acid anhydride radical has an opened ring, which is closed for imidization.

The compound represented by the general formula (II) may comprise such a compound that has an N-substitution cyclic imide frame, as represented by a general formula (V) below

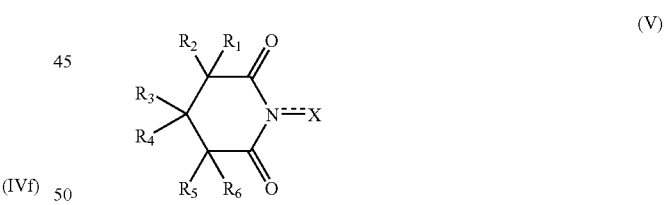

where X denotes an oxygen atom or hydroxyl group, $R_1$ to $R_6$ respectively denote elements of a set of hydrogen atoms, halogen atoms, alkyl groups, aryl groups, cycloalkyl groups, hydroxyl groups, alkoxy groups, carboxyl groups, substituent carbonyl groups, acyl groups, or acyloxy groups, mutually identical or different. At least two of $R_1$ to $R_6$ may be combined with each other to form a double bond or an aromatic ring or a nonaromatic ring. Of the rings, at least one may have an N-substitution cyclic imide group.

In compounds that have an N-substitution cyclic imide frame, both 5-membered ring and 6-membered ring are hydrolyzable as shown by formulas (C23) and (C24) below, while the 6-membered ring is slower in hydrolysis, and higher in hydrolysis resistance, than the 5-membered ring.

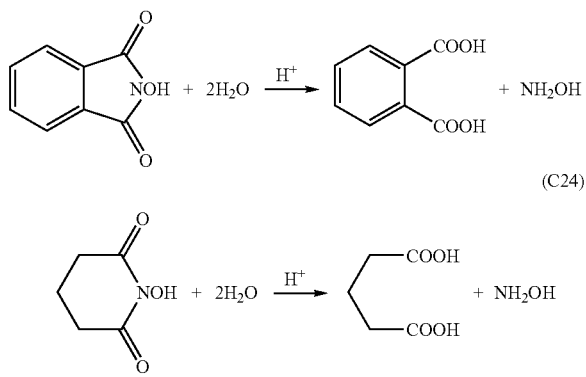

(C23)

(C24)

Therefore, if the compound having the N-substitution cyclic inside frame is a cyclic imide of a 6-membered ring, this can be reused many times as a catalyst, thus allowing the consumption of catalyst to be the more reduced.

The alkyl groups may include linear chain or branch chain alkyl groups of carbon numbers within a range of 1 to 10 or near, for example, a methyl, an ethyl, a propyl, an isopropyl, a butyl, an isobutyl, a sec-butyl, a t-butyl, a pentyl a hexyl, a heptyl, an octyl, and a decyl group, and the like. They may preferably have carbon numbers within a range of 1 to 6 or near, or more preferably, be as lower alkyl groups as carbon numbers within a range of 1 to 4 or near.

The aryl groups may include, for example, a phenyl group, a naphthyl group, etc., and the cycloalkyl groups may include, for example, a cyclopentyl, a cyclohexyl, and a cyclooctyl group, and the like. The alkoxy groups may include, for example, a methoxy, an ethoxy, a propoxy, an isopropoxy, a butoxy, an isobutoxy, a t-butoxy, a pentyloxy, and a hexyloxy group, and the like, having carbon numbers within a range of 1 to 10 or near, preferably, within a range of 1 to 6 or near, or more preferably, be as lower alkoxy groups as carbon numbers within a range of 1 to 4 or near.

The alkoxycarbonyl groups may include those alkoxycarbonyl groups whose alkoxy parts have carbon numbers within a range of 1 to 10 or near, for example, a methoxycarbonyl, an ethoxycarbonyl, a propoxy carbonyl, an isopropoxy carbonyl, a butoxycarbonyl, an isobutoxycarbonyl, a t-butoxycarbonyl, a pentyloxy carbonyl, and a hexyloxy carbonyl group, and the like. They may preferably have carbon numbers of their alkoxy parts within a range of 1 to 6 or near, or more preferably, be as lower alkoxycarbonyl groups as carbon numbers within a range of 1 to 4 or near.

The acyl groups may include those acyl groups which have carbon numbers within a range of 1 to 6 or near, for example, a formyl, an acetyl, a propionyl, a butyryl, an isobutyryl, a valeryl, an isovaleryl, and a pivaloyl group, and the like.

Further, in the compound represented by the general formula (V), at least two of $R_1$ to $R_6$ may preferably be combined with each other to form a double bond or an aromatic or nonaromatic ring. Among them, the aromatic ring or the nonaromatic ring may preferably be any one kind of ring of 5-membered to 12-membered rings, or more preferably, about 6-membered to 10-membered rings, while the ring may be heterocycles or fused heterocycles. As such rings, there may be taken, for example, nonaromatic hydrocarbon rings, such as cycloalkane rings, e.g., cyclohexane ring, and cycloalkene rings, e.g. cyclohexene ring; nonaromatic bridging rings, such as bridging type hydrocarbon rings, e.g. five- norbornene ring, and aromatic rings, such as benzene rings and naphthalene rings. It is noted that those rings may have a substituent group.

As an example of the compound represented by the general formula (V), there is now taken N-hydroxyglutaric acid imide (NHGI) of which $R_1$ to $R_6$ are all hydrogen atoms and which has a reversible redox cycle, to show the case in which NHGI is introduced in a fuel cell reaction y NHGI becomes glutaric acid imide N-oxyl (GINO) when oxidized. NHGI and GINO have a redox potential of 1.39V.

NHGI is oxidized, and changed to glutaric acid imide N-oxyl (GINO). NHGI and GINO have the redox potential 1.39V.

$$NHGI \rightarrow GINO + H^+ + e^-, E°=1.39V \qquad (C25)$$

$$GINO + H^+ + e^- \rightarrow NHGI, E°=1.39V \qquad (C26)$$

As shown in formulas (C7) and (C11), hydrogen peroxide, as well as hydroxyl radical generated by Fenton reaction, has a redox potential higher than the redox potential of NHGI. Therefore, under presence of NHGI, hydrogen peroxide or hydroxyl radical is reduced to water by catalysis of NHGI. In this case, NHGI acts as a reducing agent, and this NHGI is oxidized to GINO by hydroxyl radical, as well as by hydrogen peroxide, as shown by formulas (C27) and (C28) below.

$$.OH + NHGI \rightarrow H_2O + GINO \qquad (C27)$$

$$H_2O_2 + 2NHGI \rightarrow 2H_2O + 2GINO \qquad (C28)$$

The formula (C27) is a sum of the elementary reaction shown by formula (C11) and the elementary reaction shown by formula (C25). The formula (C28) is a sum of the elementary reaction shown by formula (C7) and the elementary reaction shown by formula (C26).

GINO, which is an oxidized form of NHGI, acts as an oxidizing agent for oxidation of hydrogen ion, hydrogen, or hydrogen peroxide, whereby it is reduced to NHGI, as shown by formulas (C29), (30), and (C26) below.

$$2GINO + H_2 \rightarrow 2NHGI \qquad (C29)$$

$$GINO + H^+ e^- \rightarrow NHGI, E°=1.39V \qquad (C26)$$

$$2GINO + H_2O_2 \rightarrow 2NHGI + O_2 \qquad (C30)$$

The formula (C29) is a sum of the elementary reaction shown by formula (C26) and the elementary reaction shown by formula (C4). The formula (C30) is a sum of the elementary reaction shown by formula (C26) and the elementary reaction shown by formula (C9). GINO's redox potential is 1.39V. Thermodynamically, this is not so high as to cut C—F bond of Nafion® film Therefore, the electrolyte membrane will not be oxidized by GINO.

Such being the case, according to this mode of embodiment, a solid polymer electrolyte has such a compound that has an N-substitute cyclic imide frame of 6-membered ring having a redox cycle, where it acts as a reducing agent in a range of potentials lower than a redox potential of hydroxy radical, and as an oxidizing agent in a range of potentials higher than a redox potential where hydrogen peroxide acts as a reducing agent, which compound acts as a catalyst, decomposing active oxygen such as hydroxy radical and hydrogen peroxide. Therefore, C—F bond of the electrolyte membrane can not be cut by hydroxyl radical or hydrogen peroxide, so that deterioration of the electrolyte membrane is preventive. Further, after decomposition of active oxygen, this compound returns to an original form by the redox cycle of compound, and can be reused many times. It therefore is possible to implement an electrolyte for proton-exchange membrane fuel cells with a maintained durability.

In view in particular of the compound's stability, durability, and solubility to the electrolyte membrane, the compound represented by the general formula (V) may preferably comprise a compound represented by one of general formulas (VIa) and (VIb) below

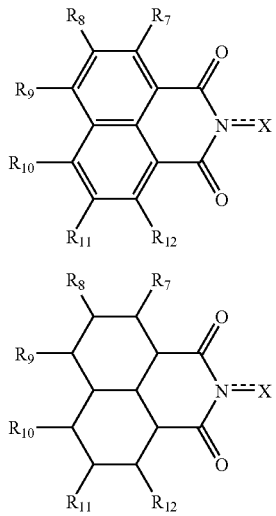

where $R_7$ to $R_{12}$ respectively denote elements of a set of hydrogen atoms, alkyl groups, hydroxyl groups, alkoxyl groups, carboxyl groups, alkoxycarbonyl groups, acyl groups, nitro groups, cyano groups, or ammo groups, mutually identical or different.

Further, the compound represented by one of the general formulas (V), (VIa) and (VIb) may preferably comprise at least one kind of imide compound selective from a set of N-hydroxyglutaric acid imide, N-hydroxy-1,8-naphthalene dicarboxylic acid imide, N-hydroxy-1,8-decalin dicarboxylic acid imide, N,N'-dihydroxy-1,8,4,5-naphthalene tetracarboxylic acid imide, N,N'-dihydroxy-1,8,4,5-decalin tetracarboxylic acid imide, and N,N',N"-trihydroxy isocyanuric acid imide.

The cyclic imide of 6-membered ring can be prepared by a standard imidizing reaction in which, for example, a correspondent acid anhydride of 6-membered ring reacts with hydroxylamine $NH_2OH$, whereby its acid anhydride radical has an opened ring, which is closed for imidization. This cyclic imide of 6-membered ring is disposed for a coexistence in the electrolyte membrane, like the cyclic imide of 5-membered ring, whereby elementary processes progress, as shown by formulas (C25) and (C26) below. And, simply upon an entry such as of hydroxyl radical or hydrogen peroxide into electrolyte membrane, the 6-membered imide ring supplies hydrogen radical, which efficiently reduces hydrogen peroxide, suppressing oxidation of the electrolyte membrane.

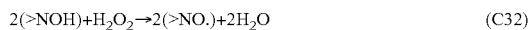

The supply of hydrogen generates N-oxyl radical (>NO.), which draws out hydrogen ion from hydrogen element or hydrogen peroxide, and returns to the original form of hydroxyimide (>NOH), as shown by formulas (C33) to (C35) below.

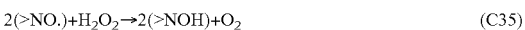

FIG. 6 shows N-hydroxy glutaric acid imide (NHGI) as a typical example of the compound having a hydroxy imide group, and glutaric acid imide N-oxyl (GINO) as an oxidant of NHGI in which NHGI is changed in a radical form, and illustrates a mechanism in which a cycle turns between hydroxy imide group of NHGI and N-oxyl radical of GINO, thereby having hydroxy radical as well as hydrogen peroxide vanished over a long term. That is, NHGI acts as a reducing agent on hydroxyl radical or hydrogen peroxide, for reducing hydroxyl radical or hydrogen peroxide into water. On the other hand, GINO acts as an oxidizing agent on hydrogen peroxide, for oxidizing hydrogen peroxide into oxygen. Like this, a redox cycle turns between NHGI and GINO, concurrently vanishing hydroxy radical as well as hydrogen peroxide.

Further, for the imide compound of six-membered ring involved in the solid polymer electrolyte according to this mode of embodiment, vanishment of hydrogen peroxide by the reduction and oxidation is associated with entry and exit of hydrogen radical (hydrogen atom). By the entry and exit of hydrogen radical, hydroxy radical generated upon decomposition of hydrogen peroxide is vanished even when residing in a place distant from that compound. This mechanism is like that shown in FIG. 13, there being constituted a Grotthuss mechanism that transfers hydrogen radical by exchange between NHPI and water molecules. Therefore, even if hydroxy radical is distant from NHPI catalytic reaction develops, vanishing hydroxy radical, allowing for vanishment of hydroxy radical even if. As a result, over a wide range in the electrolyte membrane, hydroxy radical residing there can be vanished.

Like this, the solid polymer electrolyte according to this mode of embodiment involves a compound that has a redox cycle, where it acts as a reducing agent in a range of potentials lower than a redox potential of hydroxy radical, and as an oxidizing agent in a range of potentials higher than a redox potential where hydrogen peroxide acts as a reducing agent. Therefore, this compound acts as a catalyst, and decomposes active oxygen. Therefore, C—F bond of electrolyte membrane is kept from being cut by hydroxyl radical or hydrogen peroxide, so that deterioration of electrolyte membrane can be prevented. Further, after the decomposition of active oxygen, this catalytic compound returns to an original reductant form by a redox cycle of the compound, allowing a repeated use many times. This enables implementation of a solid polymer electrolyte with a maintained durability. Further, in the case this compound is a cyclic imide of six-membered ring, it is slower in hydrolysis in comparison with the case of five-membered ring, and has a higher resistance to hydrolysis. Therefore, in the case of cyclic imide of six-membered ring, the durability is still more maintained.

The above-noted compound may preferably have a redox potential within a range of 0.68V to 1.00V. The four-electron reduction of oxygen accompanies side reactions that generate active oxygen. Such active oxygen involves superoxide anion ($O_2^-$) as a one-electron reductant of oxygen, hydroperoxy radical (.OOH) as a conjugate acid of superoxide, hydrogen peroxide ($H_2O_2$) as a two-electron reductant, and hydroxy radical (.OH) as a three-electron reductant Their generation mechanisms are considered as complex reactions by way of such elementary reaction processes as shown by formulas (C36) to (C40) below.

$$O_2 + e^- \rightarrow O2^- \quad (C36)$$

$$O_2^- + H^+ \rightarrow .OOH \quad (C37)$$

$$O_2 + 2H^+ + 2e^- \rightarrow 2H_2O_2 \quad (C38)$$

$$H_2O_2 + H^+ + e^- \rightarrow H_2O + .OH \quad (C39)$$

$$H_2O_2 \rightarrow 2.OH \quad (C40)$$

It is considered that generated free radicals are reduced, finally to water, by way of such elementary reaction process as shown by formulas (C41) to (C43) below, where $E°$ is a standard redox potential given in terms of NHE (normal hydrogen electrode).

$$.OOH + H^+ + e^- \rightarrow H_2O_2, E° = 1.50V \quad (C41)$$

$$H_2O_2 + 2H^+ + 2e^- \rightarrow 2H_2O, E° = 1.77V \quad (C42)$$

$$.OH + H^+ + e^- \rightarrow H_2O, E° = 2.85V \quad (C43)$$

Now controversial is hydroxy radical that has a high redox potential and has a strong oxidizability. Hydroperoxy radical, as well as hydrogen peroxide, may take the form of hydroxy radical on the way of reduction to water. Hydroxy radical, of which redox potential is as high as 2.85V, has a short life due to the strong oxidizability and the high reactivity as radial, and reacts with any molecule else, unless it is promptly reduced. It is considered that various deteriorations due to oxidation controversial in the fuel cell are mostly associated with hydroxy radical, and that the electrolyte membrane also is decomposed by hydroxy radical, as described. However, in the case the electrolyte contains a compound that has a redox cycle where it acts as a reducing agent in a range of potentials lower than the redox potential of hydroxy radical and as an oxidizing agent in a range of potentials than the potential where hydrogen peroxide acts as a reducing agent, that is, if the compound has a redox potential within a range of 0.68V to 2.85V (NHE), this compound does act as a catalyst, decomposing hydroxy radical, hydrogen peroxide, etc.

It is known that hydrogen peroxide acts as a reducing agent on a substance whose redox potential is higher than hydrogen peroxide, and on the other hand, as an oxidizing agent on a substance whose redox potential is lower than hydrogen peroxide, as in the formula (C42) and as in a formula (C44) below.

$$H_2O_2 \rightarrow O_2 + 2H^+ + 2e^-, E° = 0.68V \quad (C44)$$

In the case a compound that has a redox potential of 0.68V or more is contained in the electrolyte membrane, hydrogen peroxide acts as a reducing agent on the compound, so that hydrogen peroxide is oxidized and decomposed by the compound. On the other hand, in the case a compound contained in the electrolyte membrane has a redox potential of 2.85V or less, this compound acts as a reducing agent on hydroxy radical, so that hydroxy radical is decomposed by reduction to water. In the case a fluorine system membrane is used as the electrolyte membrane, this fluorine system membrane has a tendency to be oxidized by a compound of which redox potential is 2.5V or more, and is almost flee from the anxiety that this electrolyte membrane may be oxidized by a compound contained in the electrolyte membrane. On the other hand, in the case of a hydrocarbon system electrolyte used as the electrolyte membrane, substituting typical organic compounds therefor, benzene is to be oxidized at 2.00V, toluene is at 1.93V, and xylene is at 1.58V, thus constituting the possibility that the hydrocarbon system electrolyte membrane may be oxidized if the compound contained in the electrolyte membrane has a high redox potential. Therefore, by setting the redox potential of antioxidant within a range of 1.00V or less, the electrolyte membrane can be kept from being oxidized even in use of a hydrocarbon system membrane, allowing for effective decomposition of hydrogen peroxide and hydroxy radical.

In the solid polymer electrolyte according to this mode of embodiment that has a compound whose redox potential ranges 0.68V to 1.00V (NHE), hydroxy radical and hydrogen peroxide are decomposed by catalysis of that compound included in the electrolyte membrane, without oxidizing the electrolyte membrane. Further, the compound that has a catalysis by which active oxygen is decomposed takes forms of an oxidant and a reductant after the decomposition of active oxygen, in a redox cycle of the compound, and can be used many times. It therefore is possible to implement an electrolyte for solid high-polymer type fuel cells with a maintained duration performance.

The compound represented by the general formula (I) may comprise a compound represented by a general formula (VII) below

(VII)

where $R_{13}$ and $R_{14}$ each respectively denote an alkyl group, or an alkyl group substituted in part by an arbitrary radical, wherein $R_{13}$ and $R_{14}$ may be chained, ringed, or branched $R_{13}$ and $R_{14}$ may be mutually combined to form a ring, and may include oxygen and nitrogen atoms. In use of the compound represented by the general formula (VII), the redox potential is low, so that the reduction reaction of oxygen is the more promoted. In the compound represented by the general formula (VII), substituents $R_{13}$ and $R_{14}$ may include linear chain or branch chain alkyl groups of carbon numbers within a range of 1 to 10 or near, for example, a methyl, an ethyl, a propyl, an isopropyl, a butyl, an isobutyl, a sec-butyl, a t-butyl, a pentyl, a hexyl, a heptyl, an octyl, and a decyl group, and the like. They may preferably have carbon numbers within a range of 1 to 6 or near, or more preferably, be as lower alkyl groups as carbon numbers within a range of 1 to 4 or near.

The compound represented by the general formula (VII) may preferably comprise a compound represented by a general formula (VIII) below

(VIII)

where $R_{13}$ to $R_{16}$ each respectively denote an alkyl group, or an alkyl group substituted in part by an arbitrary radical, wherein $R_{13}$ to $R_{16}$ may be chained, ringed, or branched Among them, $R_{13}$ and $R_{14}$, or $R_{15}$ and $R_{16}$ may be mutually combined to form a ring, and they may include oxygen and nitrogen atoms. In the compound represented by the general formula (VIII), substituents $R_{13}$ to $R_{16}$ may include linear chain or branch chain alkyl groups of carbon numbers within a range of 1 to 10 or near, for example, a methyl, an ethyl, a propyl, an isopropyl, a butyl, an isobutyl, a sec-butyl, a t-butyl, a pentyl, a hexyl, a heptyl, an octyl, and a decyl group, and the like. They may preferably have carbon numbers within a range of 1 to 6 or near, or more preferably, be as lower alkyl groups as carbon numbers within a range of 1 to 4 or near.

The compound represented by the general formula (VIII) may preferably comprise a compound represented by a general formula (IX) below

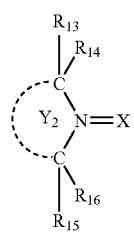

(IX)

where a ring $Y_2$ denotes a 5-membered or 6-membered ring formed by $R_{13}$ and $R_{14}$ mutually combined. As such rings, there may be taken, for example, nonaromatic hydrocarbon rings, such as cycloalkene rings, e.g., cyclohexane ring, and cycloalkene rings, e.g. cyclohexene ring, nonaromatic bridging rings, such as bridging type hydrocarbon rings, e.g. five-norbornene ring, and aromatic rings, such as benzene rings and naphthalene rings. It is noted that those rings may have a substituent group.

The compound represented by the general formula (IX) may preferably comprise a compound represented by a general formula (X) below

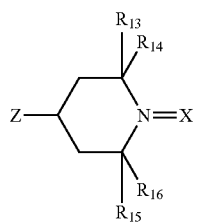

(X)

where Z denotes a kind of substituent selective from a set of alkyl groups, aryl groups, alkoxy groups, carboxyl groups, alkoxycarbonyl groups, cyano groups, hydroxyl groups, nitro groups, amino groups, and substituent groups including a hydrogen atom. For Z being an alkyl group, the an alkyl group may be substituted in part by an arbitrary radical, may be chained, ringed, or branched in part, and may include oxygen and nitrogen atoms. For Z being an aryl group, the aryl group may be substituted in part by an arbitrary radical, and may include oxygen and nitrogen atoms. The compound represented by the general formula (X) is hardly hydrolyzable, and in use as a catalyst, it allows a long-term service, allowing for the more reduced amount of catalyst in use.

For substituent Z in the compound represented by the general formula (X), there may be taken alkyl groups, in particular those of like alkyl groups to the before-mentioned alkyl groups, which have carbon numbers within a range of 1 to 6 or near, while as aryl groups, there may be taken phenyl groups and naphthyl groups. There may be taken alkoxy groups, in particular those of like alkoxy groups to the before-mentioned alkoxy groups, which have carbon numbers within a range of 1 to 6 or near, and as carboxyl groups, those carboxyl groups which have carbon numbers within a range of 1 to 4 or near, for example. As alkoxycarbonyl groups, there may be taken those alkoxycarbonyl groups whose alkoxy parts have carbon numbers within a range of 1 to 10 or near, for example, a methoxycarbonyl, an ethoxycarbonyl, a propoxy carbonyl, an isopropoxy carbonyl, a butoxycarbonyl, an isobutoxycarbonyl, a t-butoxycarbonyl, a pentyloxy carbonyl, and a hexyloxy carbonyl group, and the like. They may preferably have carbon numbers of alkoxy parts within a range 1 to 6 or near, or more preferably, be as lower alkoxycarbonyl groups as carbon numbers within a range of 1 to 4 or near.

As an example of compound represented by the general formula (X), there is now taken TEMPO (2,2,6,6-tetramethylpiperidine-1-oxyl). FIG. 7 shows examples of compounds represented by the general formula (X), with TEMPO inclusive. FIG. 7 (i) shows TEMPO, which is an N-hydroxyimide derivative that has a reversible redox-cycle, and performs oxidation and reduction by elementary reactions shown by formulas (C45) and (C46) below, where it has a redox potential of 0.8 V.

$$TEMPO^+ + e^- \rightarrow TEMPO, E° = 0.81V \qquad (C45)$$

$$TEMPO \rightarrow TEMPO^+ + e^-, E° = 0.81V \qquad (C46)$$

The redox potential of TEMPO is higher than that of hydrogen peroxide, and lower than that of hydroxyl radical. Therefore, TEMPO acts as an oxidizing agent on hydrogen peroxide, oxidizing hydrogen peroxide to oxygen, and as a reducing agent on hydroxyl radical, reducing hydroxyl radical to water.

The compound represented by the general formula (IX) may comprise a compound represented by a general formula (XI) below

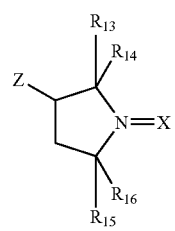

(XI)

where Z denotes a kind of substituent selective from a set of alkyl groups, aryl groups, alkoxy groups, carboxyl groups, alkoxycarbonyl groups, cyano groups, hydroxyl groups, nitro groups, ammo groups, and substituent groups including a hydrogen atom. For Z being an alkyl group, the an alkyl group may be substituted in part by an arbitrary radical, may be chained, ringed, or branched in part, and may include oxygen and nitrogen atoms. For Z being an aryl group, the aryl group may be substituted in part by an arbitrary radical, and may include oxygen and nitrogen atoms.

The compound represented by the general formula (IX) may comprise a compound represented by a general formula (XII) below

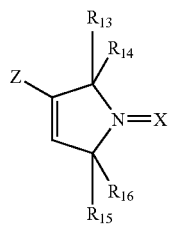

(XII)

where Z denotes a kind of substituent selective from a set of alkyl groups, aryl groups, alkoxy groups, carboxyl groups, alkoxycarbonyl groups, cyano groups, hydroxyl groups, nitro groups, amino groups, and substituent groups including a hydrogen atom. For Z being an alkyl group, the an alkyl group may be substituted in part by an arbitrary radical, may be chained, ringed, or branched in part, and may include oxygen and nitrogen atoms. For Z being an aryl group, the aryl group may be substituted in part by an arbitrary radical, and may include oxygen and nitrogen atoms. Also these compounds are hardly hydrolysable like that represented by the general formula (X), and hence, in use as a catalyst, they allow a long-term service, allowing for the more reduced amount of catalyst in use. For compounds represented by the general formula (XI) or (XII), the substituents to be employed may be like to the compound represented by the general formula (X).

Examples of compounds represented by the general formula (XI) or (XII) are shown in FIG. 8 to FIG. 10. As examples of compounds represented by the general formula (XI) or (XII), PROXYL (2,2,5,5-tetraethylpyrrolidine-1-oxyl) and DOXYL (4,4-dimethyloxazolidine-3-oxyl) are now taken. Like TEMPO, these compounds also have their reversible redox cycles, where they have redox potentials within a range of 0.68V to 1.00V. Therefore, also these compounds act as an oxidizing agent on hydrogen peroxide, for oxidizing hydrogen peroxide to oxygen, and as a reducing on hydroxy radical, for reducing hydroxy radical to water.

FIG. 11 shows a redox cycle of TEMPO as a representative example of such compounds, illustrating a mechanism for inactivation of hydrogen peroxide and hydroxy radical by TEMPO. This redox mechanism is a complex reaction composed of a plurality of elementary reactions shown by formulas (C47) to (C52) below.

 (C47)

 (C48)

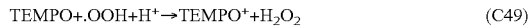 (C49)

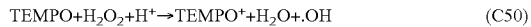 (C50)

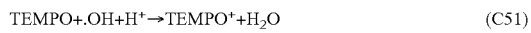 (C51)

 (C52)

Oxygen in the air is a triplet radical molecule in the ground state, called triplet oxygen, which cooperates with TEMPO for transfer of electron therebetween at a normal temperature under normal pressure, as shown by the formula (C47), to form a CT (charge transfer) complex. At this time, nitrogen atom of TEMPO being quaternized to $N^+$, TEMPO becomes $TEMPO^+$, while oxygen is activated in the form of super-oxide ($O_2^-$). Active super-oxide immediately reacts to hydrogen ion, generating peroxy radical (.OOH). Peroxy radical has a high reduction potential of 1.50V, as a species more active than oxygen, which generates hydrogen peroxide through a reaction shown by the formula (C49). Though not being radical, hydrogen peroxide is yet active under presence of catalyst, and has a high reduction potential of 1.77V, as a species more active than oxygen, which receives electron from another TEMPO, and generates water and hydroxyl radical (.OH), as shown by the formula (C50). This TEMPO is activated to $TEMPO^+$.

Hydroxyl radical thus generated has a great reduction potential of 2.85V, as a very active species, so that it receives electron from another TEMPO, generating water, as shown by the formula (C51). By elementary reactions of formulas (C47) to (C51), a four-electron reduction of oxygen develops, which generates four TEMPO molecules. $TEMPO^+$ also is an active species, which receives an electron (e) from the positive electrode of fuel cell, whereby TEMPO is recovered, as shown by the formula (C52). Like this, TEMPO has the function of a four-electron reduction of oxygen with respect to the potential, as well, and can have a sustained function as a catalyst for vanishing hydrogen peroxide, hydroxy radical, etc. over a long term Further, TEMPO is not hydrolyzable, and can be used over a long term, thus allowing for implementation of a solid polymer electrolyte with a maintained durability.

It is noted that the solid polymer electrolyte according to this mode of embodiment can be employed as an electrolyte membrane for fell cells of a solid high-polymer type. In this respect, for fuel cells using a high-polymer electrolyte membrane of proton exchange type, no limitation is provided to the kind of fuel, and it is employable to any one of a hydrogen type fuel cell, a direct methanol type fuel cell, a direct hydrocarbon type fuel cell, and the like. This case allows for implementation of a fuel cell with a maintained durability.

This fuel cell is employable for fuel cell systems using a high-polymer electrolyte membrane of proton exchange type, and has applications thereof not limited to a fuel cell vehicle, and is applicable, for example, to a fuel cell cogeneration power generating system, a fuel cell home electric appliance, a fuel cell portable device, a fuel cell transport machine, and the like.

EXAMPLES

Description will be made of fuel cell systems according to examples 1 to 12 of embodiment of the invention and comparative examples 1 and 2, while the scope of the invention is not limited thereto. Those examples exemplify fuel cell systems using different antioxidants, examining their effectiveness.

<Sample Preparation>

Example 1

A film of Nafion® 117 of Du Pont Co., 175 μm thick, was cut into 1 cm squares to be used as solid polymer electrolyte membranes. Nafion® membranes were pretreated to the NEDO PEFC R&D project standard treatment, where they were boiled: in 3% hydrogen peroxide aqueous solution for 1 hour, and in distilled water for 1 hour, then, in 1M sulfuric acid solution for 1 hour, and finally, in distilled water for 1 hour, in this order.

Next, for a facilitated ageing resistance judgment in endurance test, pretreated Nafion® membranes were subjected to an ion exchange treatment, where they were soaked in 100 mM FeSO$_4$ aqueous solution for one night or more, and ultrasonically cleaned in distilled water for 15 minutes, for removing ions adhering to membrane to thereby exchange counter ions of Nafion® from H$^+$ to Fe2$^+$. Wako pure medicine high grade FeSO$_4$.7H$_2$O was used as a reagent Next, platinum-supporting carbon (20 wt % Pt/Vulcan XC-72, Cabot Co.) was coated 1 mg/cm$^2$ on both sides of each ion-exchanged electrolyte membrane to fabricate a membrane electrode assembly (MEA). Fabricated MBA was assembled in a single cell, to provide a unit cell for PEFC to be 5 cm$^2$. 70° C. humidified hydrogen gas (atmospheric pressure) as the fuel electrode side gas and 70° C. humidified oxygen gas (atmospheric pressure) as the air electrode side gas were supplied, via bubblers, to a unit cell held 70° C. As an antioxidant for inactivation of active oxygen, 1 mM NHPI aqueous solution was fed, using a liquid feed pump, by a flow rate of 1 cm$^3$/minute to a fuel gas port. The unit cell was controlled to be held 70° C.

Example 2

Instead of NHPI aqueous solution, NHMI (N-hydroxy maleic acid imide) aqueous solution was used as an antioxidant for example 2, of which treatment was like to example 1.

Example 3

Instead of NHPI aqueous solution, NHSI (N-hydro-oxy succinic acid imide) aqueous solution was used as an antioxidant for example 3, of which treatment was like to example 1.

Example 4

Instead of NHPI aqueous solution, NHGI (N-hydroxyglutaric acid imide) aqueous solution was used as an antioxidant for example 4, of which treatment was like to example 1.

Example 5

Instead of NHPI aqueous solution, THICA (N,N',N"-trihydroxy isocyanuric acid) aqueous solution was used as an antioxidant for example 5, of which treatment was like to example 1.

Comparative Example 1

Comparative example 1 was set to the example 1, as it had no antioxidant aqueous solution fed.

In example 6 to example 11, an S-PES (sulfonated polyethersulfone) film was employed as solid polymer electrolyte membrane. As the S-PES film procured and used was an equivalent to that described in p. 31 of "researches and developments of a durability-elevated hydrocarbon system electrolyte membrane for proton-exchange membrane fuel cells in the proton-exchange membrane fuel cell elements technology development and like program in the proton-exchange membrane fuel cell system technology project", 2002 yearly results report of the New Energy and Industrial Technology Development Organization of Japan.

Example 6

An S-PES film 170 μm thick was cut into 1 cm squares, and platinum-supporting carbon (Cabot Co. make 20 wt % Pt/Vulcan XC-72) was coated by 1 mg/cm$^2$ on both sides of an S-PES membrane to fabricate a membrane electrode assembly (MEA). Fabricated MEA was assembled in a single cell, to provide a unit cell for PEFC, which was a 5-cm$^2$ unit cell. 70° C. humidified hydrogen gas (atmospheric pressure) as the fuel electrode side gas and 70° C. humidified oxygen gas (atmospheric pressure) as the air electrode side gas were supplied, via bubblers, to a unit cell held 70° C. As an antioxidant for inactivation of active oxygen, 1 mM TEMPO-OH aqueous solution was fed, using a liquid feed pump, by a flow rate of 1 cm$^3$/minute to a fuel gas port. The unit cell was controlled to be held 70° C.

Example 7

Instead of TEMPO-OH aqueous solution, TEMPO-COOH (Aldrich Co.) aqueous solution was used as an antioxidant for example 7, of which Eminent was like to example 6.

Example 8

Instead of TEMPO-OH aqueous solution, TEMPO (Aldrich Co.) aqueous solution was used as an antioxidant for example 8, of which treatment was like to example 6.

Example 9

Instead of TEMPO-OH aqueous solution, PROXYL-CONH$_2$ (Aldrich Co.) aqueous solution was used as an antioxidant for example 9, of which treatment was like to example 6.

Example 10

Instead of TEMPO-OH aqueous solution, PROXYL-COOH (Aldrich Co.) aqueous solution was used as an antioxidant for example 10, of which treatment was like to example 6.

Example 11

Instead of TEMPO-OH aqueous solution, 3-carbamoyl-2,2,5,5-tetramethylpyrroline-1-yloxy (Aldrich Co.) aqueous solution was used as an antioxidant for example 11, of which treatment was like to example 6.

Example 12

Instead of TEMPO-OH aqueous solution, DTBN (di-t-butylnitroxide: Aldrich Co.) aqueous solution was used as an antioxidant for example 12, of which treatment was like to example 6.

Comparative Example 2

Comparative example 2 was set to the example 6, as it had no antioxidant aqueous solution fed.

Figure 14:
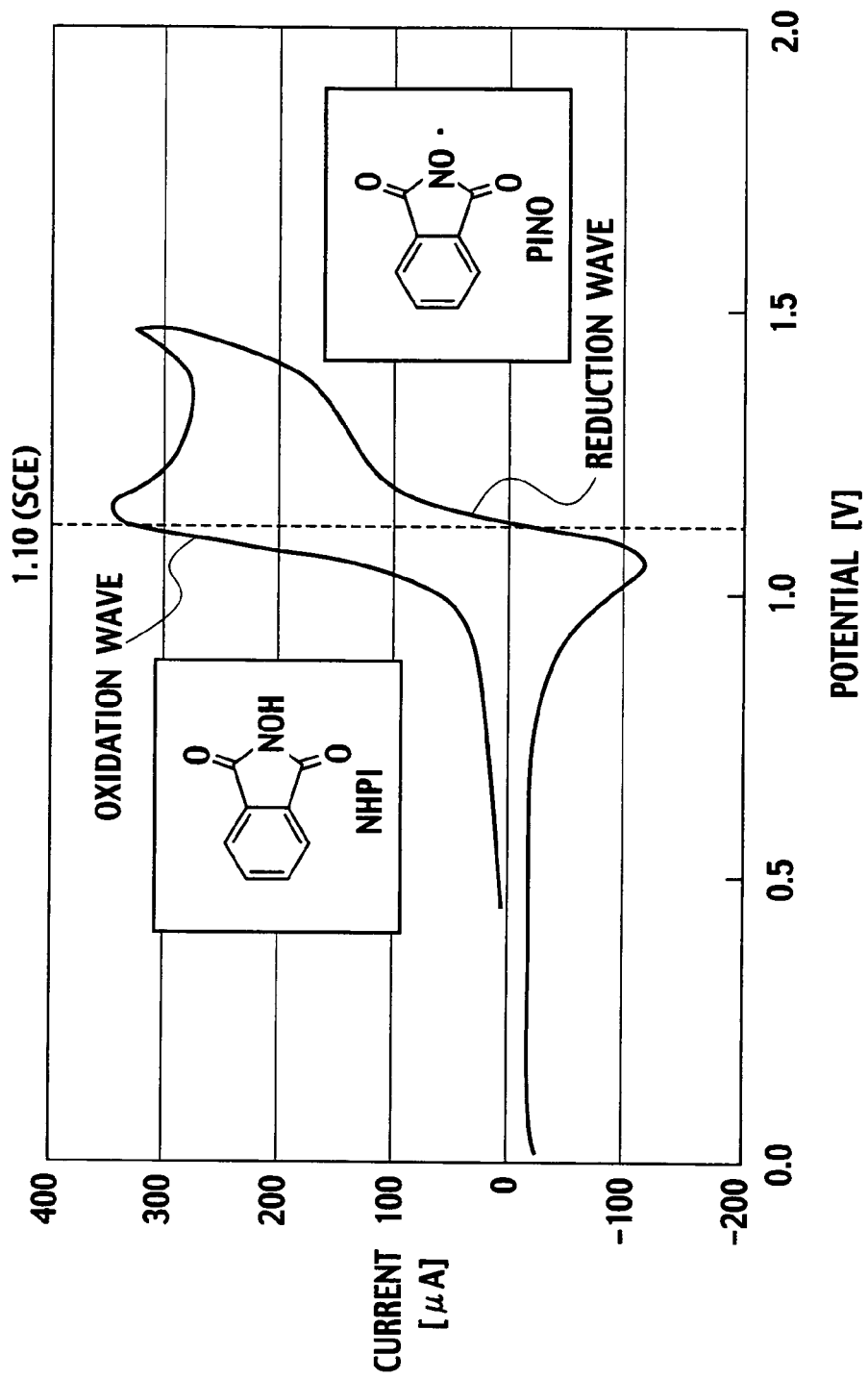
FIG. 14 is a cyclic voltammogram in electrode reactions of NHPI.
Figure 15:
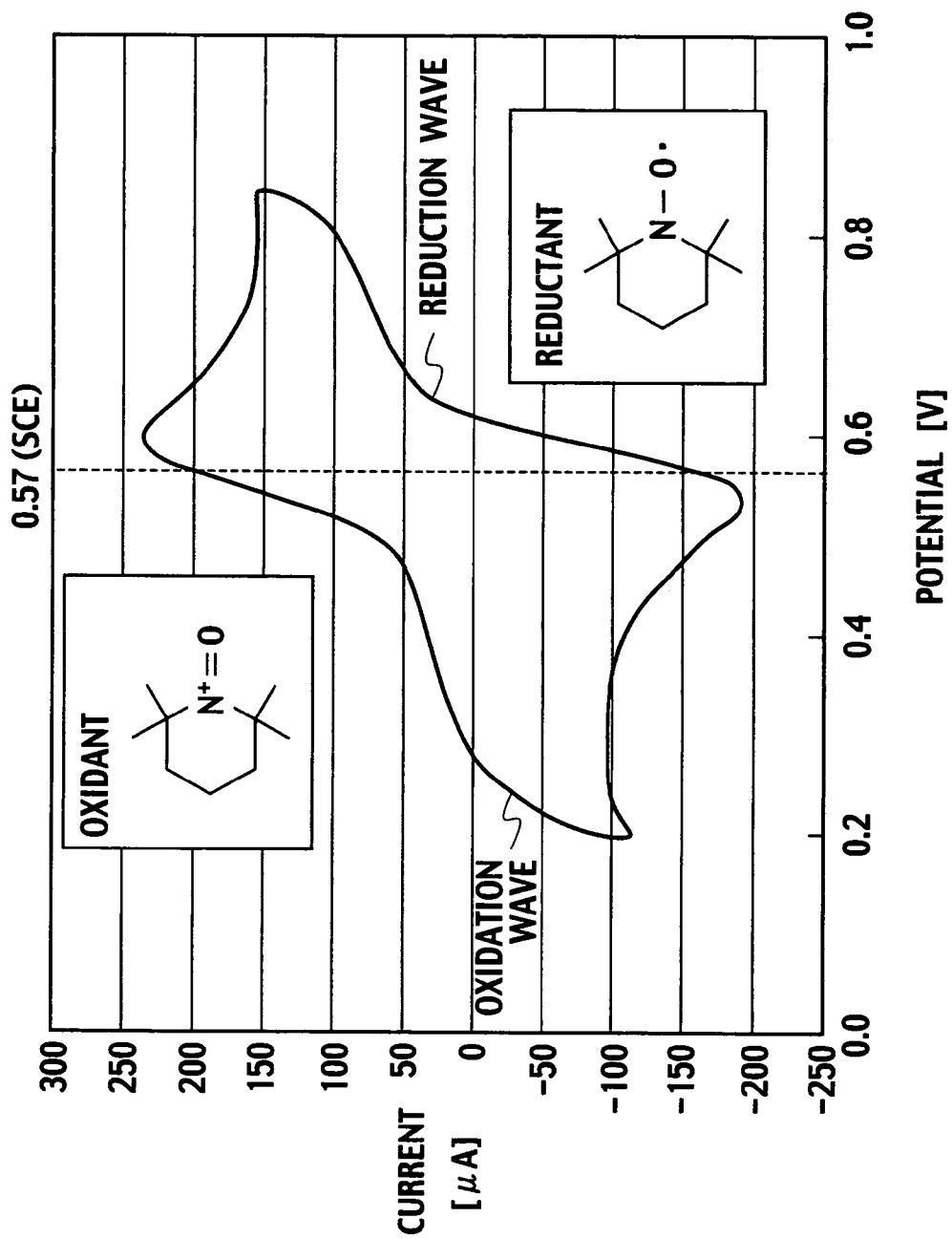
FIG. 15 is a cyclic voltammogram in electrode reactions of TEMPO.

Samples of the foregoing examples were evaluated, as follows:
<Measurements of Redox Potential>
Redox potentials of the compounds employed in the examples were measured by using glassy carbon as an acting electrode, platinum as a counter electrode, a saturated calomel electrode (SCE) as a reference electrode, and 1M sulfuric acid as an electrolytic solution. Exemplary measurements of NHPI as a typical imide system compound and TEMPO as a typical TEMPO system compound are shown in FIG. 14 and FIG. 15. Graphs in FIG. 14 and FIG. 15 are corrected to standard potential E° (NHE) to be consistent with redox potentials of respective substances. Redox potential of NHPI resides near 1.10V (SCE) as shown in FIG. 14, and redox potential of TEMPO resides near 0.57V (SCE) as seen from FIG. 15. As will be seen from those potentials, NHPI and TEMPO are compounds that function as a reducing agent on hydroxy radical, and compounds that function as an oxidizing agent on hydrogen peroxide, as compounds meeting the present objective.

<Start and Stop Repeating Endurance Test>

Figure 16:
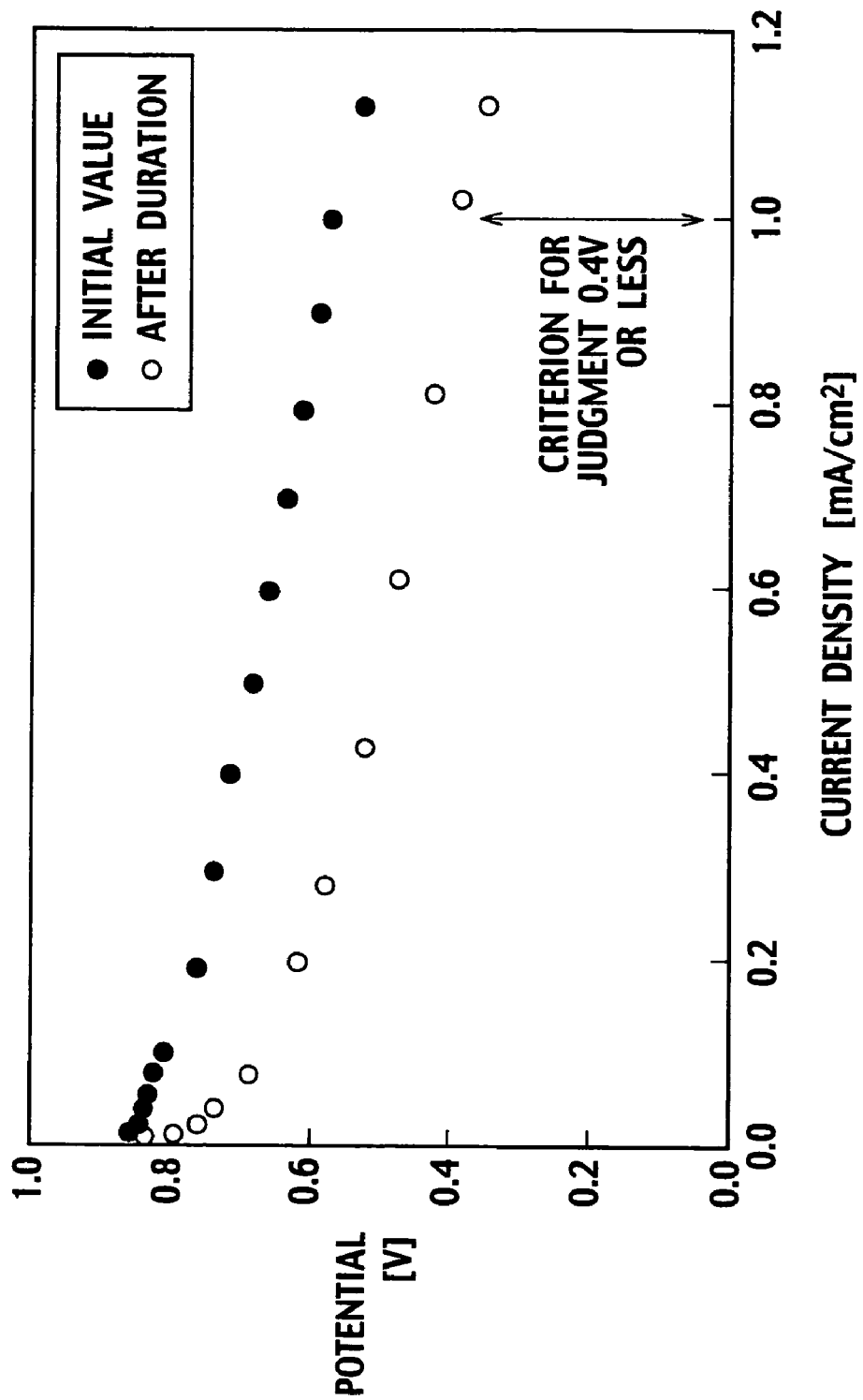
FIG. 16 is a graph showing, for unit cells of a fuel cell fabricated in an embodiment example 1, a potential vs current curve by initial values of a start-stop repeating endurance test, and a potential vs. current curve after endurance.

An open-circuit condition was held at the fuel electrode side for 30 minutes, to start the test. In the test, supplying gas to the unit cell by a flow rate of 300 dm³/min, the current density was increased from a discharge open-circuit condition, making discharge till the terminal voltage gets below 0.3V. Then, after the terminal voltage had got below 0.3V, an open-circuit condition was again held for 5 minutes. This operation was repeated for comparison of the endurance performance in terms of the number of times when the voltage gets below 0.4V under a condition of power generation with a current density of 1 mA/cm³. FIG. 16 shows, as an example of a start and stop repeating endurance test for a unit cell of fuel cell prepared in the example 1, a graph of initial values of current-voltage curve, and a current-voltage curve after duration. In this graph, under the condition of power generation with the current density of 1 mA/cm³, the voltage gets below 0.4V at a number of times, which is referred to as start-stop repetition time number.

<Analysis of Emitted Substances at Air Electrode>

For analysis of deterioration of Nafion® membrane, measurements were made of concentrations of fluoride ions and sulfate ions emitted upon decomposition of the membrane. For S-PES membrane, concentration measurements were made of sulfate ions emitted upon membrane decomposition. For detection of transferred ions, discharged liquid from the air electrode was collected, and measured by using an ion chromatograph The ion chromatograph was a Daionecc Co. make (model name: CX-120). As a specific test method for respective examples, as well as for comparative examples, comparison was made of samples of liquid discharged from the air electrode upon a completion of 100 times of repetition in the start and stop repeating endurance test. Further, gases emitted at the air electrode were measured by using a gas chromatograph mass spectrometer. The gas chromatograph mass spectrometer used was a Shimadzu Co. make (GCMS-QP5050).

For example 1 to example 12 and comparative example 1 and comparative example 2, the type of electrolyte membrane, used antioxidant, redox potential of antioxidant, start-stop repetition time number, and presence or absence of emission of fluoride ion, sulfate ion, and carbon dioxide at the air electrode are listed in Table 1 and Table 2 below.

TABLE 1

| | Electrolyte Membrane | Anti-oxidant | Redox Pot.*) | Repetition Time No. | Fluoride Ion**) | Sulfate Ion**) | $CO_2$**) |
|---|---|---|---|---|---|---|---|
| Example 1 | Nafion | NHPI | 1.34 V | 1250 | No | No | Yes |
| Example 2 | Nafion | NHMI | 1.34 V | 1170 | No | No | Yes |
| Example 3 | Nafion | NHSI | 1.36 V | 1210 | No | No | Yes |
| Example 4 | Nafion | NHGI | 1.38 V | 1430 | No | No | Yes |
| Example 5 | Nafion | THICA | 1.40 V | 1450 | No | No | Yes |
| Com. Ex 1 | Nafion | None | — | 120 | Yes | Yes | No |

*)Redox potential of antioxidant
**)Yes: Present, No: Absent

TABLE 2

| | Electrolyte Membrane | Anti-oxidant | Redox Pot.*) | Repetition Time No. | Fluoride Ion**) | Sulfate Ion**) | $CO_2$**) |
|---|---|---|---|---|---|---|---|
| Example 6 | S-PES | TEMPO-OH | 0.81 V | 740 | — | No | Yes |
| Example 7 | S-PES | TEMPO-COOH | 0.81 V | 760 | — | No | Yes |
| Example 8 | S-PES | TEMPO | 0.81 V | 730 | — | No | Yes |
| Example 9 | S-PES | PROXYL-$CONH_2$ | 0.85 V | 730 | — | No | Yes |
| Example 10 | S-PES | PROXYL-COOH | 0.86 V | 730 | — | No | Yes |
| Example 11 | S-PES | ***) | 0.95 V | 610 | — | No | Yes |
| Example 12 | S-PES | DTBN | 0.80 V | 650 | — | No | Yes |
| Com. Ex 2 | S-PES | None | — | 80 | — | Yes | No |

*)Redox potential of antioxidant
**)Yes: Present, No: Absent
***)3-carbamoyl-2,2,5,5-tetramethylpyrroline-1-yloxy The antioxidants employed in example 1 to example 12 had their redox potentials within a range of a potential of 0.68V (NHE) where hydrogen peroxide acts as an oxidizing agent and a potential of 1.77V (NHE) where hydrogen peroxide acts as a reducing agent, thus meeting the objective.

For the comparative example 1 supplied with no antioxidant, the start and stop repeating endurance test showed, under the condition of power generation with a current density of 1 mA/cm³, a voltage drop to a level of 0.4 V or less at a start-stop repetition time number of 120. To the contrary, in each of example 1 to example 5 supplied with an antioxidant, the voltage dropped below 0.4V about a start-stop repetition time number of 1200, as a verification of a suppressed deterioration of solid polymer electrolyte membrane by addition of the antioxidant, with an enhanced durability. In example 6 to example 12, the voltage dropped below 0.4V at a start-stop repetition time number of 600 or more, which verified an enhanced endurance due to suppressed deterioration of electrolyte membrane.

Ion chromatograph analyses revealed a detection of fluoride ion and sulfate ion in the comparative example 1, and a detection of sulfate ion in the comparative example 2, supporting a deterioration by decomposition of electrolyte membrane. On the contrary, in each of example 1 to example 5, emission of fluoride ion and sulfate ion was below detection limits, proving a suppressed decomposition of Nafion® membrane by introduction of antioxidant In each of example 6 to example 12, as well, emission of sulfate ion was below detection limits, proving a suppressed decomposition of S-PES membrane by introduction of antioxidant For example 1 to example 12 where an antioxidant was introduced, measurements by gas chromatograph mass spectrometer revealed a detection of $CO_2$, supporting that the antioxidant, as it had been introduced from the fuel electrode and served for inactivation of active oxygen, was oxidized at the air electrode, emitting $CO_2$.

Although perfluorosulfonic acid system polymers typified by the Nafion® film having wide application to an electrolyte membrane of a fuel cell in a fuel cell system, as well as hydrocarbon system polymers referred to S-PES, are put in a situation where they are unsuccessfully considered having a sufficient tolerance by generation of active oxygen at an air electrode of the fuel cell, as will be seen from the foregoing description, by mixing or dissolving an antioxidant to a liquid fuel according to an embodiment of the invention, active oxygen can be decomposed even if the generation is continuous, thus enabling a prevention of deterioration of the electrolyte membrane, allowing for an enhanced durability of fuel cell system.

Description is now specifically made of solid polymer electrolytes according to examples 13 to 34 of embodiment of the invention and comparative examples 3 and 4, while the scope of the invention is not limited thereto. Those examples exemplify solid polymer electrolytes prepared with different materials, examining their effectiveness.

<Sample preparation>

Example 13

A film of Nafion® 117 of Du Pont Co., 175 μm thick, was cut into 1 cm squares to be used. Nafion® membranes were pretreated to the NEDO PEFC R&D project standard treatment, where they were boiled: in 3% hydrogen peroxide aqueous solution for 1 hour, and in distilled water for 1 hour, then, in 1M sulfuric acid solution for 1 hour, and finally, in distilled water for 1 hour, in this order.

Next, as a catalyst for vanishment of active oxygen, i.e., as an active oxygen washing catalyst, 0.5 mM of NHPI was added to pretreated Nafion® membranes, which were thereafter soaked, for evaluation use, for 12 hours at 80° C. in 10 cm³ of 10% hydrogen peroxide, as it was prepared by diluting 30% hydrogen peroxide solution (Wako pure medicine high grade) with ultra-pure water.

Example 14

For promoting deterioration in hydrogen peroxide endurance test, pretreated Nafion® membranes were soaked in 100 mM $FeSO_4$ aqueous solution for one night or more, and ultrasonically cleaned in distilled water for 15 minutes, for removing ions adhering to membrane to thereby exchange counter ions of Nafion® from $H^+$ to $Fe^{2+}$. Wako pure medicine high grade $FeSO_4 \cdot 7H_2O$ was used as a reagent.

Next, like the example 13, 0.5 mM of NHPI was added as an active oxygen washing catalyst to ion-exchanged Nafion® membranes, which were thereafter soaked, for evaluation use, for 12 hours at 80° C. in 10 cm³ of 10% hydrogen peroxide, as it was prepared by diluting 30% hydrogen peroxide solution (Wako pure medicine high grade) with ultra-pure water.

Example 15

Instead of NHPI aqueous solution, 0.5 mM of N-hydroxymaleic acid imide aqueous solution was used as an active oxygen vanishing catalyst for example 15, of which treatment was like to example 13.

Example 16

Instead of NHPI aqueous solution, 0.5 mM of N-hydroxymaleic acid imide aqueous solution was used as an active oxygen vanishing catalyst for example 16, of which treatment was like to example 14.

Example 17

Instead of NHPI aqueous solution, 0.5 mM of N-hydroxysuccinic acid imide aqueous solution was used as an active oxygen vanishing catalyst for example 17, of which treatment was like to example 13.

Example 18

Instead of NHPI aqueous solution, 0.5 mM of N-hydroxymaleic acid imide aqueous solution was used as an active oxygen vanishing catalyst for example 18, of which treatment was like to example 14

Example 19

Instead of NHPI aqueous solution, 0.5 mM of N-hydroxytrimellitic acid imide aqueous solution was used as an active oxygen vanishing catalyst for example 19, of which treatment was like to example 13.

Example 20

Instead of NHPI aqueous solution, 0.5 mM of N-hydroxytrimellitic acid imide aqueous solution was used as an active oxygen vanishing catalyst for example 20, of which treatment was like to example 14.

Example 21

Instead of NHPI aqueous solution, 0.5 mM of N,N'-dihydroxypyromellitic acid imide aqueous solution was used as an active oxygen vanishing catalyst for example 21, of which treatment was like to example 13.

Example 22

Instead of NHPI aqueous solution, 0.5 mM of N,N'-dihydroxypyromellitic acid imide aqueous solution was used as an active oxygen vanishing catalyst for example 22, of which treatment was like to example 14.

Example 23

Instead of NHPI aqueous solution, 0.5 mM of N-hydroxyglutaric acid imide (NHGI) aqueous solution was used as an active oxygen vanishing catalyst for example 23, of which treatment was like to example 13.

Example 24

Instead of NHPI aqueous solution, 0.5 mM of N-hydroxyglutaric acid imide (NHGI) aqueous solution was used as an active oxygen vanishing catalyst for example 24, of which treatment was like to example 14.

Example 25

Instead of NHPI aqueous solution, 0.5 mM of N-hydroxy-1,8-naphthalenedicarboxylic acid imide (NHNDI) aqueous solution was used as an active oxygen vanishing catalyst for example 25, of which treatment was like to example 13.

Example 26

Instead of NHPI aqueous solution, 0.5 mM of N-hydroxy-1,8-naphthalenedicarboxylic acid imide (NHNDI) aqueous solution was used as an active oxygen vanishing catalyst for example 26, of which treatment was like to example 14.

Example 27

Instead of NHPI aqueous solution, 0.5 mM of N-hydroxy-1,8-decalindicarboxylic acid imide (NHDDI) aqueous solution was used as an active oxygen vanishing catalyst for example 27, of which treatment was like to example 13.

Example 28

Instead of NHPI aqueous solution, 0.5 mM of N-hydroxy-1,8-decalindicarboxylic acid imide (NHDDI) aqueous solution was used as an active oxygen vanishing catalyst for example 28, of which treatment was like to example 14.

Example 29

Instead of NHPI aqueous solution, 0.5 mM of N,N'-dihydroxy-1,8,4,5-naphthalenetetracarboxylic acid imide (NHNTI) aqueous solution was used as an active oxygen vanishing catalyst for example 29, of which treatment was like to example 13.

Example 30

Instead of NHPI aqueous solution, 0.5 mM of N,N'-dihydroxy-1,8,4,5-naphthalenetetracarboxylic acid imide (NHNTI) aqueous solution was used as an active oxygen vanishing catalyst for example 30, of which treatment was like to example 14.

Example 31

Instead of NHPI aqueous solution, 0.5 mM of N,N'-dihydroxy-1,8,4,5-decalintetracarboxylic acid imide (NHDTI) aqueous solution was used as an active oxygen vanishing catalyst for example 31, of which treatment was like to example 13.

Example 32

Instead of NHPI aqueous solution, 0.5 mM of N,N'-dihydroxy-1,8,4,5-decalintetracarboxylic acid imide (NHDTI) aqueous solution was used as an active oxygen vanishing catalyst for example 32, of which treatment was like to example 14.

Example 33

Instead of NHPI aqueous solution, 0.5 mM of N,N',N"-trihydroxyisocyanuric acid (THICA) aqueous solution was used as an active oxygen vanishing catalyst for example 33, of which treatment was like to example 13.

Example 34 stead of NHPI aqueous solution, 0.5 mM of N,N',N"-trihydroxyisocyanuric acid (THICA) aqueous solution was used as an active oxygen vanishing catalyst for example 34, of which treatment was like to example 13.

Comparative Example 3

For comparative example 3, Nafion® membranes were pretreated by like method to example 13, without addition of active oxygen vanishing catalyst.

Comparative Example 4

For comparative example 4, Nafion® membranes were ion-exchanged by like method to example 14, without addition of active oxygen vanishing catalyst.

Nafion® membranes processed in the foregoing methods were evaluated in the following methods.

<Hydrogen Peroxide Endurance Test>

Nafion® membranes processed in the described manner were observed to visually check for changes in color.

<Deterioration Analysis of Membrane>

For deterioration analysis of membrane, measurements were made of concentrations of fluoride ions generated upon decomposition of Nafion® membrane. For detection of fluoride ions, a solution of sample prepared in the described manner was diluted ten-times with ultrapure water, and this diluted solution was measured by an ion chromatograph. The ion chromatograph used was a Daionecc Co. make model: DX-AQ).

<Stability Test of Active Oxygen Vanishing Catalyst>

For stability test of NHPI and NHGI as active oxygen vanishing catalysts, an NHPI solution and an NHGI solution, prepared to in M, were each respectively put in a beaker, held at 80° C., and sampled every 24 hours, to be liquid-chromatographed. For NHPI and NHGI, the concentration was measured by a peak area of chromatogram thus obtained.

For example 13 to example 34 and comparative example 3 and comparative example 4, ion types of Nafion® membrane, kinds of catalyst, fluoride ion concentrations, and color changes of membrane are listed in Table 3 and Table 4 below.

TABLE 3

|  | Nafion membrane | Active oxygen vanishing catalysts | Fluoride ion concentrations | Color changes of membrane |
|---|---|---|---|---|
| Example 13 | H$^+$ type | NHPI | 0.1 ppm or less | None |
| Example 14 | Fe$^{2+}$ type | NHPI | 0.2 ppm or less | None |
| Example 15 | H$^+$ type | N-hydroxymaleic acid imide | 0.1 ppm or less | None |

TABLE 3-continued

| | Nafion membrane | Active oxygen vanishing catalysts | Fluoride ion concentrations | Color changes of membrane |
|---|---|---|---|---|
| Example 16 | $Fe^{2+}$ type | N-hydroxymaleic acid imide | 0.2 ppm or less | None |
| Example 17 | $H^+$ type | N-hydroxysuccinic acid imide | 0.1 ppm or less | None |
| Example 18 | $Fe^{2+}$ type | N-hydroxysuccinic acid imide | 0.2 ppm or less | None |
| Example 19 | $H^+$ type | N-hydroxytrimellitic acid imide | 0.1 ppm or less | None |
| Example 20 | $Fe^{2+}$ type | N-hydroxytrimellitic acid imide | 0.2 ppm or less | None |
| Example 21 | $H^+$ type | N,N'-dihydroxypyromellitic acid imide | 0.1 ppm or less | None |
| Example 22 | $Fe^{2+}$ type | N,N'-dihydroxypyromellitic acid imide | 0.3 ppm | None |
| Comparative Example 3 | $H^+$ type | None | 0.1 ppm or less | None |
| Comparative Example 4 | $Fe^{2+}$ type | None | 2.0 ppm | Tanned |

TABLE 4

| | Nafion membrane | Active oxygen vanishing catalysts | Fluoride ion concentrations | Color changes of membrane |
|---|---|---|---|---|
| Example 23 | $H^+$ type | NHGI | 0.1 ppm or less | None |
| Example 24 | $Fe^{2+}$ type | NHGI | 0.2 ppm or less | None |
| Example 25 | $H^+$ type | NHNDI | 0.1 ppm or less | None |
| Example 26 | $Fe^{2+}$ type | NHNDI | 0.2 ppm or less | None |
| Example 27 | $H^+$ type | NHDDI | 0.1 ppm or less | None |
| Example 28 | $Fe^{2+}$ type | NHDDI | 0.2 ppm or less | None |
| Example 29 | $H^+$ type | NHNTI | 0.1 ppm or less | None |
| Example 30 | $Fe^{2+}$ type | NHNTI | 0.2 ppm or less | None |
| Example 31 | $H^+$ type | NHDTI | 0.1 ppm or less | None |
| Example 32 | $Fe^{2+}$ type | NHDTI | 0.3 ppm | None |
| Example 33 | $H^+$ type | THICA | 0.1 ppm or less | None |
| Example 34 | $Fe^{2+}$ type | THICA | 0.3 ppm | None |

As will be seen from results of examples 13, 15, 17, 19, 21, 23, 25, 27, 29, 31, and 33, and comparative example 3, for Nafion® membranes of $H^+$ type, fluoride ions were hardly detected, irrespective of presence or absence of an active oxygen vanishing catalyst such as NHPI or NHGI, even after 12 hours of treatment in hydrogen peroxide solution, supporting no progress of deterioration in Nafion® membrane. To the corny, as shown by comparative example 4, for Nafion® membranes of $Fe^{2+}$ type, fluoride ions were detected after 12-hour treatment, supporting a progress of deterioration in membrane.

Further, as will be seen from results of examples 14, 16, 18, 20, 22, 24, 26, 28, 30, 32, and 34, and comparative example 4, detected fluoride ions had a difference often times or more depending on presence or absence of an active oxygen vanishing catalyst such as NHPI or NHGI, proving a suppressed decomposition of Nafion® membrane under presence of an active oxygen vanishing catalyst such as NHPI or NHGI.

Further, for Nafion® membrane of $Fe^{2+}$ type which is almost transparent, comparative example 4 showed a change to a tannish color of membrane after 12-hour treatment in hydrogen peroxide solution, as an oxidation of counter ion from $Fe^{2+}$ to $Fe^{3+}$, suggesting an occurrence of Fenton reaction. To the contrary, in examples 14, 16, 18, 20, 22, 24, 26, 28, 30, 32, and 34 where an active oxygen vanishing catalyst such as NHPI or NHGI was present, no change of color was observed despite a presence of $Fe^{2+}$, proving a suppression of Fenton reaction.

Further, during 12 hours of heating treatment in hydrogen peroxide solution, sample bottles of examples 13 and 14, where NHPI had been put, generated more bubbles than comparative examples 3 and 4, which was observed as a visual check of promoted decomposition of hydrogen peroxide. It is noted that results of this time showed no great differences in amounts of fluoride ions generated in dependence on the kind of active oxygen vanishing catalyst.

Next, using membranes obtained from examples 14, 16, 18, 20, 22, 24, 26, 28, 30, 32, and 34, and comparative example 4 as electrolyte membranes, and platinum-supporting carbon as electrodes, unit cells for fuel cell were prepared, and subjected to a start and stop repeating endurance test. On electrolyte membrane obtained, platinum-supporting carbon (20 wt % Pt/Vulcan XC-72, Cabot Co.) was coated by a spread of 1 mg/cm² to the sides to be anode and cathode, to fabricate a membrane electrode assembly (MEA). Fabricated MEA was assembled in a single cell, to provide a unit cell for PEFC to be used for evaluation. The unit cell was a 5 cm² simplex cell.

The start and stop repeating endurance test was made in the following manner.

<Start and Stop Repeating Endurance Test>

70° C. humidified hydrogen gas (atmospheric pressure) as an anode gas and 70° C. humidified oxygen gas (atmospheric pressure) as a cathode gas were supplied to a unit cell held 70° C., and an open circuit condition was held for 30 minutes, to start the test.

In the test, supplying gas to the unit cell by a flow rate of 300 dm³/min, the current density was increased from a discharge open-circuit condition, making discharge till the terminal voltage gets below 0.3V. Then, after the terminal voltage had got below 0.3V, an open-circuit condition was again held for 5 minutes. This operation was repeated, for comparison of the endurance performance in terms of the number of times when the voltage gets below 0.4V under a condition of power generation with a current density of 1 mA/cm³. For promotion of the endurance test, Nafion® membranes employed were taken from examples 14, 16, 18, 20, 22, 24, 26, 28, 30, 32, and 34 and comparative example 4, where they were each replaced by $Fe^{2+}$ type. For examples 14, 16, 18, 20, and 22 and comparative example 4, the counter ion types of Nafion® membrane, kinds of catalyst, and start-stop repetition time number are listed in Table 5 below.

TABLE 5

| | Nafion membranes | Active oxygen vanishing catalysts | start-stop repetition time number |
|---|---|---|---|
| Example 14 | $Fe^{2+}$ type | NHPI | 550 |
| Example 16 | $Fe^{2+}$ type | N-hydroxymaleic acid imide | 510 |
| Example 18 | $Fe^{2+}$ type | N-hydroxysuccinic acid imide | 580 |
| Example 20 | $Fe^{2+}$ type | N-hydroxytrimellitic acid imide | 530 |
| Example 22 | $Fe^{2+}$ type | N,N'-dihydroxypyromellitic acid imide | 550 |
| Comparative example 4 | $Fe^{2+}$ type | None | 70 |

Figure 17:
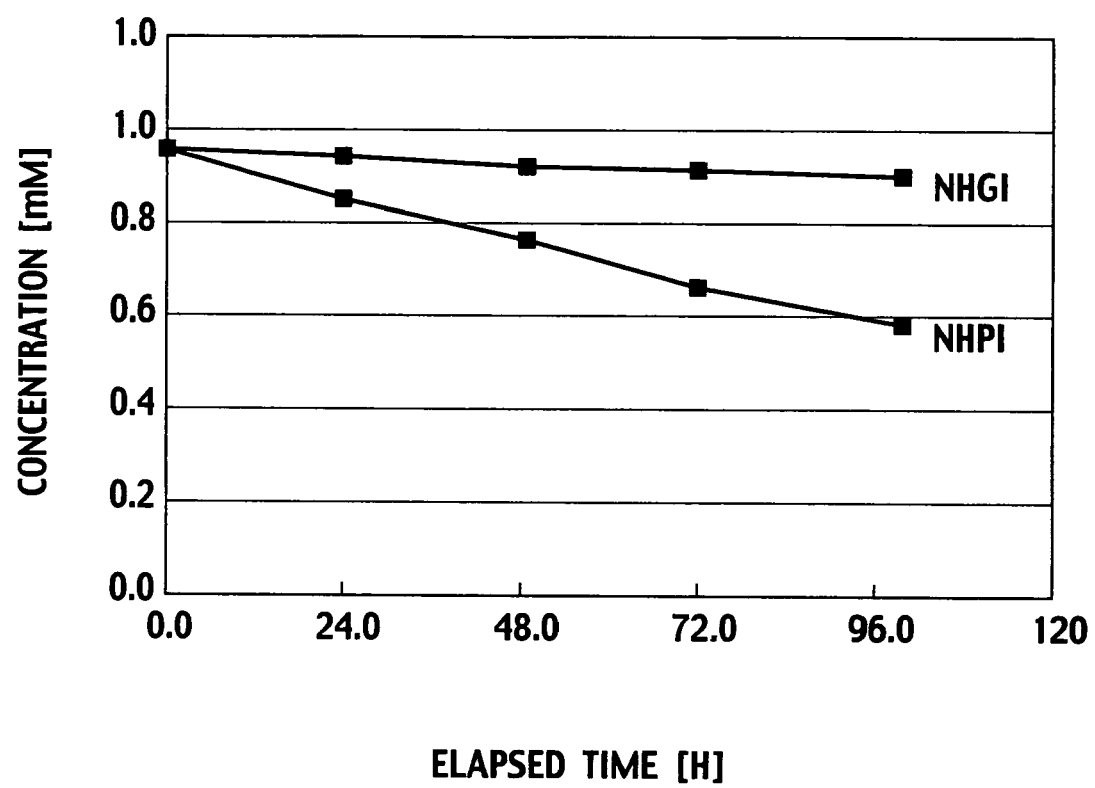
FIG. 17 is a graph showing results of a stability test for NHPI and NHGI.

As shown in comparative example 4, absence of active oxygen vanishing catalyst resulted, under the condition of power generation with a current density of 1 $mA/cm^3$, in a voltage drop to a level of 0.4 V or less at a start-stop repetition time number of 70. To the contrary, in each case in which of an active oxygen vanishing catalyst was added, the voltage dropped below 0.4V at a start-stop repetition time number over 500, as a verification of a suppressed deterioration of electrolyte membrane due to addition of active oxygen vanishing catalyst the antioxidant Further, in any of examples 24, 26, 28, 30, 32, and 34 where the active oxygen vanishing catalyst was a six-membered ring type, the voltage dropped below 0.4V at a start-stop repetition time number over 600, as a support for an increased tendency to suppress deterioration of electrolyte membrane, with an excellent durability, in comparison with examples 14, 16, 18, 20, and 22 of a five-membered ring type. This is considered because imide compounds of six-membered ring type have a better and more stable resistance to hydrolysis than five-membered ring type, so that they have an increased start-stop repetition time number in comparison with imide compounds of five-membered ring type. FIG. 17 shows, in a graph, results of stability test on NHPI and NHGI. As shown in FIG. 7, NHPI, which is a five-membered ring type, had a decreasing concentration by hydrolysis shown in formula (C23) as the time had elapsed, so that the concentration of NHPI was decreased to approx. 0.6 mM by a lapse of 96 hours. To the contrary, although NHGI of a six-membered ring type also had a decreasing concentration by hydrolysis shown in formula (C24) as the time had elapsed, the concentration after 96 hours was yet approx-0.9 mM.

It is understood that although imide compounds of six-membered ring type also have hydrolysis progress like five-membered ring type, the hydrolysis reaction is slower in comparison with five-membered ring type, so that the resistance to hydrolysis is good and stable. Among others, in the case of example 34 that employed THICA as an active oxygen vanishing catalyst, the voltage dropped below 0.4V at a start-stop repetition time number of 850, as a verification of a specifically excellent durability. It is considered that THICA is small in molecular weight and has three intramolecular hydroxyimide groups, whereby it has an increased excellence in hydrolysis for vanishment of active oxygen, allowing for favorable durability.

Although perfluorosulfonic acid system polymers typified by the Nafion® film having wide application to the electrolyte membrane are put in a situation where they are unsuccessfully considered having a sufficient tolerance by generation of active oxygen at the positive electrode of fuel cell, as will be seen from the foregoing description, by use of an electrolyte membrane containing the above-noted compound as a catalyst, entry and exit of hydrogen radical can be repeated and they can have a maintained effect to vanish active oxygen over a long term. Like this, by use of active oxygen vanishing catalyst, even if hydrogen peroxide is generated at the positive electrode of solid high-polymer type fuel cell, the electrolyte membrane can have a maintained performance over a long term, allowing a suppressed deterioration of electrolyte membrane, allowing for an enhanced durability of fuel cell.

Description is now specifically made of solid polymer electrolytes according to examples 35 to 54 of embodiment of the invention and comparative examples 5 and 6.

<Sample Preparation>

For example 35 to example 44 and comparative example 5, an S-PES (sulfonated polyethersulfone) film was employed as a hydrogen carbon system electrolyte membrane. As the S-PES film, procured and used was an equivalent to that described in p. 31 of "researches and developments of a durability-elevated hydrocarbon system electrolyte membrane for proton-exchange membrane fuel cells in the proton-exchange membrane fuel cell elements technology development and like program in the proton-exchange membrane fuel cell system technology project", 2002 yearly results report of the New Energy and Industrial Technology Development Organization of Japan.

Example 35

An S-PES film 150 μm thick was cut into 1 cm squares to be used. For pretreatment, S-PES membranes were boiled in distilled water for 1 hour, then in 1M sulfuric acid solution for 1 hour, and finally, in distilled water for 1 hour, in this order. Next, as a compound for decomposing active oxygen, 4-hydroxy-TEMPO (Aldrich Co.) shown in FIG. 7 (ii) was added to be 0.5 mM to p S-PES membranes, which were thereafter soaked, for evaluation use, for 24 hours at 80° C. in 10 $cm^3$ of 0.5% hydrogen peroxide, as it was prepared by diluting 30% hydrogen peroxide solution (Wako pure medicine high grade) with ultrapure water.

Example 36

As a compound for decomposition of active oxygen, instead of 4-hydroxy-TEMPO, 0.5 mM of 4-carboxy-TEMPO (Aldrich Co.) aqueous solution was added for example 36. Other treatments were like to example 35.

Example 37

As a compound for decomposition of active oxygen, 0.5 mM of TEMPO (Aldrich Co.) aqueous solution was added for example 37. Other treatments were like to example 35.

Example 38

As a compound for decomposition of active oxygen, 0.5 mM of 3-carbamoyl-PROXYL (Aldrich Co.) aqueous solution was added for example 38. Other treatments were like to example 35.

Example 39

As a compound for decomposition of active oxygen, 0.5 mM of 3-carboxy-PROXYL (Aldrich Co.) aqueous solution was added for example 39. Other treatments were like to example 35.

Example 40

As a compound for decomposition of active oxygen, 0.5 mM of 3-carbamoyl-2,2,5,5-tetramethylpyrroline-1-yloxy (Aldrich Co.) aqueous solution was added for example 40. Other treatments were like to example 35.

Example 41

As a compound for decomposition of active oxygen, 0.5 mM of di-t-butylnitroxide (Aldrich Co.) aqueous solution was added for example 41. Other treatments were like to example 35.

Example 42

As a compound for decomposition of active oxygen, 0.5 mM of N-hydroxy phthalic acid imide (NHPI: Aldrich Co.) aqueous solution was added for example 42. Other treatments were like to example 35.

Example 43

As a compound for decomposition of active oxygen, 0.5 mM of N-hydroxy maleic acid imide (NHMI: Aldrich Co.) aqueous solution was added for example 43. Other treatments were like to example 35.

Example 44

As a compound for decomposition of active oxygen, 0.5 mM of N-hydroxy succinic acid imide (NHSI: Aldrich Co.) aqueous solution was added for example 44. Other treatments were like to example 35.

Comparative Example 5

For comparative example 5, no compound for decomposition of active oxygen was added to S-PES membranes pretreated by like method to example 36. Other treatments were like to example 35.

For example 45 to example 54 and comparative example 6, a film of Nafion® 117 of Du Pont Co., 175 lam thick, was cut into 1 cm squares to be used as fluorine system electrolyte membranes. Nafion® membranes were prated to the NEDO PEFC R&D project standard treatment, where they were boiled: in 3% hydrogen peroxide aqueous solution for 1 hour, and in distilled water for 1 hour, then, in 1M sulfuric acid solution for 1 hour, and finally, in distilled water for 1 hour, in this order. Fluorine system electrolyte membranes are strong in duration relative to hydrocarbon system membranes, and for promoting deterioration in hydrogen peroxide endurance test pretreated Nafion® membranes were soaked in 100 mM $FeSO_4$ aqueous solution for one night or more, and ultrasonically cleaned in distilled water for 15 minutes, for removing ions adhering to membrane to thereby exchange counter ions of Nafion® from 14+ to $Fe^{2+}$. Wako pure medicine high grade $FeSO_4.7H_2O$ was used as a reagent.

As a compound for decomposition of active oxygen, 0.5 mM of 4-hydroxy-TEMPO (Aldrich Co.) aqueous solution was added to ion-exchanged Nafion® membranes, which were thereafter soaked, for evaluation use, for 12 hours at 80° C. in 10 cm³ of 10% hydrogen peroxide, as it was prepared by diluting 30% hydrogen peroxide solution (Wako pure medicine high grade) with ultrapure water.

Example 46

Instead of 4-hydroxy-TEMPO, 0.5 mM of 4-carboxy-TEMPO (Aldrich Co.) aqueous solution was added for example 46. Other treatments were like to example 45.

Example 47

As a compound for decomposition of active oxygen, 0.5 mM of TEMPO (Aldrich Co.) aqueous solution was added for example 47. Other treatments were like to example 45.

Example 48

As a compound for decomposition of active oxygen, 0.5 mM of 3-carbamoyl-PROXYL (Aldrich Co.) aqueous solution was added for example 48. Other treatments were like to example 45.

Example 49

As a compound for decomposition of active oxygen, 0.5 mM of 3-carboxy-PROXYL (Aldrich Co.) aqueous solution was added for example 49. Other treatments were like to example 45.

Example 50

As a compound for decomposition of active oxygen, 0.5 mM of 3-carbamoyl-2,2,5,5-tetramethylpyrroline-1-yloxy (Aldrich Co.) aqueous solution was added for example 50. Other treatments were like to example 45.

Example 51

As a compound for decomposition of active oxygen, 0.5 mM of di-t-butylnitroxide (Aldrich Co.) aqueous solution was added for example 51. Other treatments were like to example 45.

Example 52

As a compound for decomposition of active oxygen, 0.5 mM of NHPI (Aldrich Co.) aqueous solution was added for example 52. Other treatments were like to example 45.

Example 53

As a compound for decomposition of active oxygen, 0.5 mM of NHMI (Aldrich Co.) aqueous solution was added for example 53. Other treatments were like to example 45.

Example 54

As a compound for decomposition of active oxygen, 0.5 mM of NHSI (Aldrich Co.) aqueous solution was added for example 54. Other treatments were like to example 45.

Comparative Example 6

For comparative example 6, no compound for decomposition of active oxygen was added in example 45. Other treatments were like to example 45.

S-PES membranes and Nafion® membranes treated in the foregoing methods were evaluated in the following methods.

<Deterioration Analysis of Membrane>

For deterioration analysis of membranes, measurements were made for S-PES membranes, of concentrations of sulfate ions generated upon decomposition, and for Nafion® membranes, concentrations of fluoride ions generated upon decomposition of membrane. For detection of eluted ions, a solution of sample prepared in the described manner was diluted ten-times with ultrapure water, and this diluted solution was measured by an ion chromatograph. The ion chromatograph used was a Daionecc Co. make (Model: DX-AQ).

<Measurements of Redox Potential>

Redox potentials of the compounds employed in the examples were measured by using glassy carbon as an acting electrode, platinum as a counter electrode, a orated calomel electrode (SCE) as a reference electrode, and 1M sulfuric acid as an electrolytic solution. Corrections are made to standard potential $E°$ (NHE) to be consistent with redox potentials of respective substances.

For examples 35 to 44 using S-PES membranes as electrolyte membranes, and comparative example 5, employed compounds for decomposition of active oxygen, redox potentials of compounds, and concentrations of sulfite ion detected after hydrogen peroxide endurance are listed in Table 6.

TABLE 6

|  | Electrolyte membranes | Compounds for decomposition of active oxygen | Redox potentials of compounds | Concentrations of sulfate ion |
|---|---|---|---|---|
| Example 35 | S-PES membrane | TEMPO-OH | 0.81 | 0.7 |
| Example 36 | S-PES membrane | TEMPO-COOH | 0.81 | 0.5 |
| Example 37 | S-PES membrane | TEMPO | 0.81 | 0.6 |
| Example 38 | S-PES membrane | PROXYL-CONH$_2$ | 0.85 | 0.5 |
| Example 39 | S-PES membrane | PROXYL-COOH | 0.86 | 0.5 |
| Example 40 | S-PES membrane | ***) | 0.95 | 0.7 |
| Example 41 | S-PES membrane | DTBN | 0.80 | 0.8 |
| Example 42 | S-PES membrane | NHPI | 1.34 | 6.5 |
| Example 43 | S-PES membrane | NHMI | 1.34 | 5.2 |
| Example 44 | S-PES membrane | NHSI | 1.36 | 5.4 |
| Comparative example 5 | S-PES membrane | None | — | 2.5 |

***) 3-carbamoyl-2,2,5,5-tetramethylpyrroline-1-yloxy

In example 35 to example 41, their concentrations of sulfate ion detected after 24 hours were within 0.5 to 0.7 ppm. To the contrary, in the comparative example 5 in which no compound for decomposition of active oxygen was added, 2.5 ppm of sulfate ion was detected Comparison between examples 35 to 41 and comparative example 6 has proven that each compound shown in examples 35 to 41 decomposed active oxygen, preventing oxidation of electrolyte membrane. Examples 42 to 44 are examples in which a compound having a redox potential of 1.0V or more was added. Compounds used in examples 42 to 44 have redox potentials of 1.34V, 1.35V, and 1.35V, respectively. This redox potential is a potential for oxidizing S-PES membrane, and decomposes the electrolyte membrane. Therefore, in examples 42 to 44, greater sulfate ions were detected than comparative example 5 containing no compound for decomposition of active oxygen.

Next, for examples 45 to 54 using Nafion® membranes as electrolyte membranes, and comparative example 6, employed compounds for decomposition of active oxygen, redox potentials of compounds, and concentrations of fluorine ion detected after hydrogen peroxide endurance are listed in Table 7.

TABLE 7

|  | Electrolyte membranes | Compounds for decomposition of active oxygen | Redox potentials of compounds | Concentrations of fluorine ion |
|---|---|---|---|---|
| Example 45 | Nafion membrane | TEMPO-OH | 0.81 | 0.3 |
| Example 46 | Nafion membrane | TEMPO-COOH | 0.81 | 0.2 |
| Example 47 | Nafion membrane | TEMPO | 0.81 | 0.3 |
| Example 48 | Nafion membrane | PROXYL-CONH$_2$ | 0.85 | 0.2 |
| Example 49 | Nafion membrane | PROXYL-COOH | 0.86 | 0.2 |
| Example 50 | Nafion membrane | ***) | 0.95 | 0.4 |
| Example 51 | Nafion membrane | DTBN | 0.80 | 0.4 |
| Example 52 | Nafion membrane | NHPI | 1.34 | 0.3 |
| Example 53 | Nafion membrane | NHMI | 1.34 | 0.4 |
| Example 54 | Nafion membrane | NHSI | 1.36 | 0.3 |
| Comparative example 6 | Nafion membrane | None | — | 1.5 |

***) 3-carbamoyl-2,2,5,5-tetramethylpyrroline-1-yloxy

In example 45 to example 51, their concentrations of fluorine ion detected after 24 hours were within 0.2 to 0.4 ppm. To the contrary, in the comparative example 6 in which no compound for decomposition of active oxygen was added, 1.5 ppm of fluorine ion was detected. Comparison between examples 45 to 51 and comparative example 6 has proven that each compound shown in examples 45 to 51 decomposed active oxygen, preventing oxidation of electrolyte membrane. Examples 52 to 54 are examples in which a compound having a redox potential of 1.0V or more was added. Concentrations of fluorine ion detected in examples 52 to 54 were within 0.3 to 0.4 ppm, and substantially equivalent to examples 45 to 51, thus showing an identical level of oxidation-preventive effect to examples 45 to 51. It is suggested that fluorine system electrolyte membranes are strong in resistance to oxidation relative to hydrocarbon system electrolyte membranes, and even if the redox potential of a compound added for decomposition of active oxygen is somewhat high, the electrolyte membrane will not be oxidized by the compound.

Next, using membranes obtained from examples of embodiment and comparative examples as electrolyte membranes, and platinum-supporting carbon as electrodes, unit cells for fuel cell were prepared, and subjected to a start and stop repeating endurance test. On electrolyte membrane obtained, platinum-supporting carbon (20 wt % Pt/Vulcan XC-72, Cabot Co.) was coated by a spread of 1 mg/cm$^2$ to the sides to be anode and cathode, to fabricate a membrane electrode assembly (MEA). Fabricated MEA was assembled in a single cell, to provide a unit cell for PEFC to be used for evaluation. The unit cell was a 5 cm$^2$ simplex cell.

The start and stop repeating endurance test was made in the following manner.

<Start and Stop Ring Endurance Test>

70° C. humidified hydrogen gas (atmospheric pressure) as an anode gas and 70° C. humidified oxygen gas (atmospheric pressure) as a cathode gas were supplied to a unit cell held 70° C., and an open-circuit condition was held for 30 minutes, to start the test. In the test, supplying gas to the unit cell by a flow rate of 300 dm³/min, the current density was increased from a discharge open-circuit condition, making discharge till the terminal voltage gets below 0.3V. Then, after the terminal voltage had got below 0.3V, an open-circuit condition was again held for 5 minutes. This operation was re d, for comparison of the endurance performance in terms of the number of times when the voltage gets below 0.4V under a condition of power generation with a current density of 1 mA/cm³. It is noted that although S-PES membranes were used as they were, each Nafion® membrane was used after exchange to $Fe^{2+}$ type, for promotion of the endurance test.

For examples 35 to 44 using S-PES membranes and comparative example 5, their compounds for decomposition of active oxygen and start-stop repetition time numbers are listed in Table 8 below.

TABLE 8

| | Electrolyte membranes | Compounds for decomposition of active oxygen | Start-stop repetition time numbers |
|---|---|---|---|
| Example 35 | S-PES membrane | TEMPO-OH | 400 |
| Example 36 | S-PES membrane | TEMPO-COOH | 420 |
| Example 37 | S-PES membrane | TEMPO | 410 |
| Example 38 | S-PES membrane | PROXYL-CONH$_2$ | 410 |
| Example 39 | S-PES membrane | PROXYL-COOH | 410 |
| Example 40 | S-PES membrane | ***) | 380 |
| Example 41 | S-PES membrane | DTBN | 390 |
| Example 42 | S-PES membrane | NHPI | 30 |
| Example 43 | S-PES membrane | NHMI | 30 |
| Example 44 | S-PES membrane | NHSI | 30 |
| Comparative example 5 | S-PES membrane | None | 50 |

***) 3-carbamoyl-2,2,5,5-tetramethylpyrroline-1-yloxy

For the comparative example 5 in which no compound for decomposition of active oxygen was added, under the condition of power generation with a current density of 1 mA/cm³, the voltage dropped below 0.4 V at a start-stop repetition time number of 50. To the contrary, in each of example 35 to example 41, the voltage dropped below 0.4V at a start-stop repetition time number over 400, as a verification of effectiveness in the power generation test as well. In each of example 42 to example 44 in which a compound having a redox potential higher than 1.0V was added, the voltage dropped below 0.4V at a start-stop repetition time number of 30, failing to obtain an effective result.

For examples 45 to 54 using Nafion® membranes and comparative example 6, their compounds for decomposition of active oxygen and start-stop repetition time numbers are listed in Table 9 below.

TABLE 9

| | Electrolyte membranes | Compounds for decomposition of active oxygen | Start-stop repetition time numbers |
|---|---|---|---|
| Example 45 | Nafion membrane | TEMPO-OH | 550 |
| Example 46 | Nafion membrane | TEMPO-COOH | 580 |
| Example 47 | Nafion membrane | TEMPO | 570 |
| Example 48 | Nafion membrane | PROXYL-CONH$_2$ | 580 |

TABLE 9-continued

| | Electrolyte membranes | Compounds for decomposition of active oxygen | Start-stop repetition time numbers |
|---|---|---|---|
| Example 49 | Nafion membrane | PROXYL-COOH | 580 |
| Example 50 | Nafion membrane | ***) | 550 |
| Example 51 | Nafion membrane | DTBN | 530 |
| Example 52 | Nafion membrane | NHPI | 550 |
| Example 53 | Nafion membrane | NHMI | 510 |
| Example 54 | Nafion membrane | NHSI | 580 |
| Comparative example 6 | Nafion membrane | None | 70 |

***) 3-carbamoyl-2,2,5,5-tetramethylpyrroline-1-yloxy

For the comparative example 6 in which no compound for decomposition of active oxygen was added, under the condition of power generation with a current density of 1 mA/cm³, the voltage dropped below 0.4 V at a start-stop repetition time number of 70. To the contrary, in each of example 45 to example 54 in which a compound for decomposition of active oxygen was added, the voltage dropped below 0.4V at a start-stop repetition time number over 500, as a verification of effectiveness in the power generation test as well. Also in example 52 to example 54 in which a compound having a redox potential higher than 1.0V was added, the voltage dropped below 0.4V at a start-stop repetition time number over 500, with a verification of effectiveness encompassing the case in which the compound for decomposition of active oxygen has a redox potential higher than 1.0V, as well, under the use of Nafion® membrane as an electrolyte membrane.

As will be seen from the foregoing description, by using a hydrocarbon system electrolyte membrane such as an S-PES film developed for fuel cells, having this contain a compound with a redox potential within a range of 0.68V to 1.00V, the deterioration by oxidation of electrolyte membrane can be suppressed, allowing for an enhanced durability of fuel cell. Moreover, it is seen that this compound can be reversibly redoxed to allow the effect to be maintained over a long term Further, it also is seen that this compound can suppress deterioration by oxidation of electrolyte membrane even in use of a fluorine system electrolyte membrane, and not simply in the case of fluorine system electrolyte membrane, but also allows for a prevented oxidation of hydrocarbon system electrolyte membrane.

The whole contents of Japanese Patent Application No. 2004-203151 (application date: Jul. 9, 2004), Japanese Patent Application No. 2004-258507 (application date: Sep. 6, 2004), Japanese Patent Application No. 2004-349842 (application date: Dec. 2, 2004), Japanese Patent Application No. 2005-053653 (application date: Feb. 28, 2005), and Japanese Patent Application No. 2005-172229 (application date: Jun. 13, 2005) are incorporated herein by reference.

While the contents of the present invention have been described by way of mode of embodiments and example thereof such description is not limited thereto, and it will be obvious for artisan that various changes and improvements can be made.

INDUSTRIAL APPLICABILITY

In a fuel system according to the invention, an antioxidant residing in or contacting a solid polymer electrolyte membrane decomposes active oxygen. Further, after the decomposition of active oxygen, the antioxidant returns to an original form by a redox cycle of the antioxidant itself, and can be used many times. This allows for implementation of a fuel cell system with a maintained durability.

The invention claimed is:

1. A fuel cell comprising:
   a fuel electrode;
   an air electrode; and
   a solid polymer electrolyte provided between the fuel electrode and the air electrode, wherein protons move from the fuel electrode to the air electrode through the solid polymer electrolyte, and
   wherein the solid polymer electrolyte comprises a compound having a redox cycle, where it acts as a reducing agent in a range of potentials lower than a redox potential of hydroxy radical, and as an oxidizing agent in a range of potentials higher than a redox potential where hydrogen peroxide acts as a reducing agent.

2. The fuel cell as claimed in claim 1, characterized in that said compound has a redox potential greater than 0.68V(NHE) and smaller than 2.85V(NHE).

3. The fuel cell as claimed in claim 2, characterized in that said compound acts as a reducing agent in a range of potentials lower than a redox potential where hydrogen peroxide acts as an oxidizing agent, and as an oxidizing agent in a range of potentials higher than a redox potential where hydrogen peroxide acts as a reducing agent.

4. The fuel cell as claimed in claim 3, characterized in that said compound has a redox potential greater than 0.68V(NHE) and smaller than 1.77V(NHE).

5. The fuel cell as claimed in claim 4, characterized in that said compound has a redox potential greater than 0.68V(NHE) and smaller than 1.00V(NHE).

6. The fuel cell as claimed in claim 1, characterized in that said compound comprises a compound represented by a general formula (I) below

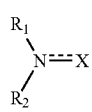
(I)

where $R_1$ and $R_2$ denote arbitrary substituent groups, identical or different, and X denotes an oxygen atom or a hydroxyl group.

7. The fuel cell as claimed in claim 4, characterized in that $R_1$ and $R_2$ are combined with each other, to form a double bond, an aromatic ring, or a nonaromatic ring.

8. The fuel cell as claimed in claim 6, characterized in that said compound comprises an imide compound represented by a general formula (II) below

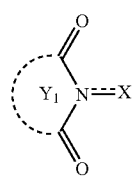
(II)

where a ring $Y_1$ denotes any one kind of ring among 5-membered to 12-membered rings double-bonded or aromatic or nonaromatic.

9. The fuel cell as claimed in claim 8, characterized in that the compound represented by the general formula (II) comprises an imide compound represented by a general formula (III) below

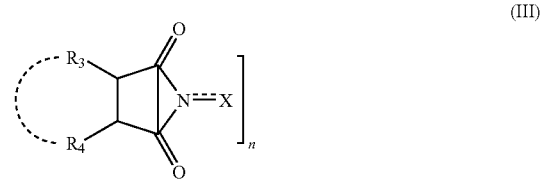
(III)

where $R_3$ and $R_4$ respectively denote elements of a set of hydrogen atoms, halogen atoms, alkyl groups, aryl groups, cycloalkyl groups, hydroxyl groups, alkoxyl groups, carboxyl groups, alkoxycarbonyl groups, or acyl groups, mutually identical or different, X denotes an oxygen atom or a hydroxyl group, and n denotes an integer within 1 to 3.

10. The fuel cell as claimed in claim 9, characterized in that $R_3$ and $R_4$ are combined with each other to form a double bond, an aromatic ring, or a nonaromatic ring.

11. The fuel cell as claimed in claim 9, characterized in that $R_3$ and $R_4$ are combined with each other to form any one kind of ring among 5-membered to 12-membered rings aromatic or nonaromatic.

12. The fuel cell as claimed in claim 9, characterized in that $R_3$ and $R_4$ are combined with each other to form at least one kind of ring selective from a set of a cycloalkane, a cycloalkene, a bridged hydrocarbon ring, and an aromatic ring, and substitutions thereof.

13. The fuel cell as claimed in claim 9, characterized in that the imide compound comprises an imide compound represented by one of general formulas (IVa) to (IVf) below

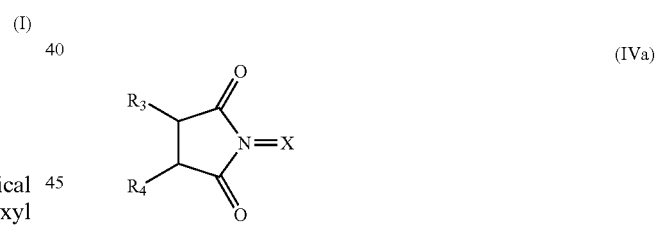
(IVa)

(IVb)

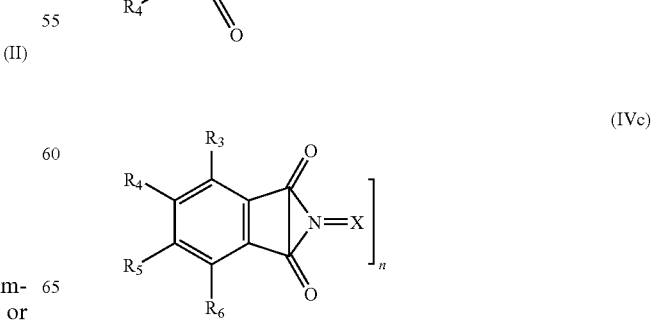
(IVc)

-continued

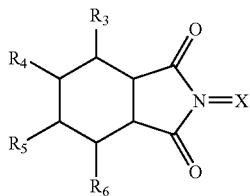

(IVd)

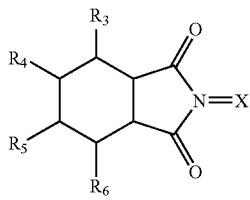

(IVe)

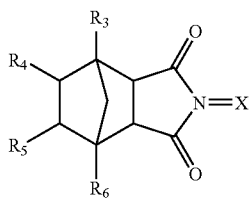

(IVf)

where $R_3$ to $R_6$ respectively denote elements of a set of hydrogen atoms, halogen atoms, alkyl groups, hydroxyl groups, alkoxyl groups, carboxyl groups, alkoxycarbonyl groups, acyl groups, nitro groups, cyano groups, or amino groups, mutually identical or different, and n denotes an integer within 1 to 3.

14. The fuel cell as claimed in claim 9, characterized in that the imide compound comprises an imide compound selective from a set of N-hydroxy succinic acid imide, N-hydroxy maleic acid imide, N-hydroxy hexahydrophthal imide, N, N'-dihydroxycyclohexane tetracarboxylic acid imide, N -hydroxyphthalimide, N-hydroxy tetrabromophthalic acid imide, N-hydroxy tetrachlorophthalic acid imide, N-hydroxy fatty acid imide, N-hydroxy himic acid imide, N -hydroxy trimellitic acid imide, N, N'-dihydroxy pyromellitic acid imide, and N, N'-dihydroxynaphthalene tetracarboxylic acid imide.

15. The fuel cell as claimed in claim 8, characterized in that the compound represented by the general formula (II) comprises a compound represented by a general formula (V) below

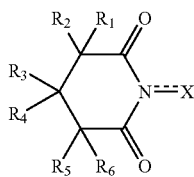

(V)

where X denotes an oxygen atom or a hydroxyl group, $R_1$ to $R_6$ respectively denote elements of a set of hydrogen atoms, alkyl groups, aryl groups, cycloalkyl groups, hydroxyl groups, alkoxyl groups, carboxyl groups, substituent carbonyl groups, acyl groups, or acyloxy groups, mutually identical or different, wherein at least two of $R_1$ to $R_6$ may be combined with each other to form a double bond, or an aromatic or nonaromatic ring, whereof at least one ring may comprises an N-substituent cyclic imide group.

16. The fuel cell as claimed in claim 15, characterized in that the compound represented by the general formula (V) comprises a compound represented by one of general formulas (VIa) and (VIb) below

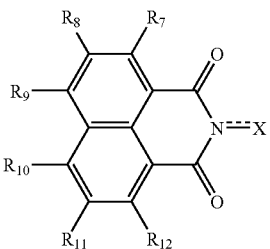

(VIa)

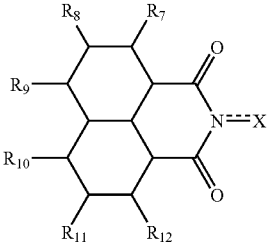

(VIb)

where $R_7$ to $R_{12}$ respectively denote elements of a set of hydrogen atoms, alkyl groups, hydroxyl groups, alkoxyl groups, carboxyl groups, alkoxycarbonyl groups, acyl groups, nitro groups, cyano groups, or amino groups, mutually identical or different.

17. The fuel cell as claimed in claim 16, characterized in that the compound represented by one of the general formulas (V), (VIa) and (VIb) comprises an imide compound selective from a set of N-hydroxyglutaric acid imide, N -hydroxy-1, 8-naphthalene dicarboxylic acid imide, N-hydroxy-1, 8-decalin dicarboxylic acid imide, N, N'-dihydroxy-1,8;4,5-naphthalene tetracarboxylic acid imide, N, N'-dihydroxy-1, 8;4,5-decalin tetracarboxylic acid imide, and N, N', N" trihydroxy isocyanuric acid imide.

18. The fuel cell as claimed in claim 6, characterized in that the compound represented by the general formula (I) comprises a compound represented by a general formula (VII) below

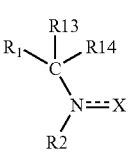

(VII)

where $R_{13}$ and $R_{14}$ each respectively denote an alkyl group, or an alkyl group substituted in part by an arbitrary radical, wherein $R_{13}$ and $R_{14}$ may be chained, ringed, or branched, wherein $R_{13}$ and $R_{14}$ may be combined with each other to form a ring, wherein oxygen and nitrogen atoms may be included.

19. The fuel cell as claimed in claim 18, characterized in that the compound represented by the general formula (VII) comprises a compound represented by a general formula (VIII) below

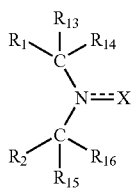

(VIII)

where $R_{13}$ to $R_{16}$ each respectively denote an alkyl group, or an alkyl group substituted in part by an arbitrary radical, wherein $R_{13}$ to $R_{16}$ may be chained, ringed, or branched, wherein $R_{13}$ and $R_{14}$, or $R_{15}$ and $R_{16}$ may be combined with each other to form a ring, wherein oxygen and nitrogen atoms may be included.

20. The fuel cell as claimed in claim 19, characterized in that the compound represented by the general formula (VIII) comprises a compound represented by a general formula (IX) below

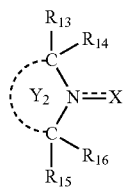

(IX)

where a ring $Y_2$ denotes a 5-membered or 6-membered ring formed by $R_{13}$ and $R_{14}$ mutually combined.

21. The fuel cell as claimed in claim 20, characterized in that the compound represented by the general formula (IX) comprises a compound represented by a general formula (X) below

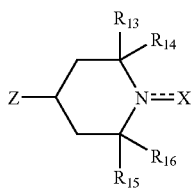

(X)

where Z denotes a kind of substituent group selective from a set of alkyl groups, aryl groups, alkoxy groups, carboxyl groups, alkoxycarbonyl groups, cyano groups, hydroxyl groups, nitro groups, amino groups, and substituent groups including a hydrogen atom, wherein for Z being an alkyl group, the alkyl group may be substituted in part by an arbitrary radical, and may be chained, ringed, or branched in part, and may include oxygen and nitrogen atoms, wherein for Z being an aryl group, the aryl group may be substituted in part by an arbitrary radical, and may include oxygen and nitrogen atoms.

22. The fuel cell as claimed in claim 20, characterized in that the compound represented by the general formula (IX) comprises a compound represented by a general formula (XI) below

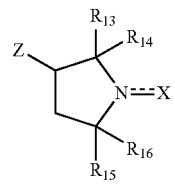

(XI)

where Z denotes a kind of substituent group selective from a set of alkyl groups, aryl groups, alkoxy groups, carboxyl groups, alkoxycarbonyl groups, cyano groups, hydroxyl groups, nitro groups, amino groups, and substituent groups including a hydrogen atom, wherein for Z being an alkyl group, the alkyl group may be substituted in part by an arbitrary radical, and may be chained, ringed, or branched in part, and may include oxygen and nitrogen atoms, wherein for Z being an aryl group, the aryl group may be substituted in part by an arbitrary radical, and may include oxygen and nitrogen atoms.

23. The fuel cell as claimed in claim 20, characterized in that the compound represented by the general formula (IX) comprises a compound represented by a general formula (XII) below

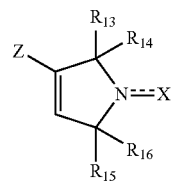

(XII)

where Z denotes a kind of substituent group selective from a set of alkyl groups, aryl groups, alkoxy groups, carboxyl groups, alkoxycarbonyl groups, cyano groups, hydroxyl groups, nitro groups, amino groups, and substituent groups including a hydrogen atom, wherein for Z being an alkyl group, the alkyl group may be substituted in part by an arbitrary radical, and may be chained, ringed, or branched in part, and may include oxygen and nitrogen atoms, wherein for Z being an aryl group, the aryl group may be substituted in part by an arbitrary radical, and may include oxygen and nitrogen atoms.

* * * * *